United States Patent
Li et al.

(10) Patent No.: US 11,726,379 B2
(45) Date of Patent: Aug. 15, 2023

(54) LIQUID CRYSTAL ASSEMBLY

(71) Applicant: Wicue, Inc., Cupertino, CA (US)

(72) Inventors: Fenghua Li, Shenzhen (CN); Martin Hainfellner, Münich (DE)

(73) Assignee: Wicue USA Inc., Santa Clara, CA (US)

( * ) Notice: Subject to any disclaimer, the term of this patent is extended or adjusted under 35 U.S.C. 154(b) by 2 days.

(21) Appl. No.: 17/529,981

(22) Filed: Nov. 18, 2021

(65) Prior Publication Data
US 2022/0163836 A1    May 26, 2022

Related U.S. Application Data

(60) Provisional application No. 63/116,751, filed on Nov. 20, 2020.

(51) Int. Cl.
| | | |
|---|---|---|
| G02F 1/137 | (2006.01) | |
| G02F 1/1347 | (2006.01) | |
| E06B 9/24 | (2006.01) | |
| G02F 1/1333 | (2006.01) | |
| B60J 3/04 | (2006.01) | |

(52) U.S. Cl.
CPC .......... *G02F 1/13725* (2013.01); *E06B 9/24* (2013.01); *G02F 1/13475* (2013.01); *G02F 1/133305* (2013.01); *B60J 3/04* (2013.01); *E06B 2009/2464* (2013.01); *G02F 2202/28* (2013.01)

(58) Field of Classification Search
CPC ............ G02F 1/13725; G02F 1/13475; G02F 1/133305; G02F 2202/28; E06B 9/24; E06B 3/6722; E06B 2009/2464; B60J 3/04; B60J 1/00
See application file for complete search history.

(56) References Cited

U.S. PATENT DOCUMENTS

| 2018/0195340 A1* | 7/2018 | Satoh ................... E06B 9/24 |
| 2019/0366811 A1* | 12/2019 | O'Keeffe .............. B60W 40/02 |
| 2021/0240012 A1* | 8/2021 | Lim .................... G02F 1/13363 |

FOREIGN PATENT DOCUMENTS

| JP | 2018095228 A | * | 6/2018 |
| JP | 2018172037 A | * | 11/2018 |
| WO | WO-2022009946 A1 | * | 1/2022 |

* cited by examiner

*Primary Examiner* — Jia X Pan
(74) *Attorney, Agent, or Firm* — PV IP PC; Wei Te Chung; Zhigang Ma

(57) ABSTRACT

Described herein are liquid crystal (LC) assemblies that are dimmable and techniques for manufacturing LC assemblies. In some embodiments, an LC assembly includes a Guest-Host (GH) liquid crystal layer containing nematic liquid crystals, dye molecules, and a chiral dopant. The GH liquid crystal layer is located between a pair of substrates. The LC assembly is a film assembly, with each of the substrates including a flexible film and a conductive layer formed on the flexible film. The substrates are separated by spacers that define a cell gap. The GH liquid crystal layer is configured to transition the LC assembly between darkened and lightened states depending on the voltage across the conductive layers. The flexible films allow the LC assembly to conform to the surface of a window or other rigid surface to which the LC assembly is attached. The LC assembly can be attached via a liquid or film-based adhesive.

29 Claims, 28 Drawing Sheets

FIG. 2A  FIG. 2B

LIQUID CRYSTAL ASSEMBLY

RELATED APPLICATIONS

This application claims the benefit and priority of U.S. Provisional Application No. 63/116,751, filed Nov. 20, 2020, the content of which is hereby incorporated by reference in its entirety and for all purposes.

BACKGROUND

The present disclosure relates generally to a liquid crystal assembly and, more specifically, to various structures incorporating a liquid crystal cell and methods for producing such structures. The present disclosure also relates to a liquid crystal assembly that is dimmable through electrically adjusting the light transmittance of one or more liquid crystal cells in the liquid crystal assembly.

BRIEF SUMMARY

The present disclosure relates to a liquid crystal (LC) assembly that includes one or more liquid crystal cells. An LC cell includes liquid crystal particles contained within a multilayer stack that can include, among other things, electrically conductive layers and protective substrates. An LC assembly is usually structured as a panel with a relatively large (in comparison to surfaces along the thickness dimension) surface area for receiving light on one side and transmitting the light through an opposing side. In some embodiments, an LC assembly is electrically controllable to vary the light transmittance of the LC assembly. In embodiments featuring an LC assembly with multiple cells, each cell may correspond to a different segment along a surface of the LC assembly, and the cells may be individually controlled to vary the transmittance of that segment without affecting the transmittance of other segments. The dimmable LC assemblies disclosed herein can be used in a variety of settings, including vehicular settings (e.g., a car/automotive window) and architectural settings (e.g., a window of a building).

The structure of an LC assembly may depend on the setting and the application in which the LC assembly is to be used. For instance, LC assemblies used in a vehicular setting may include flexible materials for impact resistance and/or adhesive materials for protection against separation into many pieces (fragmentation) in the event of breakage. An LC assembly used in a vehicular setting preferably behaves like a safety glass having multiple layers, where the multiple layers are capable of breaking into smaller pieces with the pieces remaining adhered to an adhesive layer or substrate of the LC assembly. Further, an LC assembly including one or more flexible layers (e.g., a flexible substrate) may be easier to install and more tolerable to physical manipulation such as bending. Further, since optical clarity is important in a vehicular setting, a dimmable LC assembly may be configured to provide for variable transmittance with minimal haze or scattering of light. This would allow a user to see clearly through the LC assembly regardless of how the light transmittance is changed.

The present disclosure also relates to techniques for producing liquid crystal assemblies using a manufacturing process that involves laminating together layers of different material. In some embodiments, techniques are applied to incorporate a curved layer (e.g., a glass panel) into an LC assembly. This would enable the LC assembly to be formed into a shape suitable for use as a window in a vehicle or in any other application that might require a curved LC assembly.

In some embodiments, a dimmable LC assembly may be controlled based on one or more sensors configured to collect data about the environment around the LC assembly, e.g., optical and/or temperature sensors. The sensor data can be processed to automatically perform dimming in response to changes in the environment, such as variations in the location or the brightness of a light source in the environment.

In some embodiments, techniques are applied to laminate an LC assembly at a lower temperature and/or pressure than would typically be used. In particular, an LC assembly suitable for use in a vehicular setting may include one or more polyvinyl butyral (PVB) layers. Lamination of PVB typically involves temperatures and pressures that are above those which components of an LC assembly can withstand. For instance, spacers separating opposing substrates that define the walls of an LC cell are prone to deformation and/or dislocation in the presence of heat. High temperature can also create defects in the LC cell itself, such as dark spots. Accordingly, in some embodiments, the temperature and/or pressure is lowered by performing lamination in a vacuum environment.

In some embodiments, techniques are applied to laminate an LC assembly including one or more ultraviolet (UV) blocking layers. Due to the presence of the one or more UV blocking layers, UV curing of adhesives may not be available as a method of joining together two or more components, for instance, gluing a spacer or gasket to a substrate. The inclusion of a UV blocking layer can be for any number of reasons. For instance, to form a twisted nematic (TN) liquid crystal display, polarizers are added on opposing sides of an LC cell or introduced as part of the LC cell itself. A polarizer can include a polarizer plate plus a protective coating designed to protect the polarizer plate against damage. This protective coating may be formed of a material that blocks UV light (e.g., cellulose triacetate (TAC)) to the extent that any UV light that is able to pass through the polarizer is insufficient to fully cure a UV adhesive. Accordingly, in some embodiments, non-UV adhesives are used and may include, for example, an epoxy adhesive or a heat-activated adhesive. Such alternative adhesives may introduce additional challenges that are not present when using a UV adhesive. For instance, epoxy adhesives have limited working time before the adhesive sets, so the time window within which parts to be joined can be repositioned (e.g., to correct a misalignment) may be brief. Further, as indicated above, introducing heat may damage components that are sensitive to high temperature, such as spacers within an LC cell or the LC cell itself.

As indicated above, in some embodiments, LC assemblies may include one or more flexible layers. LC assemblies described herein may include rigid and/or flexible substrates. In particular, a substrate can be formed as a flexible film (e.g., a layer of flexible material having a thickness of approximately 200 µm or less) that includes a coating of electrically conductive material. Flexible substrates can include TAC (triacetate), polycarbonate (PC), polyethylene terephthalate (PET), or other flexible material. Flexible substrates can be used to construct flexible LC assemblies. For example, an LC assembly can be formed which is devoid of glass or other rigid substrates and of sufficient thinness to allow the overall LC assembly to act as a flexible film. An LC assembly incorporating one or more flexible films is referred to herein as an LC film assembly. If an LC assembly is formed using rigid substrates (e.g., an LC cell including or encased between glass panels), such an assembly can be used as a standalone window. Alternatively, some embodiments feature a flexible substrate that permits the LC assembly to be applied as an add-on to a window or other ready-made rigid surface (e.g., as a thin film and using a clear, water-based or solvent-based adhesive). A flexible LC assembly is advantageous when the surface to which the LC assembly is being applied is a curved surface, since the LC assembly would be able to conform to the curvature of the surface and thereby eliminate or at least substantially minimize the presence of air bubbles or gaps between the LC assembly and the surface.

Techniques described herein for manufacturing an LC assembly can be implemented using a computer system with one or more processing units (e.g., general purpose processors) that can be configured to perform particular operations or actions (e.g., controlling temperature and/or pressure) by virtue of having access to software, firmware, hardware, or a combination thereof installed on the system. One or more computer programs can be configured to perform particular operations or actions by virtue of including instructions are executable by the one or more processing units. The one or more computer programs can be stored on non-transitory computer readable media (e.g., computer storage devices that form memory) accessible to the one or more processing units.

BRIEF DESCRIPTION OF THE DRAWINGS

FIGS. 2A to 2C show examples of ways in which a dimmable LC assembly can be segmented.

Figure 1:
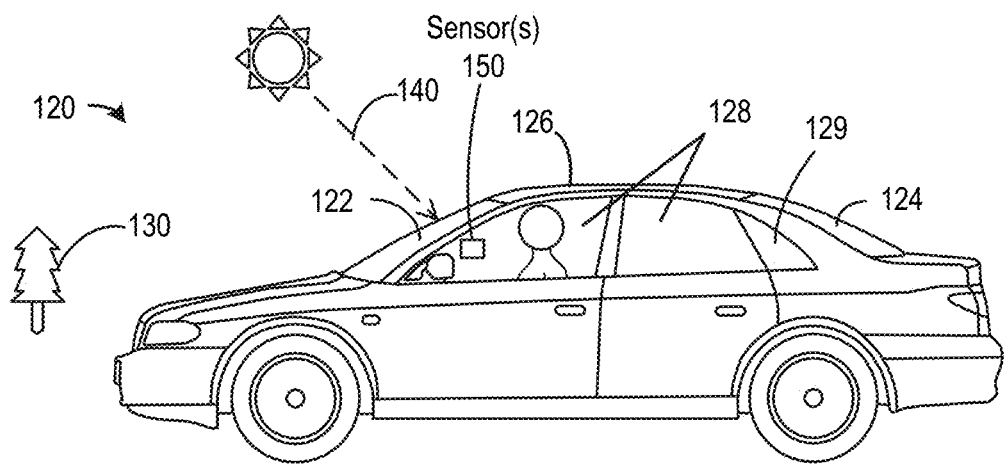
FIG. 1 illustrates an example of an environment in which an LC assembly can be used.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

The present disclosure relates to a liquid crystal (LC) assembly that includes one or more liquid crystal cells. In some embodiments, an LC assembly is electrically controllable to vary the light transmittance of the LC assembly, i.e., dimmable. In embodiments featuring an LC assembly with multiple cells, each cell may correspond to a different segment along a surface of the LC assembly, and the cell may be individually controlled to vary the transmittance of that segment without affecting the transmittance of other segments. The dimmable LC assemblies disclosed herein can be used in a variety of settings, including vehicular settings (e.g., a car/automotive window) and architectural settings (e.g., a window of a building).

As used herein, the term "dimmable" refers to the ability to vary light transmittance up or down by means of one or more control signals. For instance, an LC cell may include a pair of electrodes on opposite sides of the liquid crystal layer, where a voltage applied across the electrodes causes the liquid crystal particles (e.g., individual liquid crystal molecules) to align in such a way that the LC cell is darkened by reducing the amount of light that is able to pass through the LC cell. There are various types of dimmable LC cells, including twisted nematic (TN), Guest-Host (GH), vertical alignment (VA), and others. Dimmable LC cells can be configured so that the light transmittance is highest when the value of the control signal is at its lowest (e.g., zero volts). Such cells are sometimes referred to as being "normally-white" (NW). Alternatively, dimmable LC cells can be configured so that the light transmittance is lowest when the value of the control signal is at its lowest/zero volts, "normally-black" (NB).

Embodiments of the present disclosure can be used to implement liquid crystal displays (LCDs), including LCDs that are dimmable. Although LCD structures are not specifically discussed, it will be understood that an LC assembly described herein can be adapted to form an LCD through, for example, the addition of a mono-color or multi-color (e.g., red-green-blue) backlight.

Some embodiments of the present disclosure relate to a window or LC assembly that is curved, so that a surface of the window or LC assembly has a three-dimensional curvature (e.g., convex toward the exterior environment) instead of being flat.

The present disclosure also relates to techniques for manufacturing LC assemblies, including LC assemblies that are dimmable by electrically controlling the light transmittance of one or more LC cells in the LC assembly. Some embodiments are directed to dimmable assemblies that can be used as or incorporated into windows. In general, a window is any substantially rigid structure through which light can be transmitted. In the case of a dimmable window, the degree to which light can be transmitted through the window is controllable within a range of transmittance values. A window can be curved or flat, can have any number of shapes (rectangular, triangular, circular, etc.), and can be enclosed within a frame or be frameless. Additionally, one important aspect of windows that are intended for viewing is optical clarity, e.g., lack of haze/cloudiness, dark spots, or visual distortion.

In order to make an LC assembly, in particular a dimmable LC assembly, suitable for use as, or in, a window and in a safety critical environment, specific types of materials and methods for combining such materials with other components of an LC assembly to form a laminated structure are described herein. An example of a safety critical environment is an automobile, shown in FIG. 1. Other types of environments that can benefit from an LC assembly according to an embodiment described herein include, for example, aircrafts (e.g., airplanes), spacecrafts, watercrafts (e.g., boats), public or commercial vehicles (e.g., trucks or passenger buses), or other vehicles, and architectural environments. For instance, an LC assembly can be used for a window of a building, a glass wall, or a door of a building.

FIG. 1 illustrates an example of an environment in which an LC assembly can be used. As depicted in FIG. 1, an automobile 120 can include a front windshield (also known as a windscreen) 122, a rear windshield 124, a sunroof 126, and side windows 128. In the example of FIG. 1, automobile 120 further includes a quarter glass window 129. Quarter glass windows are generally smaller than the side windows of an automobile and are usually located above a rear wheel or next to a side-view mirror. Due to its location relative to the body of the automobile, a quarter glass window is usually substantially triangular. In general, each of the windows 122, 124, 126, 128, and 129 is curved, with the degree of curvature varying across windows. For instance, a window of automobile 120 may exhibit a three-dimensional curvature such that one surface of the window is convex (e.g., a surface facing the exterior environment) and an opposing (e.g., inner) surface is concave. In the example of FIG. 1, an LC assembly can form or be retrofitted onto any of the windows 122, 124, 126, 128, and 129. The automobile 120 can also include one or more sensors 150 which, as discussed below, can be used to control the dimming of an LC assembly in the automobile 120.

Vehicles can move between different lighting situations rapidly, for example, going from an open road that is well lit by sunlight to a darkened tunnel. Because the lighting situation is subject to change, it can be beneficial to make at least some of the windows 122, 124, 126, 128, or 129 dimmable. For instance, making the front windshield 122 dimmable could increase the comfort of the driver, and therefore driving safety, if the dimming of the front windshield 122 were controlled to reduce light transmittance when the ambient environment is relatively bright and/or to increase light transmittance when the ambient environment is relatively dark. Dimming can be performed to, for example, prevent the driver from being blinded or dazzled when the intensity of the ambient light is above a threshold (e.g., when the front windshield 122 or a portion of the front windshield 122 that is near the driver receives direct sunlight) or when transitioning to a brighter environment after the driver's eyes have become dark-adapted from being in a darker environment for a threshold period of time.

Dimming can be controlled in other ways to enhance safety and/or comfort for a driver or passenger of an automobile. For instance, prolonged exposure to bright light, especially sunlight, tends to increase the temperature within the cabin of an automobile. Light transmittance can therefore be decreased based on the cabin temperature being above a threshold. Dimming can be performed based on the amount of ambient light, temperature, temperature in combination with the amount of ambient light, and other factors or combinations of factors. Accordingly, in some embodiments, the one or more sensors 150 may include an optical sensor and/or other type of sensor (e.g., a temperature sensor, or light intensity sensor) that is deployed together with a dimmable LC assembly and a control unit configured to vary the light transmittance of the dimmable LC assembly based on data from the sensor(s). Such sensors 150 can be in various locations throughout the automobile 120 and, in some instances, may be integral with or attached to a window, e.g., as part of an LC assembly.

Another example of a sensor 150 that can be used to control dimming is an occupant sensor configured to detect the presence of a person in the automobile 120, for example, based on a seatbelt being engaged, pressure of the occupant's bodyweight against a seat, capturing an image of the occupant by an in-vehicle camera, and so on. The light transmittance of a window near or facing an occupant can be controlled to increase the occupant's comfort, and occupant sensing can be incorporated into a decision of the control unit as to whether to adjust transmittance and, if so, to what extent. For example, it may be unnecessary to adjust the transmittance of a window when there is no occupant facing the window. This is may be true even in the case of the front windshield 122, as the automobile 120 could be a self-driving or teleoperated vehicle with no person sitting in the driver's seat.

Although dimmable LC assemblies exist for use in other types of applications, incorporating a dimmable LC assembly into a window in a safety critical environment is challenging. As indicated above, the windows 122, 124, 126, 128, or 129 are generally curved. Thus, a dimmable LC assembly should also be curved or capable of conforming to the curvature of a window to which the dimmable LC assembly is applied. Further, automobile windows are often subject to stringent regulations designed to ensure safety. For example, Regulation No. 43 of the Economic Commission for Europe of the United Nations sets forth various performance requirements for different types of vehicle windows. Types of windows governed by Regulation No. 43 include "toughened-glass" (a single layer of glass that has been specially treated to increase its mechanical strength and to condition its fragmentation after shattering), "laminated-glass" (two or more layers of glass held together by one or more interlayer of plastic material), "treated laminated glass" (where at least one of multiple glass layers has been specially treated to increase its mechanical strength and to condition its fragmentation after shattering), and "ordinary laminated glass" (where none of the glass layers has been treated).

The performance requirements specified in Regulation No. 43 relate to fragmentation resistance, mechanical strength (e.g., ball drop tests), abrasion resistance, temperature resistance, radiation resistance, humidity resistance, light transmission, optical distortion, color, fire resistance, and other characteristics. Complying with regulations such as Regulation No. 43 can be difficult when modifying an automobile window to include a dimmable LC assembly and may also present limitations on how the dimmable LC assembly can be manufactured.

FIG. 2A shows a windshield 210 that is dimmable. The windshield 210 is dimmable by virtue of having a dimmable LC assembly formed integrally therewith or attached thereto. The windshield 210 is divided into multiple segments 202-1 to 202-3, each segment 202 being independently dimmable. For instance, each segment 202 may correspond to an LC cell that can be dimmed by applying a voltage across electrodes of the LC cell. In the example of FIG. 2A, the segments are arranged vertically. The segments 202 of the windscreen 210 can be controlled individually or jointly to selectively darken different regions of the windscreen 210.

Figure 2C:
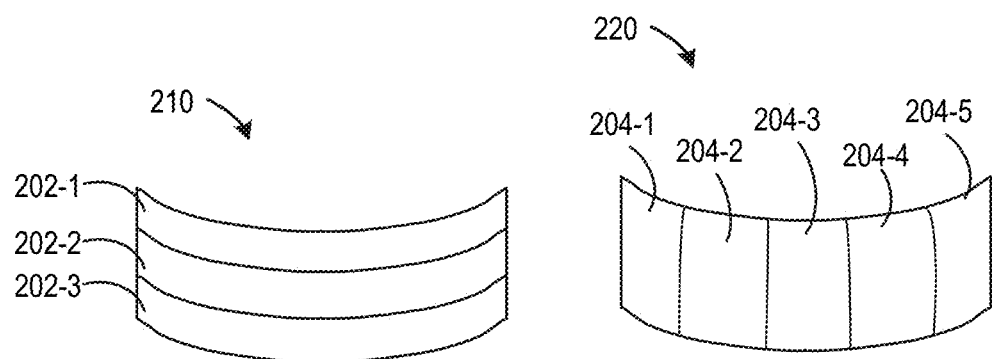
Figure 2C:
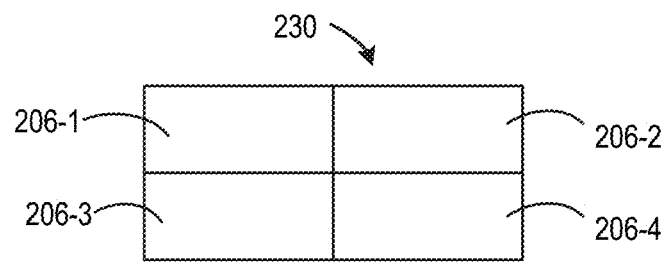

FIG. 2B shows a windshield 220 with segments 204-1 to 204-5 that are arranged horizontally. Dimmable segments can also be arranged in two dimensions, as shown in FIG. 2C. In FIG. 2C, a sunroof 230 is divided into four segments 206-1 to 206-4. Each segment 206 may, for example, be located above a different seat of an automobile.

The segmentation illustrated in FIGS. 2A to 2C can be achieved by forming each segment as a standalone LC assembly. For example, each segment 206 can be formed as a separate LC assembly. When placed together next to each other, the LC assemblies may be separated by small gaps that are nonetheless imperceptible to the unaided eye. Alternatively, the segments 206 may correspond to different cells within a single LC assembly that has been partitioned to provide isolated chambers of liquid crystal material. The thickness of the material (e.g., rubber gaskets or other types of sealants) separating adjacent cells of such an LC assembly may also define gaps that are imperceptible or at least difficult to detect at a glance from a normal viewing distance. For example, gaps in a windscreen may be difficult to see when sitting in the driver's seat and looking through the windscreen. Segmentation can also be applied to a single LC cell through patterning of conductive layers to form multiple pairs of electrodes that share the same volume of liquid crystal. As shown in FIGS. 2A to 2C and in the example of FIG. 4 (discussed below), an LC assembly can be segmented in any number of ways, including with different partitioning schemes or with different shapes of segments.

Figure 3A:
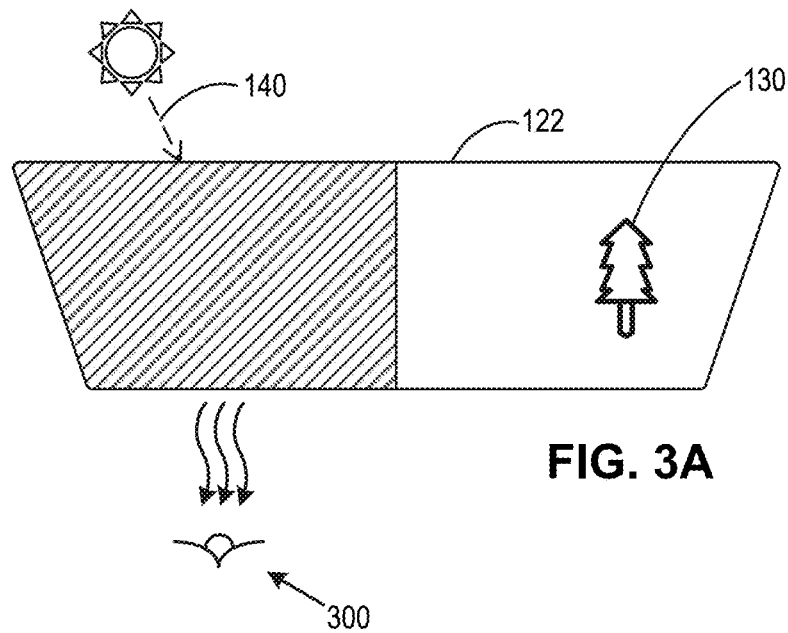
FIGS. 3A to 3C illustrate examples of different control schemes for selectively dimming segments, according to some embodiments.
Figure 3B:
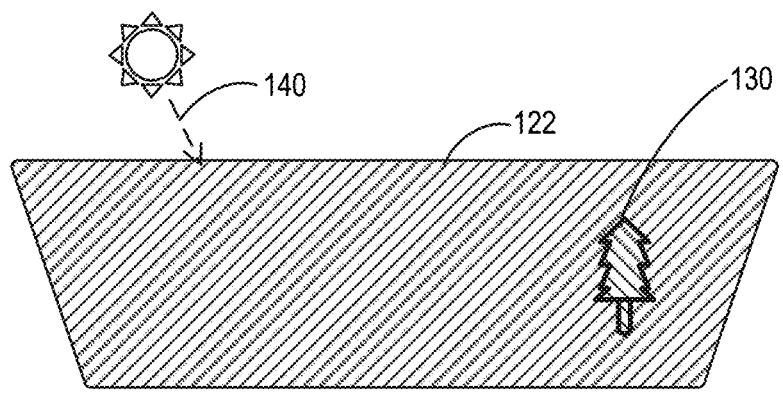
Figure 3C:
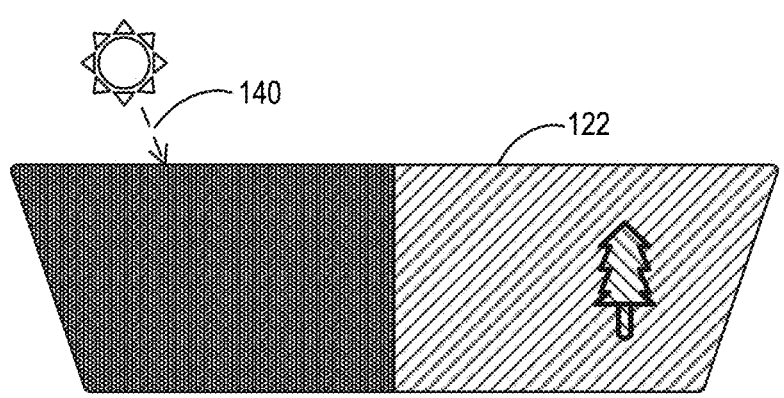

FIGS. 3A to 3C illustrate examples of different control schemes for selectively dimming segments, according to some embodiments. In FIG. 3A, the transmittance of the left (e.g., driver) side of the windshield 122 is reduced to cause a corresponding reduction in the amount of sunlight 140 that travels through the windshield 122 to reach an eye 300 of a person in the automobile 120. Dimming can be performed manually or, as discussed above, automatically based on sensor data. In FIG. 3B, the entire windshield 122 is darkened. The darkening in FIG. 3B can be achieved by jointly controlling every segment of the windshield 122. In FIG. 3C, the left side of the windshield 122 is made darker than the right side to combat glare from the sunlight 140.

Dimmable LC assemblies described herein can be configured to allow light transmittance to be varied within a predefined range such that even at the lowest level of transmittance, at least some light is able to travel through the LC assembly. For example, as shown in FIG. 3B, a tree 130 outside the automobile 120 remains visible even after dimming the entire windscreen. The ability to see through the windscreen is critical to operating an automobile and highlights an important difference between dimmable LC technology designed for safety and comfort versus dimmable LC technology designed for other types of applications such as privacy. In the former, the light transmittance can be finely controlled through many gradations of transmittance levels, and it is usually desirable to maintain a high level of optical clarity. In contrast, dimmable LC assemblies that are designed to operate as privacy screens (e.g., to shield a meeting room against prying eyes) typically have binary modes of operation: the liquid crystal is either transparent or opaque. Further, in the context of a privacy screen, opacity does not necessarily mean reducing light transmittance to zero or close to zero. Instead, the opaque mode can be one in which some light is still transmitted, but an image seen through the privacy screen is blurry or hazy.

Figure 4:
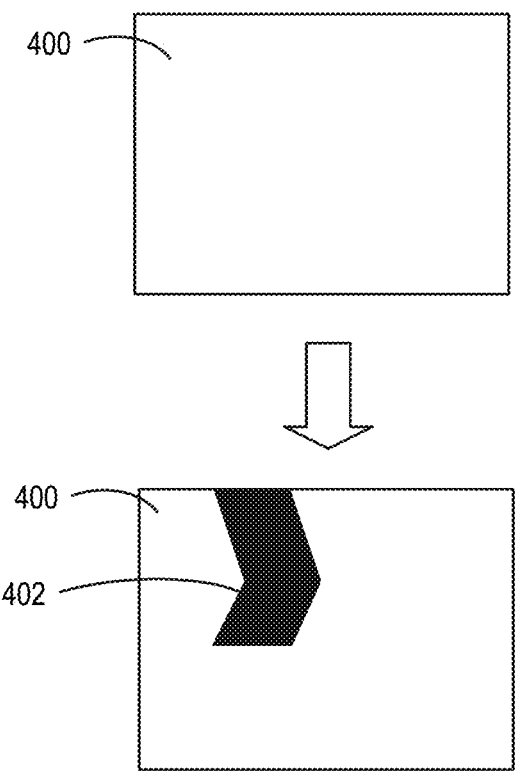
FIG. 4 shows an example of an LC assembly including a dimmable segment that is asymmetric, according to an embodiment.

FIG. 4 shows an example of an LC assembly 400 including a dimmable segment 402 that is asymmetric, according to an embodiment. The segment 402 is shaped as a polygon. However, segments can be formed in any shape based on the geometry of the LC cells to which the segments correspond. An LC assembly that includes a dimmable segment can also include one or more non-dimmable segments. For example, the entire area outside of the segment 402 could be made non-dimmable by omitting from this area one or more components that contribute to the dimming capabilities of the segment 402. For instance, the area outside of the segment 402 may not have electrodes or polarizers.

Figure 5A:
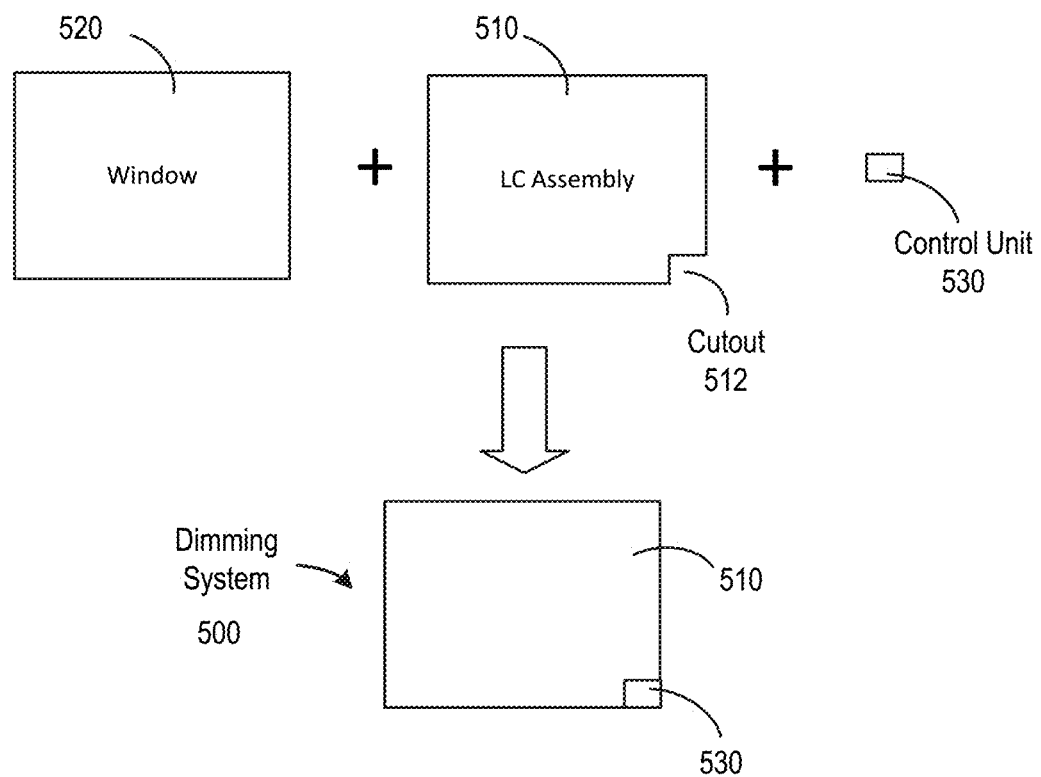
FIGS. 5A and 5B show an example of a dimming system according to an embodiment.
Figure 5B:
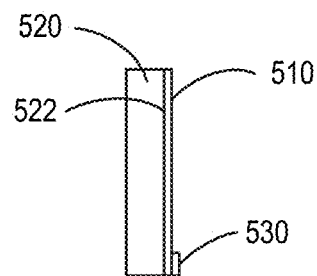

FIGS. 5A and 5B show an example of a dimming system 500 including an LC assembly 510 attached to a window 520, according to an embodiment. The LC assembly 510 may correspond to any of the dimmable LC assemblies described herein. For instance, LC assembly 510 can include a twisted nematic (TN) liquid crystal cell which, as discussed below, includes polarizers on opposite sides of the liquid crystal layer. As shown in FIG. 5A, the LC assembly is substantially the same size and shape as the window 520, except that the LC assembly includes a small cutout 512 in one corner. The cutout provides space for attachment of a control unit 530 to the window 520. Accordingly, the dimming system 500 corresponds to an overall LC assembly formed by combining LC assembly 510, window 520, and control unit 530. FIGS. 5A and 5B are merely an example. In other implementations, the control unit 530 may be located elsewhere, for example, located at the center of the window 520 and attached to a surface of the LC assembly 510 rather than being directly attached to the window 520. In practice, the LC assembly 510 and the window 520 may not completely overlap. For example, LC assembly 510 could be smaller than the window 520 by 1 millimeter or more on each side. However, the LC assembly 510 can be manufactured in different size configurations to match various window sizes.

The LC assembly 510 and the control unit 530 can be provided in a kit that can further include a flexible cable for electrically coupling the LC assembly 510 and the control unit 530, an adhesive for attaching the LC assembly 510 and/or the control unit 530 to the window 520, a tool for squeezing out air bubbles between the LC assembly 510 and the window 520 (e.g., a squeegee), and/or other accessories that facilitate installation of the various components of the dimming system 500.

FIG. 5B is a side view of the dimming system 500. As shown in FIG. 5B, the LC assembly 510 is attached to a surface 522 of the window 520. The window 520 may comprise a rigid glass and can be, for example, an architectural window or an automotive window (e.g., a sunroof). Although not strictly necessary, it is generally preferable for the surface 522 to be an interior surface of the window 520, e.g., facing the cabin of an automobile or the inside of a building or room. Such placement would protect the LC assembly 510 against damage or contaminants from the exterior environment. LC assembly 510 can be attached to the surface 522 in various ways. One option for attaching LC assembly 510 is to use a transparent adhesive that can be sprayed or otherwise applied to the surface 522 and/or to a surface of the LC assembly 510. The adhesive can be water-based or solvent-based. For instance, the adhesive could be a solution of water mixed with soap. After wetting the LC assembly 510 or the surface 522 with the solution, the LC assembly 510 can be placed in contact with the surface 522 and the solution causes the LC assembly 510 to cling to surface 522 in the manner of a thin film. Once the solution dries, the soap forms a bond that holds the LC assembly 510 to the surface 522. The bond may be of sufficient strength to keep the LC assembly 510 from falling off but weak enough to permit manual removal of the LC assembly. The control unit 530 can be attached to the window 520 in a similar manner, using the same or a different adhesive. Alternatively, the control unit 530 may be attached to the LC assembly 510 through a socket or connector so that the control unit 530 is held in place with respect to the window 520 but without being directly attached to the window.

In some embodiments, LC assembly 510 may include a ready-applied adhesive on a window-facing surface thereof. Such an adhesive could be applied at a time of manufacturing the LC assembly 510 and can, for example, be a liquid adhesive that is sprayed onto the window-facing surface and allowed to cure. Alternatively, the ready-applied adhesive could be a film-based adhesive. The film-based adhesive may be carried on a transparent, flexible film, e.g., similar to that of single-sided or double-sided tape. Further, the film-based adhesive may cover the cutout 512 to permit attachment of the control unit 530 without a separate adhesive. The ready-applied adhesive could be covered by a temporary protective film so that the LC assembly 510 can be installed onto the window 520 in a peel-and-stick manner.

As shown in FIG. 5B, the LC assembly 510 can be significantly thinner than the window 520. Further, the LC assembly 510 can be formed using a flexible substrate and may optionally include additional layers that are flexible. Traditional liquid crystal cells are formed with liquid crystal material sandwiched between a pair of rigid substrates (e.g., glass). According to some embodiments, a flexible substrate can be substituted for at least one of these rigid substrates. Moreover, a flexible substrate can be used as a window-facing layer of the LC assembly 510. Including a flexible substrate is advantageous because it allows the LC assembly 510 to conform to the surface 522 of the window. Although the surface 522 is shown as being flat, there can be minor differences in height along the surface 522. These differences may be imperceptible to the unaided eye but can lead to gaps or air bubbles between the LC assembly 510 and the surface 522. The gaps or air bubbles may be noticeable to a user and can also increase the chances of the LC assembly 510 becoming delaminated from the window 520. A flexible substrate would reduce the number of occurrences of such gaps or air bubbles, and gaps or bubbles that remain can be squeezed out by applying manual pressure or using a tool such as a squeegee or rolling pin. The squeezing can be performed, for example, before the adhesive solution dries. Additionally, as mentioned above, some windows are curved. Including a flexible substrate would help the LC assembly 510 conform to the curvature of such a window, for example, one of the windows 122, 124, 126, 128, or 129 in FIG. 1.

Control unit 530 is configured to vary the light transmittance of the LC assembly 510 by outputting one or more control signals to the LC assembly 510. The cutout 512 may permit the control unit 530 to be attached separately from the LC assembly. Accordingly, control unit 530 can include an electrical interface to the LC assembly 510. The electrical interface can include a physical connector for establishing a wired connection to electrodes of the LC assembly 510. For example, the LC assembly 510 may include a connector that can be coupled to the connector of the control unit via a flexible cable or via direct coupling of the connectors. Control unit 530 can be attached to the window 520 in a similar manner to the LC assembly 510, e.g., using the same adhesive. A more detailed example of a control unit is described below in reference to FIG. 6A.

In an alternative embodiment, LC assembly 510 may not include any cutout to accommodate the control unit 530. Instead, control unit 530 may be located outside the area of the window 520 (e.g., mounted on a wall next to the window 520) or on the LC assembly 510 itself. In general, there are no restrictions on where the control unit 530 can be placed so long as the control unit 530 is able to supply its control signal(s) for varying the transmittance of the LC assembly 510. For example, in an automobile, the control unit 530 could be co-located with or integral to an electronic control unit (ECU) of the automobile and could be connected to multiple LC assemblies via cables running inside the body of the automobile. As another example, if the window 520 has a frame, the control unit 530 could be placed along an edge or corner of the frame. Alternatively, in some embodiments, the control unit 530 can be formed integrally with the LC assembly 510 or pre-attached to the LC assembly (e.g., via a film-based adhesive that is also used to attach the LC assembly) so that the LC assembly 510 and the control unit 530 are installed onto the window 520 as a single unit.

Control unit 530 can be powered by an internal battery or an external power source. In some embodiments, such as the embodiment shown in FIG. 6A, the power source is a rechargeable battery. Various recharging methods can be used to replenish the energy stored in the battery. For example, a photovoltaic cell can be used to recharge the battery using ambient light, as shown in FIG. 6A.

FIGS. 5A and 5B show an example of a dimming system in which an LC assembly is applied as an "after-market" product to a window. That is, the LC assembly is manufactured separately from the window and can be attached, for example, by a manufacturer or user of the window. However, in some embodiments, a dimmable LC assembly may be formed integrally with a window.

Figure 6A:
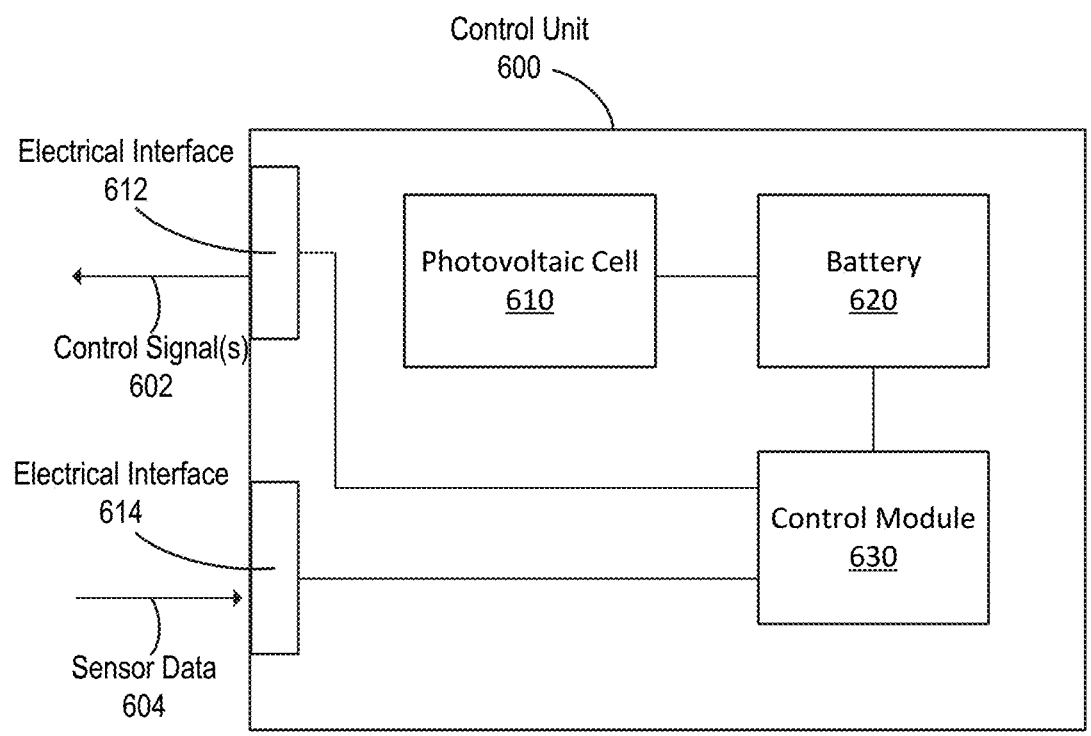
FIG. 6A is a simplified block diagram of a control unit according to an embodiment.

FIG. 6A is a simplified block diagram of a control unit 600 according to an embodiment. The control unit 600 may correspond to control unit 530 in FIG. 5A and includes a photovoltaic cell 610, a battery 620, and a control module 630. The photovoltaic cell 610, the battery 620, and the control module 630 can be co-located. For instance, control unit 600 may include a printed circuit board (PCB) onto which the photovoltaic cell 610, the battery 620, and the control module 630 are mounted. Control unit 600 may further include a housing with an opening or window that permits light to enter the photovoltaic cell 610.

Photovoltaic cell 610 is configured to convert light into an electrical signal that recharges the battery 620. If the control unit 600 is placed in an area not covered by the LC assembly (e.g., the cutout 512 in FIG. 5A), the photovoltaic cell 610 will be able to receive light unmodified by passage through the LC assembly. Alternatively, if the control unit 600 is placed such that the light received by the photovoltaic cell 610 is light that has passed through the LC assembly, the photovoltaic cell 610 will generate less energy when the light transmittance of the LC assembly is set lower. However, it can be expected that even at the lowest transmittance level, some light will pass through the LC assembly. Accordingly, the photovoltaic cell 610 may be able to recharge the battery 620 any time the LC assembly also receives light, but charging may be less efficient when there is no cutout.

Battery 620 can be any type of rechargeable battery and is preferably of a small form factor so as to minimize the footprint of the control unit 600. For instance, battery 620 could be a lithium-ion coin cell battery. Battery 620 supplies power to the control module 630 to enable the control module 630 to perform its operations.

Control module 630 can be implemented in hardware and/or software. For instance, control module 630 can be implemented using circuitry such as an integrated circuit (IC), a field-programmable gate array (FPGA), a microcontroller, and/or the like. Control module 630 is configured to set the transmittance level of an LC assembly through one or more control signals 602 that can be output from an electrical interface 612 of the control unit 600. For instance, electrical interface 612 may include a connector or socket adapted to receive a cable, where the cable includes a first wire leading to a first electrode of the LC assembly and a second wire leading to a second electrode of the LC assembly.

Control module 630 may set the transmittance level based on manual input or automatically. Manual input can be supplied, for example, through a touch sensor or physical button on the control unit 600. In some embodiments, control module 630 may set the transmittance level based on wireless commands from a user device, for example, commands sent from a mobile phone via a Bluetooth or Wi-Fi connection. In addition, or as an alternative to manual input, the control module 630 may use sensor data to determine a transmittance level to set. As discussed above, such sensors can include an optical sensor, a temperature sensor, or other types of sensors. Accordingly, as shown in FIG. 6A, the control unit 600 can include an additional electrical interface 614 through which sensor data 604 is received from one or more external sensors. In some implementations, the electrical interface 614 may be a wireless interface. Further, in some implementations, electrical interface 612 and electrical interface 614 are combined into a single interface, e.g., a communication bus.

The one or more sensors that provide the sensor data 604 can be in various locations, including on the LC assembly, on the window, on the control unit 600, or elsewhere in the environment (e.g., in the cabin of an automobile). Additionally, a sensor that provides the sensor data 604 can be part of the control unit 600 itself. For example, the photovoltaic cell 610 may be used as an optical sensor. Since the amount of energy produced by the photovoltaic cell 610 is proportional to the amount of light incident upon the photovoltaic cell 610, an output of the photovoltaic cell 610 (e.g., the electrical signal that recharges the battery 620) can be measured to determine the intensity of the ambient light. This determination can be performed by the control module 630, possibly taking into consideration the present transmittance level of the LC assembly depending on whether the photovoltaic cell 610 receives unmodified light or light modified by passage through the LC assembly. Alternatively, a separate optical sensor, such as a photodiode, may be provided. For example, a photodiode may be integrated into a window facing side of the LC assembly so that the photodiode receives light unmodified by passage through the LC assembly.

Figure 6B:
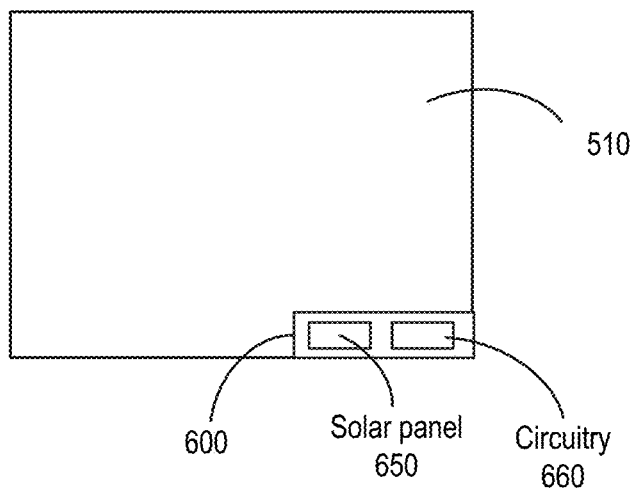
FIG. 6B shows an example arrangement of components of a control unit with respect to a window.

FIG. 6B shows an example of how components of the control unit 600 may be arranged with respect to the window 520. The window is shown in FIG. 6B as being covered by LC assembly 510, similar to FIG. 5A. In FIG. 6B, the control unit is located at the lower right corner of the window 520, similar to the arrangement depicted in FIG. 5A. As shown in FIG. 6B, the control unit 600 can include a solar panel 650 and circuitry 660. The solar panel 650 corresponds to one or more instances of the photovoltaic cell 610 and is arranged side by side with the circuitry 660. The circuitry 660 includes the control module 630 and, in some implementations, the battery 620 (e.g., control module 630 and battery 620 mounted on the same PCB). Alternatively, the solar panel 650 and the circuitry 660, could be stacked one on top of the other. For instance, the circuitry 660 may be placed on top of the solar panel 650 so that the circuitry 660 is farther from the window 520 than the solar panel 650.

Although the control unit 600 is depicted with a photovoltaic cell coupled to a battery, the power source for a dimmable LC assembly can have other forms. For example, the power source may be a disposable battery, a battery that is recharged by plugging into an external power supply, or an external power supply that is directly wired to the control unit 600. In embodiments featuring a photovoltaic cell, the LC assembly is usually in a normally-white configuration in order to reduce power consumption. Normally-white configurations may also be used in situations where the lightened state should be the default or fail-safe mode of operation, e.g., when the LC assembly is part of a motorcycle helmet visor. A normally-black configuration of a dimmable LC assembly may be used in applications where the darkened state is the usual mode of operation or where the usual mode of operation is the lightened state but the cost of maintaining an electric field across the conductors of the LC assembly is of less concern.

Figure 7A:
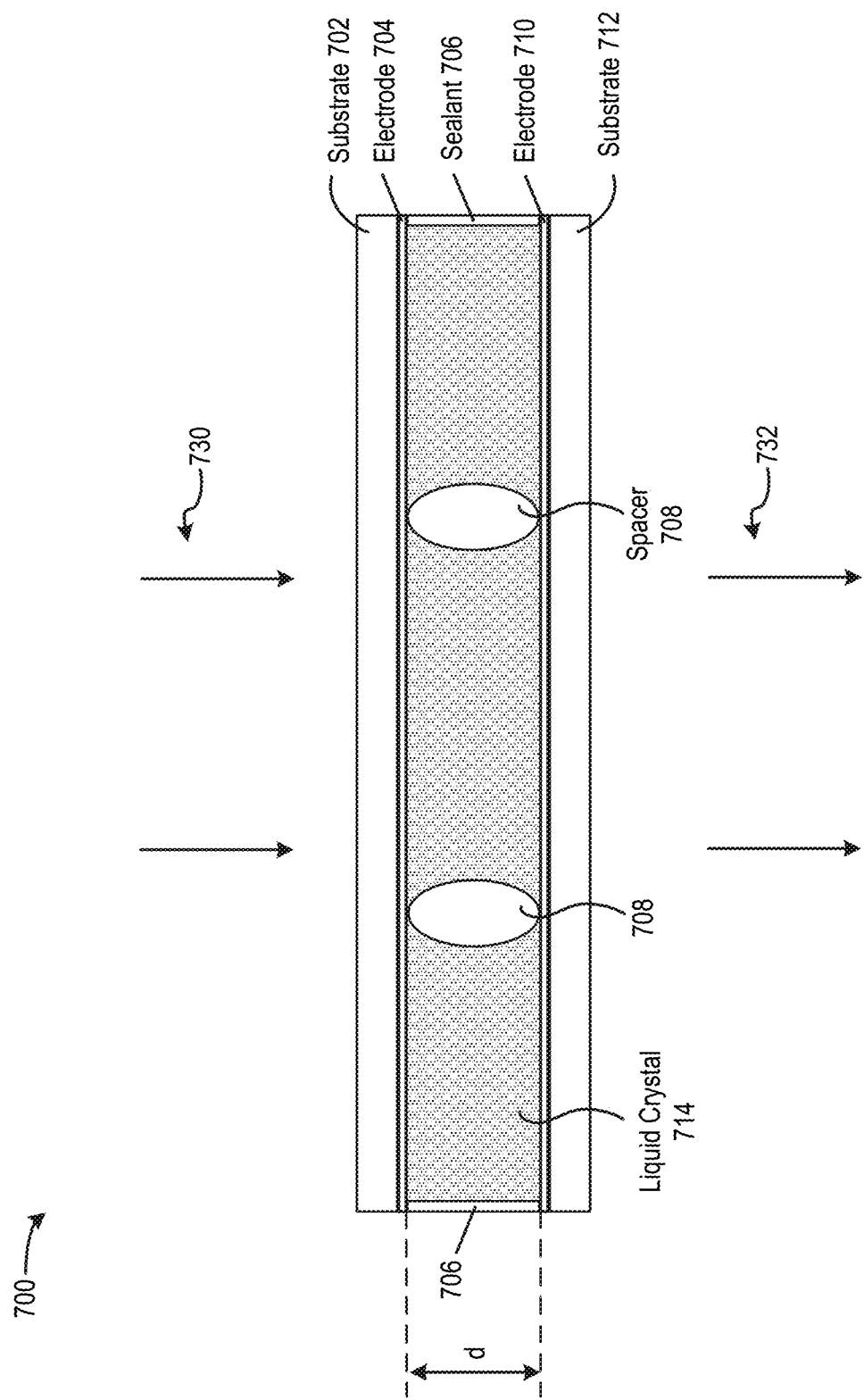
FIGS. 7A to 7C illustrate examples of liquid crystal cells that can be used to form an LC assembly according to some embodiments.
Figure 7B:
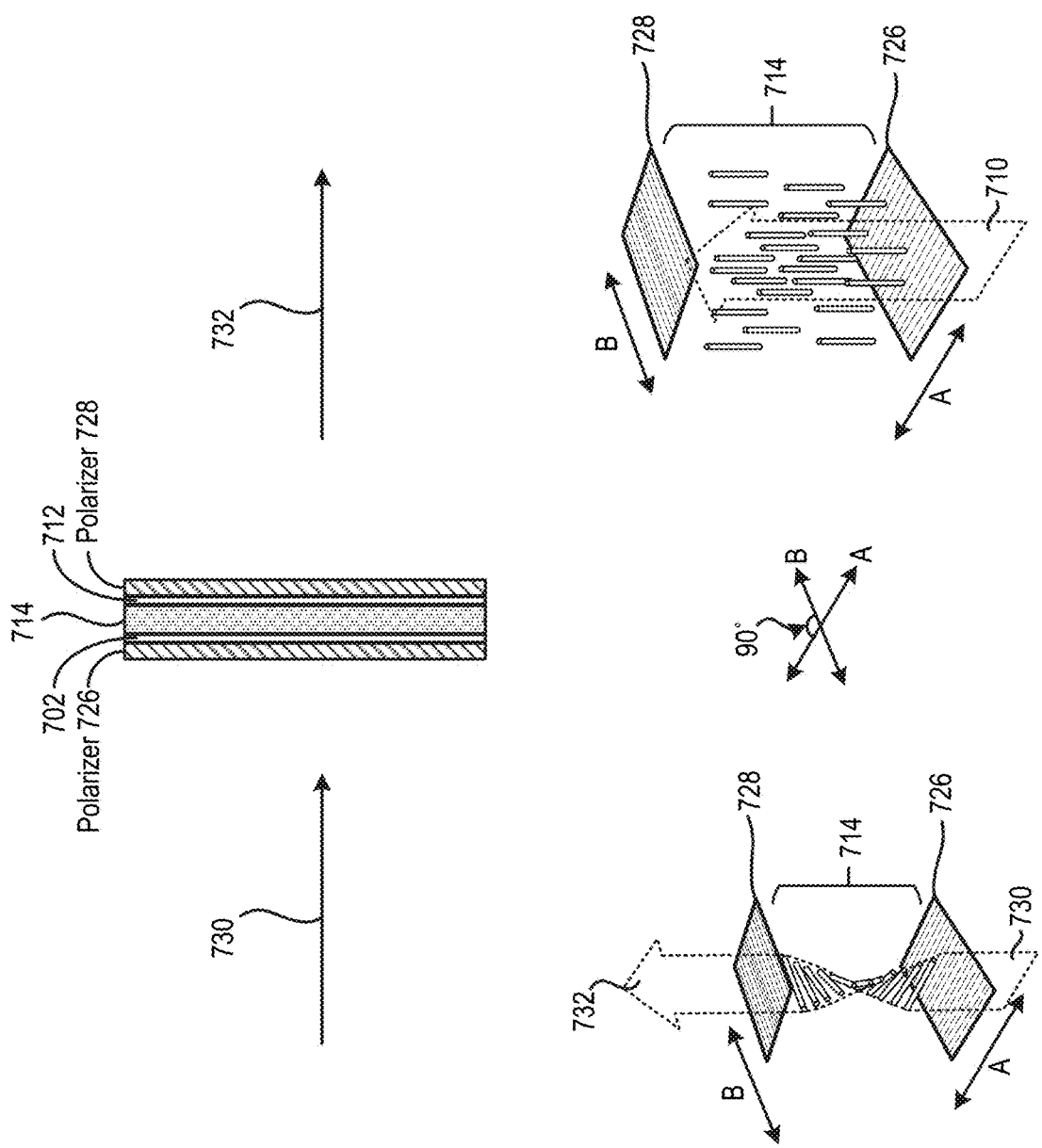
Figure 7C:
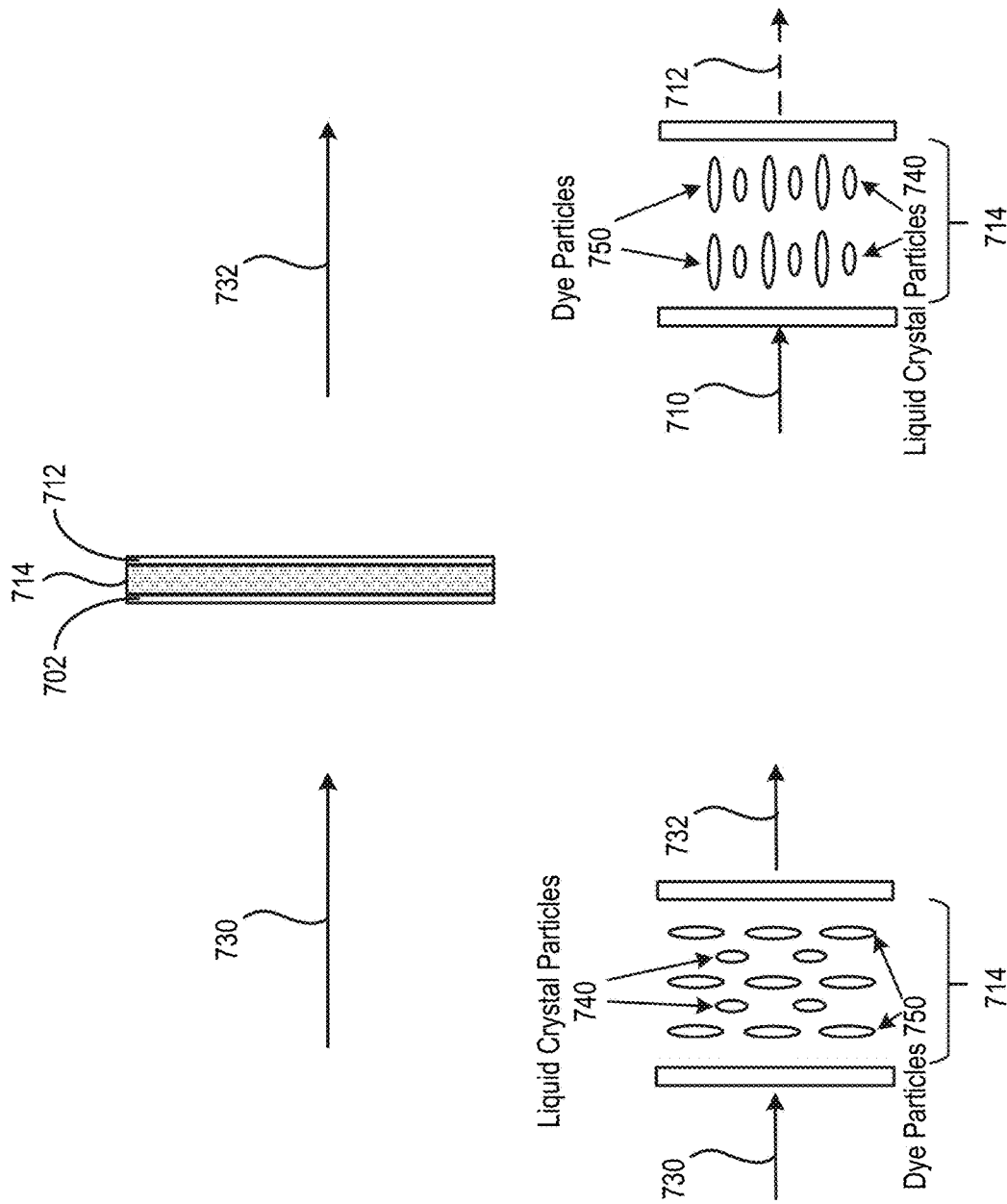

FIGS. 7A to 7C illustrate examples of liquid crystal cells that can be used to form an LC assembly according to some embodiments. In FIG. 7A, a liquid crystal cell 700 includes a first substrate 702, a first electrode 704, a sealant 706, spacers 708, a second electrode 710, a second substrate 712, and a liquid crystal 714.

First substrate 702 and second substrate 712 can be made of transparent materials to let incoming light 730 propagate through liquid crystal 714 to become outgoing light 732. First substrate 702 and second substrate 712 can be made of materials such as glass or some other rigid material. Alternatively, at least one of the substrates 702, 712 may be formed of a flexible material such as polycarbonate (PC), polyethylene terephthalate (PET), or cellulose triacetate (TAC), which allows liquid crystal cell 700 to conform to a curved surface such as a windshield, a curved architecture glass panel, etc.

Figure 14:
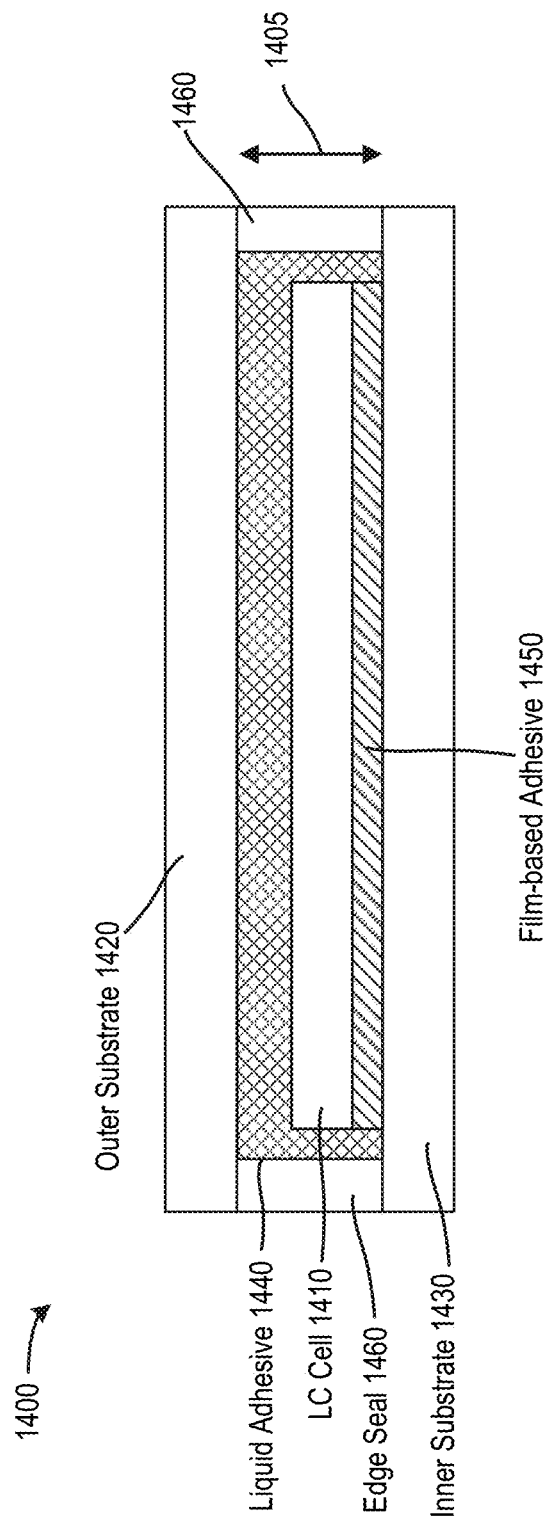
FIG. 14 shows an LC assembly with liquid and film-based adhesives, according to some embodiments.

Sealant 706 defines the sidewalls of the LC cell 700, with the cell space between first substrate 702 and second substrate 712 being filled by liquid crystal 714. Sealant 706 operates as a gasket that isolates the liquid crystal 714 against environmental influences and to securely confine the liquid crystal 714, which is sandwiched between the substrates 702 and 712. Sealant 706 can be formed of a plastic, elastomeric material, or other relatively soft material, for example, using plastic injection molding. Further, in some embodiments, an additional seal (not depicted in FIG. 7A) may be provided as a circumferential seal between the LC cell 700 and other layers (e.g., a glass panel) of an LC assembly incorporating the LC cell 700. When provided, such a circumferential seal may seal the sandwich structure in a "floating" manner by operating as a cushion between the sandwich structure and the other layers of the LC assembly. An example of such an additional seal is shown in FIG. 14 (described below) as an edge seal.

Spacers 708 can provide structural support between first substrate 702 and second substrate 712 to maintain a uniform cell gap distance d between the substrates. Spacers 708 can include, for example, silica gel balls, plastic balls, etc., and can be coated with a black coating to reduce light transmission. Although FIG. 7A shows only two spacers 708, an LC assembly in accordance with an embodiment described herein may include any number of spacers between a pair of substrates on opposite sides of the liquid crystal. The spacers 708 can be fixedly bonded between the substrates 702 and 712, for example, bonded to the electrodes 704 and 710 through the addition of an adhesive. In some embodiments, adhesion between spacers 208 and the electrodes 704 and 710 may occur as a result of a baking process. The temperature and pressure at which the baking is performed are typically significantly lower than that used for laminating automotive windows that incorporate polyvinyl butyral (PVB) as a constituent layer. Alternatively, spacers 708 may be held in place by friction or compression. Further, in some embodiments, spacers 708 may be moveable. For instance, ball shaped spacers may be free to roll within the liquid crystal material. Fixedly bonded spacers may be advantageous in scenarios where the LC assembly is mounted vertically, as in the case of an LC assembly attached to an architectural window. When the LC assembly is mounted vertically, gravity tends to cause the liquid crystal to pool around the sidewall nearest the ground, which can potentially lead to the bottom of the LC assembly having a wider cell gap than the top of the LC assembly. Because fixedly bonded spacers are immobile, a uniform cell gap can be maintained regardless of the orientation of the LC assembly.

PVB is often used in automotive windows to improve impact resistance and reduce fragmentation. Accordingly, one aspect of the present disclosure relates to techniques for forming an LC assembly that includes one or more PVB layers. This would enable the LC assembly to be incorporated into an automobile window without requiring the substitution of another material in place of PVB. Automotive manufacturers are familiar with PVB and processes for creating windows using PVB, and switching to a different material may not be possible without new manufacturing processes. Since automotive manufacturers may not be willing to invest time and other resources into developing such new manufacturing processes, an LC assembly that is compatible with PVB would help bring to market LC assemblies for use in automotive applications.

First electrode 704 and second electrode 710 may correspond to coatings of electrically conductive material on the substrates 702 and 712. For example, first electrode 704 and second electrode 710 may comprise Indium tin oxide (ITO), which would permit the electrodes 704 and 710 to conduct a voltage that establishes an electric field across liquid crystal 714 to change the orientations of the liquid crystal particles. As described below, the orientations of the liquid crystal particles of liquid crystal 714 can adjust the overall light transmittance of liquid crystal cell 700 and the intensity of outgoing light 732.

First electrode 704 and second electrode 710 can optionally include rubbing patterns to align liquid crystal particles of liquid crystal 714 in a default orientation, which can set an initial/default state of light transmittance of liquid crystal cell 700. Alternatively, in some embodiments, the rubbing patterns may be located on additional layers situated between the electrodes 704, 710 and the liquid crystal 714. Such additional layers could be formed, for example, using polyimide (PI). Depending on the configuration of the liquid crystal, rubbing patterns may be omitted. As described below in connection with FIGS. 20 and 21, a normally-black LC assembly incorporating Guest-Host (GH) liquid crystal can be achieved without a rubbing pattern, whereas a normally-white LC assembly incorporating GH liquid crystal may include a rubbing pattern on a PI layer.

FIG. 7A is a simplified example intended to illustrate components that are typical of the LC assemblies described herein with respect to other embodiments. As will be apparent from the discussion of such other embodiments (e.g., the embodiments shown in FIGS. 9A to 9C), an LC assembly can include more or fewer components, or a different arrangement of components. For example, in some embodiments, an LC assembly may include an infrared (IR) filter for blocking IR light and/or an ultraviolet (UV) filter for blocking UV light. A UV or IR filter can be beneficial for glare protection as well as protection against overheating due to electromagnetic radiation at wavelengths associated with IR or UV. Similarly, in some embodiments, an LC assembly may include an anti-reflective coating as one or more layers.

FIG. 7B illustrates one example configuration of liquid crystal 714 to provide adjustable light transmittance. As shown in FIG. 7B, liquid crystal 714 can be configured as a twisted nematic (TN) liquid crystal. The liquid crystal particles can be aligned by the above-described rubbing patterns to form a twisted, helical structure in the absence of an applied electric field (e.g., at zero volts). The helical structure can rotate the polarization axis of polarized light as the polarized light traverses the liquid crystal layer, with the angle of rotation adjustable by an electric field applied across the liquid crystal layer, e.g., an electrical field generated by the control unit 600. As the polarized light traverses through the liquid crystal layer, the helical structure causes the polarization axis of the polarized light to rotate by a certain angle (e.g., 90°) determined by the rubbing patterns. If an electric field is applied, the liquid crystal particles can align in parallel with the electric field. The polarization axis of the polarized light can be maintained and not rotated as the light traverses the aligned liquid crystal particles. Embodiments featuring TN liquid crystal are not limited to configurations that rotate the helical structure by a 90° twist angle. For example, in some implementations, an LC assembly may be configured to rotate the helical structure anywhere from 180° to 270° (a feature of super-twisted nematic (STN) displays). In some implementations, the rotation may be less than 90° (sometimes used to form mixed-mode TN (MTN) displays). Further, TN liquid crystal can include nematic liquid crystal with a chiral dopant that imparts chirality to the nematic liquid crystal. Accordingly, TN liquid crystal can be any liquid crystal that has a twisted structure in a default or voltage-off state, i.e., prior to applying an electric field to "untwist" the liquid crystal particles. Additionally, although FIG. 7B depicts a single rotational direction, an LC assembly can, in some implementations, have liquid crystal with two or more rotational directions to, for example, permit a different alignment of liquid crystal particles in a first segment than liquid crystal particles in a second segment.

In certain embodiments, a conductive layer corresponding to an electrode may be divided into different regions. For example, the layer corresponding to electrode 704 and the layer corresponding to electrode 710 can each be divided into different regions that correspond to segments, which can differ in shape and/or size. The different regions can be formed by chemically or mechanically etching the conductive layer to form etched patterns. The etched patterns are distinct from the above-described rubbing patterns (which set the general and initial alignment of the liquid crystal) and can be used to form discrete segments or, in the case of an LCD, discrete pixels (e.g., red, green, or blue sub-pixels). Such segments can be individually dimmable by controlling the liquid crystal alignment in the segments to display stripes, logos, text, or other graphics, with or without the aid of an electrically controllable illumination source such as a backlight. For example, an LC assembly can be configured as a seven-segment display, where dimming different combinations of the seven segments results in display of different numerals. Accordingly, a conductive layer can include multiple electrodes which, in combination with corresponding electrodes on an opposing conductive layer, form different electrode pairs. Each pair of electrodes may correspond to a different region that is individually controllable through application of a corresponding electrical signal to establish a voltage across the pair of electrodes.

Liquid crystal 714, as well as first substrate 702 and second substrate 712, can be sandwiched between a first polarizer layer 726 and a second polarizer layer 728, as shown in FIG. 7B. Alternatively, the polarizer layers 726, 728 can be intervening layers between the substrates 702, 712 and the liquid crystal 714. In a normally-white configuration, first polarizer layer 226 can have a polarization axis A, whereas second polarizer layer 228 can have a polarization axis B. The two polarization axes can form a 90-degree angle with respect to each other. Incoming light 730 can become linearly polarized by first polarizer layer 726. The linearly polarized light can be rotated by liquid crystal 714 by an angle configured by the TN structure as described above. Maximum light transmittance can be achieved in a case where no electric field is applied. When no electric field is applied, the liquid crystal 714 rotates the polarization axis of the polarized light to align with the polarization axis B by the time the polarized light reaches the second polarizer layer 728. Minimum light transmittance can be achieved when the polarization axis of the polarized light is not rotated, due to application of an electric field, such that the polarization axis of the polarized light becomes perpendicular/orthogonal to the polarization axis B when the polarized light reaches the second polarizer layer 728. In such a case, the polarized light aligns with the absorption axis of second polarizer layer 728 and can be absorbed by second polarizer layer 728 at a maximum absorption rate. The magnitude of the electric field determines the angle of rotation of the polarized light, which can vary the portion of incoming light 730 that passes through liquid crystal cell 714 as outgoing light 732. A typical range of light transmittance achievable by a TN liquid crystal can be between 0.5% to 36%.

TN liquid crystal can provide various advantages compared to other liquid crystal technologies. For example, TN liquid crystal typically has extremely fast response characteristics and can adjust the light transmittance within a very short period of time (e.g., 100 milliseconds or less). TN liquid crystal can also provide good light blocking. For example, the minimum light transmittance of TN liquid crystal can reach as low as 0.1%. Additionally, as a TN liquid crystal generally does not have suspended particles or a polymer to scatter light, a TN liquid crystal cell may introduce less haze and may improve visibility across a range of light transmittance levels.

Additionally, as discussed above, it can be advantageous to include a flexible substrate in an LC assembly. For example, the substrate 702 and/or the substrate 712 may comprise a transparent flexible material (e.g., PET or PVB). Accordingly, in some embodiments, a dimmable LC assembly includes: a flexible substrate, a liquid crystal layer including TN liquid crystal, and polarizer layers. Additionally, such an LC assembly can include a rigid transparent layer (e.g., glass or PC) configured to serve as a structural support for the LC assembly and to operate as a window. This rigid transparent layer can be an additional layer laminated together with or glued to the flexible substrate (e.g., substrate 702 or substrate 712), possibly with one or more intervening layers between the rigid transparent layer and the flexible substrate (e.g., a connecting layer that holds the rigid transparent layer and the flexible substrate together). The rigid transparent layer can therefore be formed integrally with the LC assembly. However, as discussed above in reference to FIG. 5A, it is also possible to manufacture the LC assembly separately so that the LC assembly can later be attached onto a window as a thin film.

FIG. 7C illustrates another example configuration of liquid crystal 714 to provide adjustable light transmittance. In FIG. 7C, liquid crystal cell 700 does not include the polarizer layers 726 and 728. The use of polarizers is unnecessary in the example of FIG. 7C because liquid crystal 714 can be configured as a GH liquid crystal including liquid crystal particles 740, which act as a host, and dye particles 750, which act as a guest. Liquid crystal particles 740 and dye particles 750 can vary in size and may include liquid crystal molecules and dye molecules. Liquid crystal particles 740 and dye particles 750 can modulate the light transmittance based on the Guest-Host effect. Specifically, the dye particles 750 can be configured to absorb light having an electric field that is perpendicular to the long axis of the dye particles. The liquid crystal particles in GH liquid crystal can be nematic and, in some embodiments, can include a chiral dopant in addition to dye particles. The chiral dopant operates to twist the nematic liquid crystal particles (which act as an achiral host) into a helical structure in a similar manner to traditional TN liquid crystal.

In FIG. 7C, the rubbing patterns described above in reference to FIG. 7A can have anti-parallel rubbing directions to set the initial orientation of the liquid crystal particles and dye particles depending on an operation mode of the liquid crystal cell. In a normally-white mode where a liquid crystal cell is in a transparent state when no electric field is applied, the rubbing directions can be configured such that the long axis of the dye particles is parallel with the electric field of incoming light 730 (shown on the right side of FIG. 7C), and the absorption of light by the dye particles can be set at the minimum. When an electric field is applied across liquid crystal particles 740, the orientation of liquid crystal particles 740, as well as dye particles 750, can change accordingly. As a result, the portion of incoming light 730 absorbed by dye particles 750, and the light transmittance of liquid crystal cell 700, can be adjusted by the electric field applied across liquid crystal 714. On the other hand, in a normally-dark mode, the rubbing directions can be configured such that the long axis of the dye particles is perpendicular to the electric field of incoming light 730 (shown on the left side of FIG. 7C), which leads to maximum absorption of light 730 by the dye particles. The absorption can be reduced by changing the orientation of the dye particles when an electric field is applied across the liquid crystal.

The example configurations shown in FIGS. 7B and 7C are not mutually exclusive. In some implementations, a liquid crystal can be both a TN liquid crystal (having a twisted structure) and a GH liquid crystal (having dye particles). For example, as mentioned above, some embodiments may feature a GH liquid crystal that includes a chiral dopant to impart twisting to nematic liquid crystal particles.

By omitting polarizers, a GH-based LC assembly can increase the overall achievable light transmittance while providing reasonable light blocking properties. For example, using the Guest-Host effect, the light transmittance range can be between 10% to 80%. Moreover, a GH liquid crystal can also have fast response characteristics and can adjust the light transmittance within a very short period of time. Further, like TN liquid crystal, a GH liquid crystal may not have suspended particles (e.g., colloidal spheres) or a polymer medium to scatter the light. Additionally, the color of the dye particles of a GH liquid crystal can be chosen to selectively transmit light of a particular color while blocking other colors.

In some embodiments, an LC cell can include vertical alignment (VA) liquid crystals. In VA liquid crystals, the liquid crystal particles are homeotropic, meaning they are aligned perpendicular to the substrate surface, in the absence of an applied electrical field. The homeotropic liquid crystal particles can be realigned to be parallel to the substrate surface by applying an electrical field. A VA liquid crystal generally has negative dielectric anisotropy. In some embodiments, the VA liquid crystal in an LC cell is a dual frequency liquid crystal (DFLC) that has positive dielectric anisotropy at low frequencies and negative dielectric anisotropy at high frequencies, and is referred to as dual VA. VA liquid crystals can also be GH liquid crystals in which dye particles have been introduced.

Figure 8A:
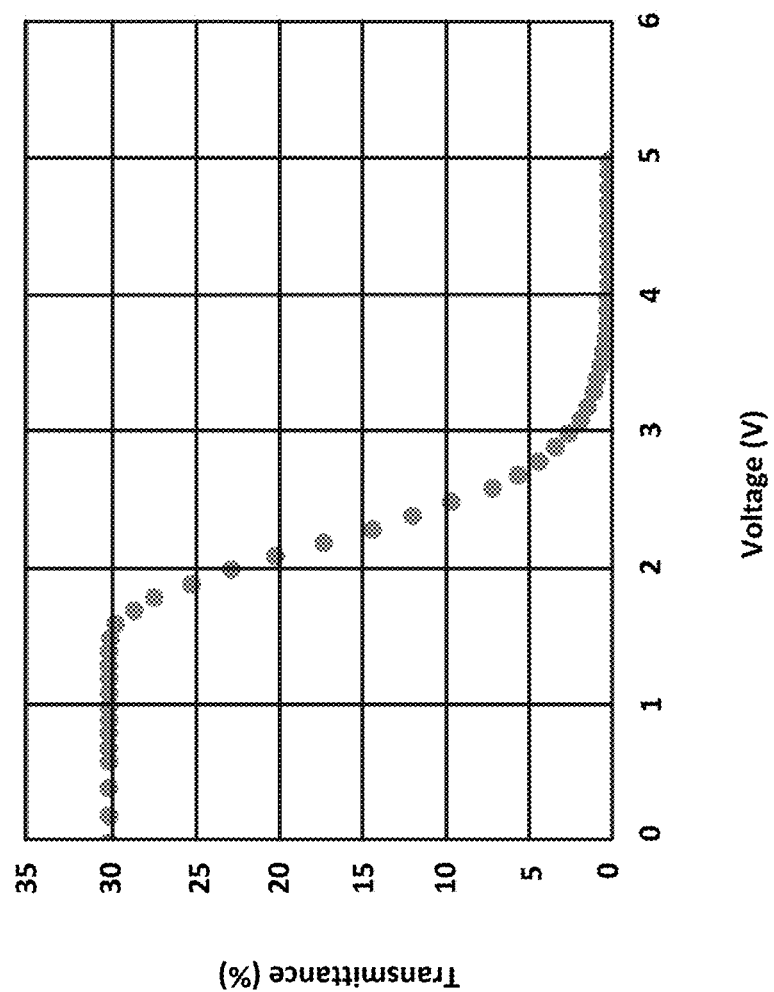
FIGS. 8A to 8D show voltage-transmittance curves for some example dimmable LC assemblies.

FIGS. 8A to 8D show voltage-transmittance (V-T) curves for some example dimmable LC assemblies. In FIG. 8A the LC assembly includes TN liquid crystal configured in the normally-white mode and has the following characteristics: voltage at 90% transmittance (V90)=1.82 V, voltage at 10% transmittance (V10)=2.95 V, cell gap=6 micrometers (μm), twist angle=60°, wavelength=550 nanometers (nm), and frequency=64 Hertz (Hz). The frequency is that of an electrical signal used to drive the LC assembly (e.g., to establish a voltage across electrodes). The wavelength is that of incident light, in this example, green light. For a given voltage, the transmittance is generally stable with a small degree of variability across wavelengths of interest (e.g., the visible spectrum). For example, transmittance may vary between approximately 20% and approximately 30% from 400 to 700 nm. As shown in FIG. 8A, the V-T curve is relatively flat between 0 and 1.5 V (maximum transmittance of approximately 30%) and then slopes downward toward a minimum transmittance of approximately 0.1% at around 4 V.

Figure 8B:
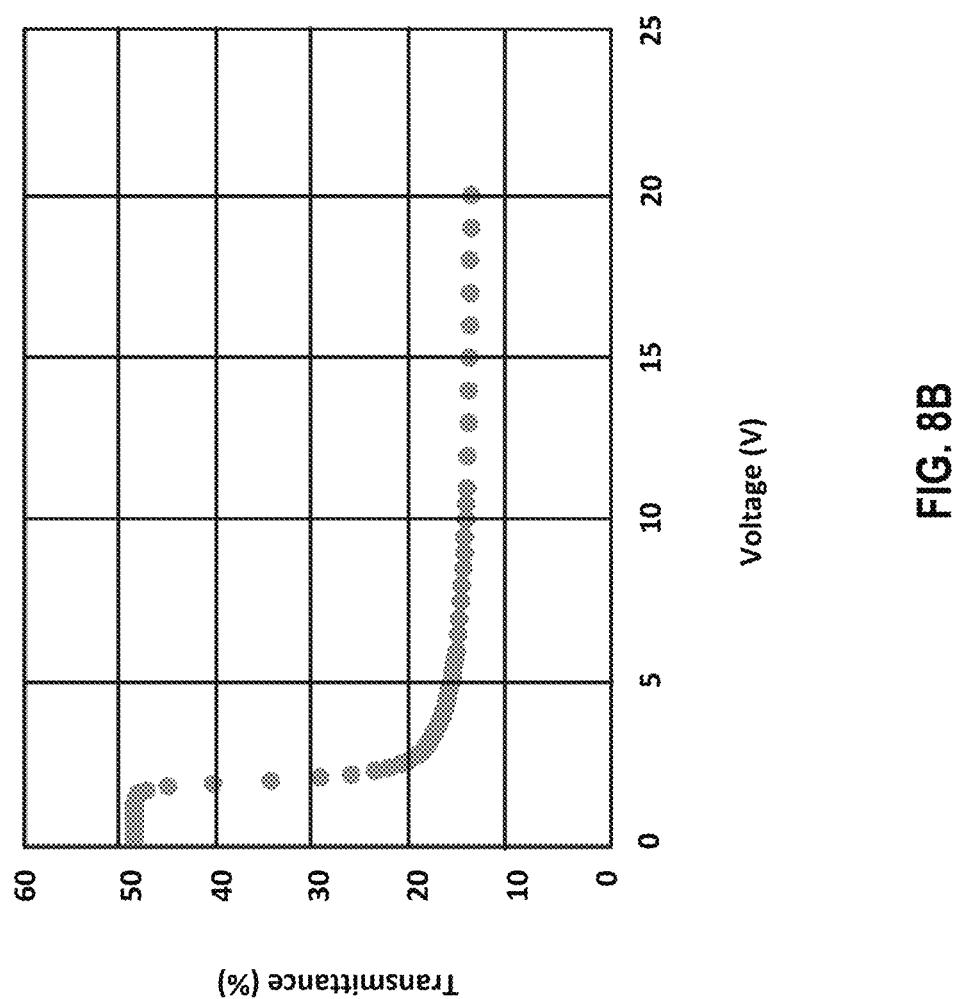

In FIG. 8B, the LC assembly includes GH liquid crystal configured in the normally-white mode and has the following characteristics: V90=1.8 V, V10=3.7 V, cell gap=9 μm, twist angle=360°, wavelength=550 nm, and frequency=64 Hz. As shown in FIG. 8B, the V-T curve is significantly steeper compared to FIG. 8A. Because of the steeper V-T curve, the LC assembly of FIG. 8B may require more precise control over the applied electrical field, in particular, the voltage across the sloped portion of the curve. However, it is feasible to configure a control module (e.g., control module 630 in FIG. 6A) to implement such control. For instance, control module 630 could look up a table stored in a memory of the control unit 600, where the table maps different voltage points to their corresponding transmittance levels. A lookup table for the configuration in FIG. 8B could include finer voltage gradations compared to a lookup table for the configuration in FIG. 8A. Alternatively, in some embodiments, the control module may be programmed or otherwise configured with a nonlinear function approximating the actual V-T curve of the LC assembly. Another performance difference between the configuration of FIG. 8A and the configuration of FIG. 8B is that the minimum transmittance level is higher in FIG. 8B.

Figure 8C:
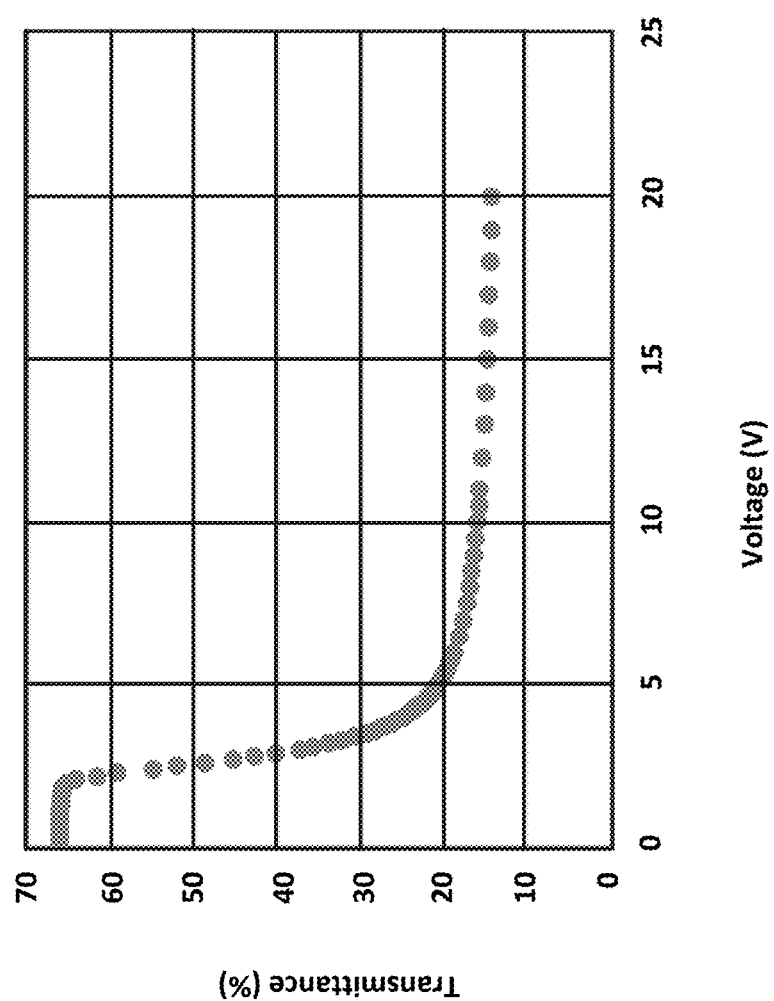

In FIG. 8C, the LC assembly includes GH liquid crystal (dual VA) configured in the normally-white mode and has the following characteristics: V90=2.24 V, V10=5.5 V, cell gap=9 μm, twist angle=0°, wavelength=550 nm, and frequency=64 Hz. Compared to the configurations in FIGS. 8A and 8B, the dual VA configuration in FIG. 8C provides for a higher maximum transmittance than in FIGS. 8A and 8B, and a minimum transmittance about the same as in FIG. 8B.

Figure 8D:
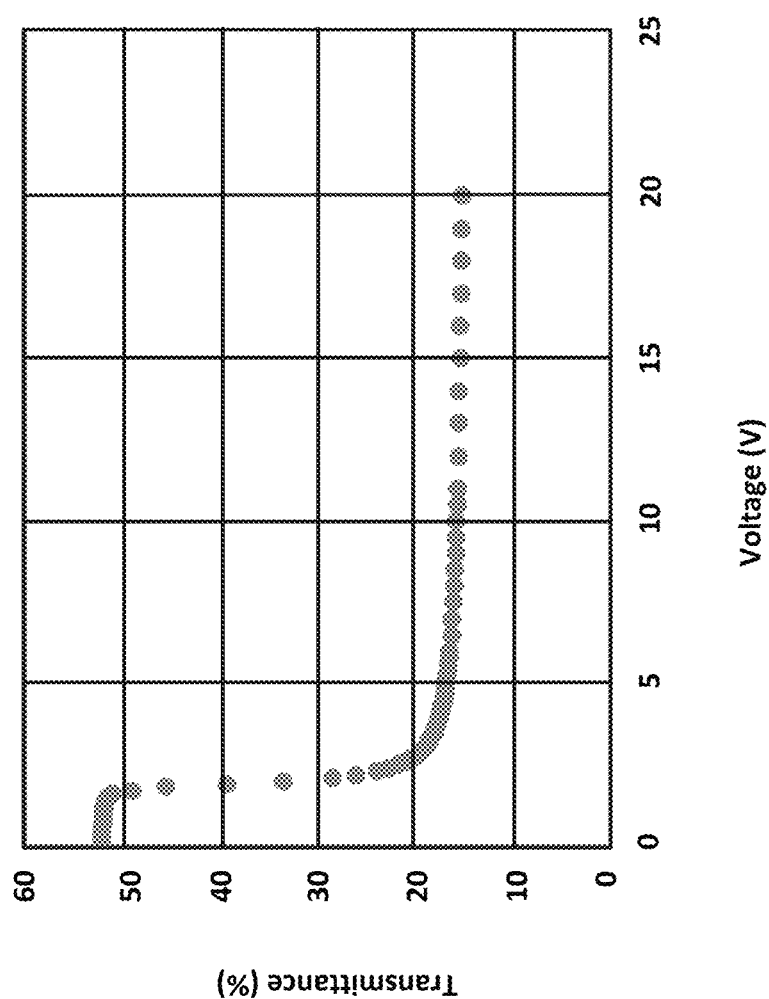

FIG. 8D shows a V-T curve for another GH-based configuration. In FIG. 8D, the LC assembly includes GH liquid crystal configured in the normally-white mode and has the following characteristics: V90=1.72 V, V10=3.1 V, cell gap=9 μm, twist angle=360°, wavelength=550 nm, and frequency=64 Hz. The V-T curve in FIG. 8D is similar to the curve in FIG. 8B but features a slightly higher maximum transmittance level.

Figure 9A:
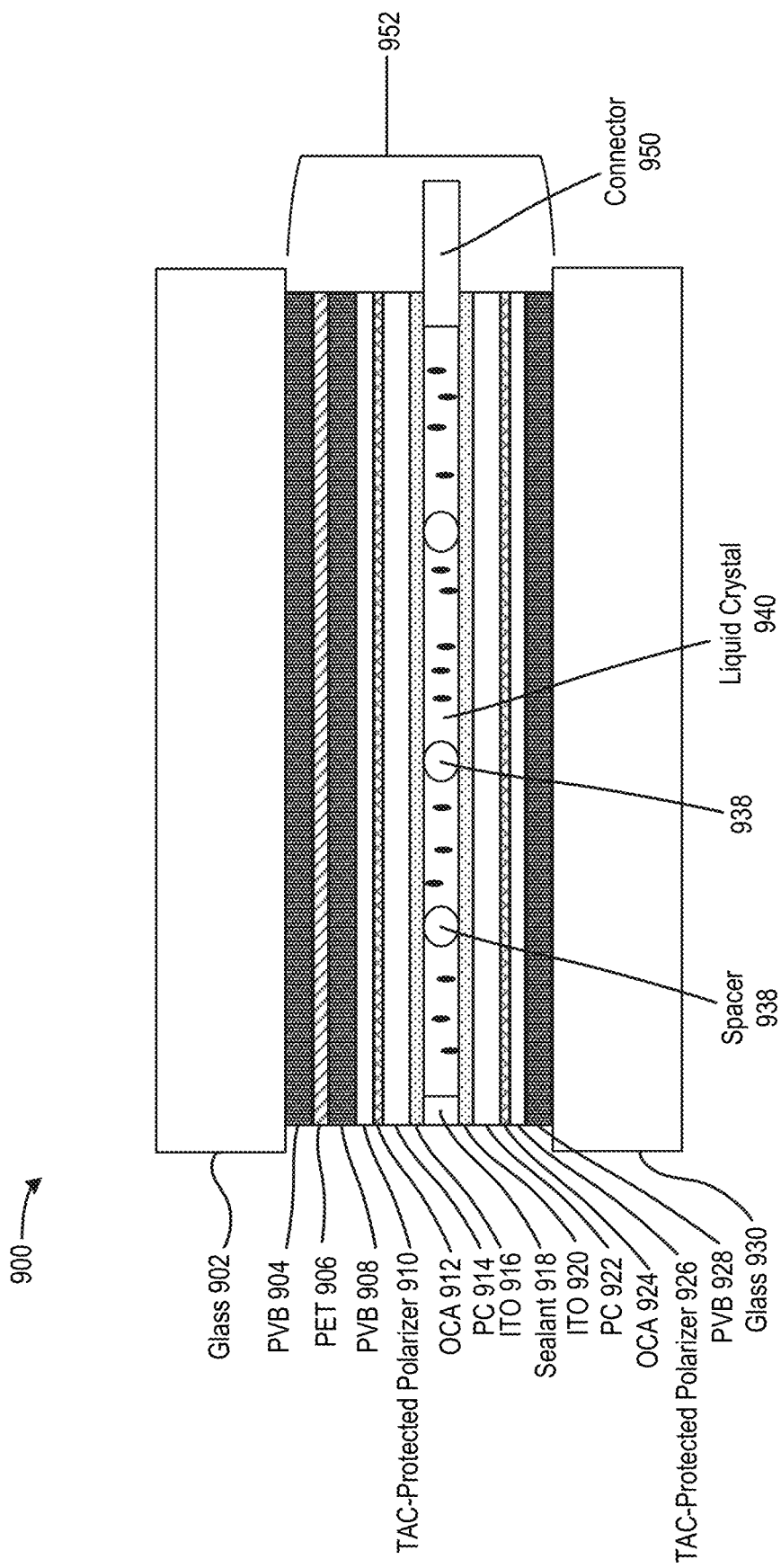
FIGS. 9A to 9C illustrate examples of LC assemblies that include PVB layers, according to some embodiments.
Figure 9B:
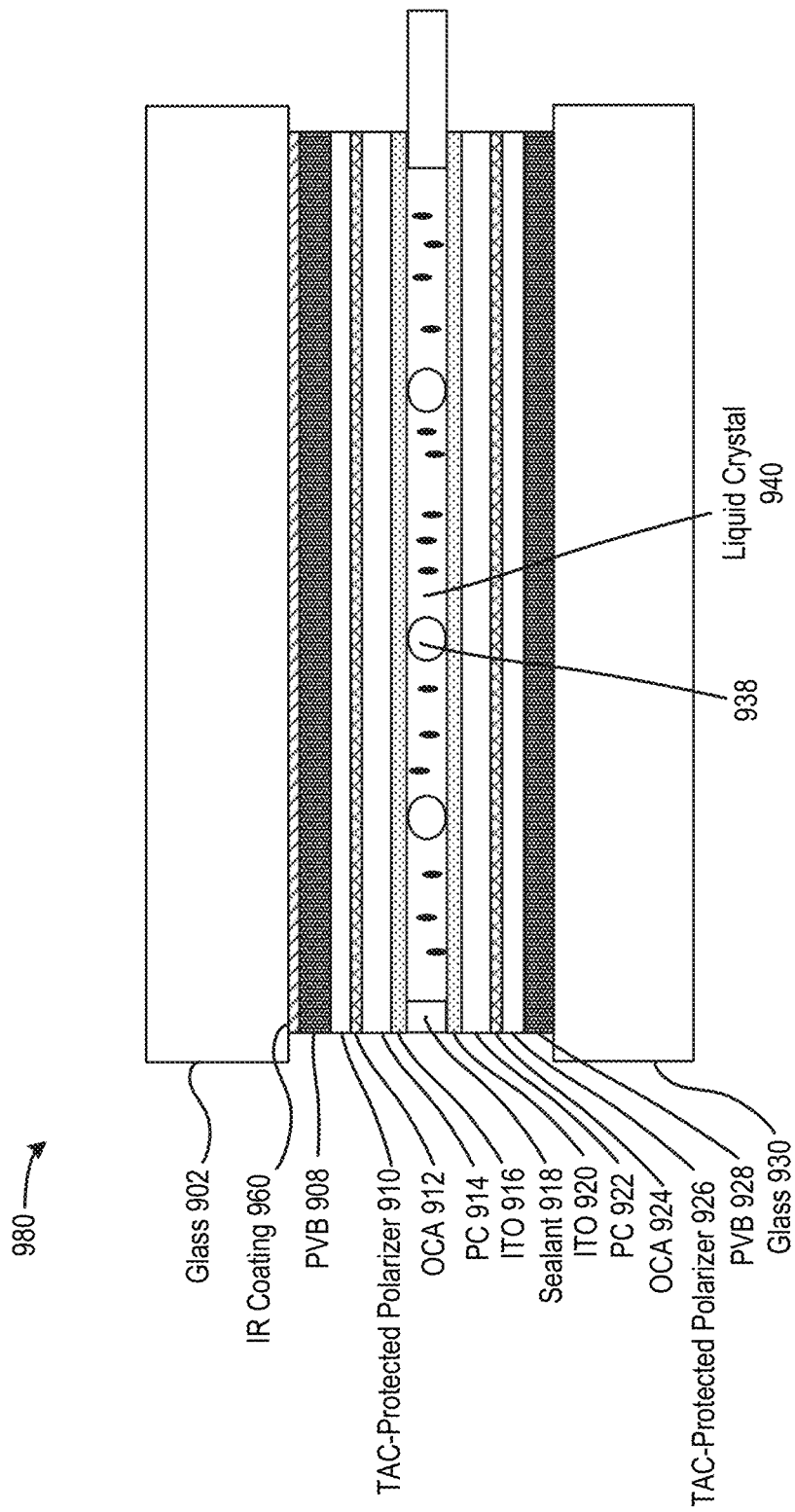
Figure 9C:
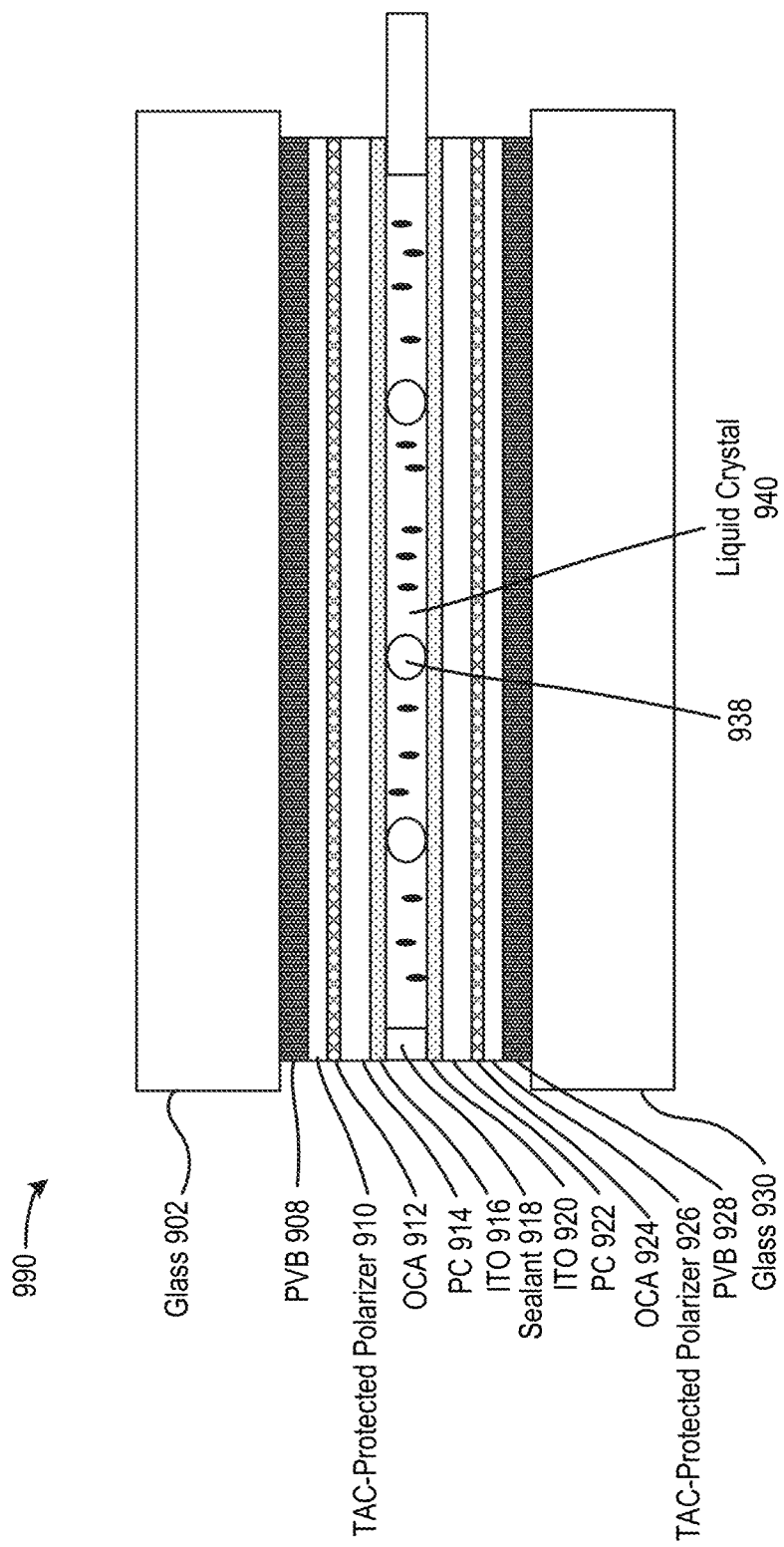

FIGS. 9A to 9C illustrate examples of LC assemblies that include PVB layers, according to some embodiments. The LC assemblies depicted in FIGS. 9A to 9C can be formed as laminated structures using appropriate levels of heat and pressure. In FIG. 9A, an LC assembly 900 includes, from top to bottom, a first glass layer 902, a first PVB layer 904, a PET layer 906, a second PVB layer 908, a first TAC-protected polarizer 910, a first optical clear adhesive (OCA) layer 912, a first PC layer 914, a first ITO layer 916, a second ITO layer 920, a second PC layer 922, a second OCA layer 924, a second TAC-protected polarizer 926, a third PVB layer 928, and a second glass layer 930.

Example thicknesses of some of the above-mentioned components when the LC assembly 900 is configured for use as an automotive sunroof (total thickness approximately 6,100 μm) are as follows:
Glass layers 902 and 930: 2 millimeters (mm) each,
PVB layers 904, 908, and 928: 380 μm each,
PET layer 906: 105 μm,
TAC-protected polarizers 910 and 926: 170 μm each,
OCA layers 912 and 924: 50 μm each,
PC layers 914 and 922: 105 μm each,
Sealant 918 (same as liquid crystal 940): 9 to 15 μm, and
ITO layers 916 and 920: 4 μm each.

TAC-protected polarizers 910, 926 may each include a polarizer plate protected by one or more TAC layers. Thus, although shown as a single layer, each of the TAC-protected polarizers 910, 926 may correspond to a layered structure comprising a polarizer plate plus a TAC layer on at least one surface of the polarizer plate. Polarizer plates are susceptible to damage from handling. Applying TAC to a polarizer plate helps to prevent such damage and to isolate the polarizer plate against environmental influences. Further, in some embodiments, a polarizer may include a UV blocking material. For instance, a TAC-protected polarizer may include the following layers in order: a first TAC layer, a polarizer plate, a second TAC layer, and a UV protective coating that filters out UV light. Alternatively, the UV blocking material could be incorporated into a material of a TAC layer.

LC assembly 900 further includes spacers 938, liquid crystal 940, and an electrical connector 950. Spacers 938 may correspond to the spacers 708 in FIG. 7A. Liquid crystal 940 may correspond to one of the configurations of liquid crystal 714 in FIGS. 7A to 7C (e.g., TN or GH liquid crystal). The electrical connector 950 is configured to transmit signals to a pair of electrodes which, in FIG. 9A, correspond to the ITO layers 916 and 920. An electrical field can be established through the signals transmitted by the electrical connector 950, which may be connected via a cable to a control unit (e.g., control unit 600 in FIG. 6A). Additionally, LC assembly 900 may include a circumferential or edge seal (not depicted) that operates a cushion against the glass layers 902 and 930, as described above in reference to FIG. 7A. The circumferential seal can be located at area 952 and may wrap around a perimeter of the LC assembly 900.

PET layer 906 corresponds to a flexible substrate and may include IR protection. For instance, PET layer 906 can be formed with IR blocking additives or coated with a layer of IR blocking material. IR blocking may be useful in automotive applications, especially sunroofs, because blocking IR radiation helps to avoid overheating. In some embodiments, the PET layer 906 may be replaced with a different flexible material (e.g., PC or TAC), which can also have IR protection. For applications where IR protection is unnecessary, IR protection can be omitted to avoid reduced light transmittance.

OCA layers 912 and 924 can be formed of a transparent adhesive. In some embodiments, the OCA layers 912 and 924 are formed using a liquid OCA (LOCA) that is sprayed onto the PC layers 914, 922 and/or the TAC-protected polarizers 910, 926 in preparation for lamination.

PC layer 914 and/or PC layer 922 can be formed of a flexible polycarbonate and may correspond to the substrates 702 and 712. Thus, PC layers 914, 922 and PET layer 906 may be formed as flexible films. ITO layer 916 and ITO layer 920 correspond to conductive layers on the substrates that form the PC layer 914 and the PC layer 922, respectively. The PC layers 914 and 922 provide mechanical support for the ITO layers 916 and 920 which define the top and bottom walls of an LC cell filled with liquid crystal 940. The LC cell is laminated or bonded to the glass layers 902, 930. Although the glass layers 902, 930 are shown as flat, in actually the glass layers 902, 930 may not be perfectly equidistant at all points along their surfaces (this may also be true when the glass layer 902 and the glass layer 930 are designed to have the same curvature). To compensate for such defects, the PVB layers 904, 908, and 928 can be heated to melting, thereby covering the defects (gap filling). Once cooled, the PVB layers solidify to hold the layers adjacent to the PVB layers 904, 908, and 928 together. This would help avoid uneven distribution of pressure when the constituent layers of the LC assembly 900 are subjected to pressure during the lamination process. In some embodiments, PVB layers 904, 908, and 928 may be substituted with a different adhesive/plastic such as ethyl vinyl acetate (EVA), PET, an acrylic, an epoxy, a silicone-based adhesive, or some other optically clear adhesive (e.g., the same material as OCA layer 912 or OCA layer 924). Further, in some embodiments, one or more TAC layers, such as the TAC portions of the TAC-protected polarizers 910 and 926, may be formed as flexible substrates. Thus, a flexible LC assembly can include one or more flexible layers, where the one or more flexible layers are of the same or different materials.

FIG. 9B shows an LC assembly 980 according to an embodiment. Like elements are labeled with the same reference numerals as in FIG. 9A. In the embodiment of FIG. 9B, the PVB layer 904 and the PET layer 906 are replaced by an IR coating 960 that operates as an IR filter. The IR coating 960 can be formed by sputtering an IR blocking material onto the glass layer 902.

FIG. 9C shows an LC assembly 990 according to an embodiment. Like elements are labeled with the same reference numerals as in FIG. 9A. The LC assembly 990 does not include the PET layer 906 of FIG. 9A or the IR coating 960 of FIG. 9B. Accordingly, the LC assembly 990 may not provide IR protection.

Example thicknesses of some of the above-mentioned components when the LC assembly 990 is configured for use as an automotive side window (total thickness approximately 5,600 µm) are as follows:

Glass layers 902 and 930: 2 mm each,
PVB layer 908: 380 µm,
TAC-protected polarizers 910 and 926: 170 µm each,
OCA layers 912 and 924: 50 µm each,
PC layers 914 and 922: 105 µm each,
Sealant 918 (same as liquid crystal 940): 9 to 15 µm, and
ITO layers 916 and 920: 4 µm each.

As discussed above, flexible LC assemblies are advantageous, especially when used in conjunction with curved rigid substrates (e.g., a curved automotive window). However, flexible LC assemblies are sensitive to uneven pressure distribution and stress. Techniques for uniformly distributing pressure or stress during lamination would therefore be helpful to avoid damage to a flexible LC assembly. As mentioned above, melting PVB or some other adhesive to fill gaps between surfaces is one way to ensure even pressure distribution.

Another challenge with flexible LC assemblies is the temperature dependent behavior of a flexible substrate (e.g., a PC/PET/TAC substrate), a liquid crystal, and a rigid substrate (e.g., glass). All three may have different coefficients of thermal expansion. For example, the expansion coefficient of a flexible substrate may be higher than the expansion coefficient of a glass panel (e.g., two glass panels that form the external layers of an LC assembly, where an LC cell having the flexible substrate is laminated between the glass panels). In addition, the liquid crystal may have a higher expansion coefficient than the flexible substrate. Accordingly, when subjected to temperature changes such as warming an LC assembly in an oven as part of a lamination process, the liquid crystal may undergo greater expansion compared to the flexible substrate due to having a higher expansion coefficient, leading to damage.

Temperature changes can also occur outside of manufacturing. For example, homologation tests for car windows include temperature shock tests, where the temperature is changed, e.g., from 70° C. or higher to −20° C. or lower, within a very short time frame, e.g. 1 minute. This rapid change in temperature can produce high stress on any number of components in the LC assembly or associated with the LC assembly, e.g., cracking of an adhesive, a flexible substrate, or a frame housing the LC assembly. In order to address the problem of different thermal expansion between different layers, a lamination setup is provided in some embodiments. The lamination setup includes one or more adhesives which have the capability to form a strong bond while at the same time being flexible enough to allow for thermal expansion without getting destroyed over many thermal expansion cycles (e.g., hundreds of thousands of cycles). Additionally, as described below in connection with FIG. 19, some embodiments may feature an expansion joint to allow room for expansion and contraction after an LC assembly has been installed, for example, onto a vehicle body. The expansion joint feature can be used in combination with flexible adhesives to prevent damage due to differences in thermal expansion coefficients.

Further, as indicated above, PVB based processes applied to safety glass in the automotive industry traditionally require high temperatures (~140° C.) and high pressure (~12 to 15 bar). Such temperatures and pressures are usually damaging to LC assemblies (e.g., to spacers and to polarizer layers). In order to prevent damage to LC assemblies, the maximum temperature and maximum pressure to the which an LC assembly is subjected during manufacture can be limited. The maximum temperature to which an LC assembly is subjected can be limited to approximately 100 to 160° C. (preferably between 110 to 120° C.). The maximum pressure can be set to approximately 1 to 4 bars, or can range between 10 to 15 bars when using mechanically applied pressure.

In certain embodiments, techniques are provided for enabling an LC assembly including PVB, for example, the LC assemblies depicted in FIGS. 9A to 9C, to be laminated successfully. The techniques include environment-side solutions implemented via controlling the environment in which lamination/bonding is performed and LC side solutions implemented via appropriate design of the LC assembly and its components.

In some embodiments, spacers (e.g., spacers 938) are formed of a high temperature resistant material. Additionally or alternatively, spacers can formed with a geometry that resists high pressure. For instance, instead of forming spacers 938 as spheres, the spacers 938 can be formed as rectangular blocks, cylinders, or some other geometric shape that is more resistant to deformation. As an example, in FIG. 9A, the spacers 938 could be replaced with plastic cylinders (e.g., circular or elliptical cylinders) whose bases contact the ITO layers 916, 920. Besides spacers, other components of an LC assembly, such as polarizers, can be formed of high temperature resistant materials to ensure that the LC assembly survives the lamination process.

In some embodiments, a spacer and/or a layer that contacts the spacer is coated to make a substrate more resistant to damage caused by applying high pressure, e.g., penetration of the substrate by the spacer. For instance, the spacers 938 and/or the ITO layers 916, 920 could be coated with a transparent substance that has a greater hardness than the PC layers 914, 922. Alternatively, the material of the spacer and/or layer that contacts the spacer can be subjected to a tempering process to strengthen the material.

Figure 10:
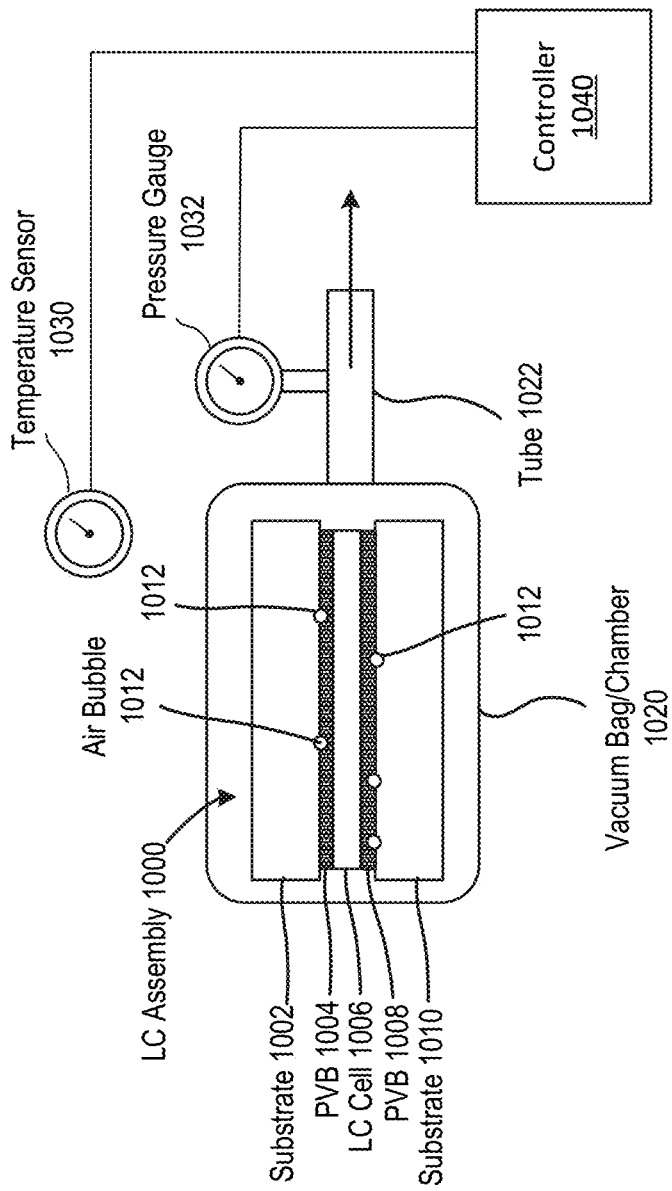
FIG. 10 shows an example of a system for laminating an LC assembly that includes PVB, according to some embodiments.

FIG. 10 shows an example of a system for laminating an LC assembly 1000 that includes PVB, according some embodiments. In FIG. 10, lamination of LC assembly 1000 involves applying heat and pressure while the LC assembly 1000 is located inside a vacuum bag or chamber 1020. The LC assembly 1000 shown in FIG. 10 is a simplified representation of an LC assembly and is shown as including a first substrate 1002, a first PVB layer 1004 between the first substrate 1002 and an LC cell 1006, a second substrate 1010, and a second PVB layer 1008 between the LC cell 1006 and the second substrate 1010. However, LC assembly 1000 can represent any PVB-containing LC assembly. LC cell 1006 can include any of the liquid crystals described herein, such as TN liquid crystal, GH liquid crystal, or VA liquid crystal, and with or without a chiral dopant.

An objective of the lamination process is to form a stacked multi-layered structure in which the layers of the stack are held securely together with minimal air bubbles or gaps between layers. FIG. 10 shows air bubbles 1012 between substrate 1002 and PVB layer 1004 and between substrate 1010 and PVB layer 1008. As discussed above, such air bubbles are formed due to variation in the height of the surface of a substrate. Applying pressure forces the air bubbles out, and such pressure is traditionally applied mechanically, for example, by clamping the layers together using relatively high pressure. Accordingly, in some embodiments, mechanical pressure is applied to force air out of the multi-layered structure (e.g., from the center toward the outer edges of the multi-layered structure). However, a vacuum chamber or bag, as shown in FIG. 10, allows for removal of air bubbles using lower pressure. Accordingly, mechanical pressure can be replaced by atmospheric pressure generated using a vacuum environment.

PVB layer 1004 and PVB layer 1008 correspond to adhesive layers that bond the substrates 1002 and 1010 to the LC cell 1006. The PVB layer 1004, the PVB layer 1008, the substrate 1002, and/or the substrate 1010 may be configured to allow air to escape when pressure is applied. For example, the surface of the PVB layer 1008 that is in contact with the substrate 1002 can include channels that allow air movement (e.g., micro-grooves having a width less than a diameter of the air bubbles 1012), with the channels being eliminated via melting of the PVB layer 1008. Similarly, substrate 1002 can include channels that are filled in by the melted material of the PVB layer 1004. FIG. 10 is merely an example intended to illustrate a lamination process for forming an LC assembly using a stack of layers. In some implementations, PVB layers 1004 and 1008 can be replaced with another material that melts to adhere two layers together, for example the same OCA material as the OCA layers 912 and 924 in FIG. 9A.

The vacuum environment provided by the vacuum bag/chamber 1020 removes the air bubbles 1012. Vacuum bag/chamber 1020 also enables lamination to be performed at a lower pressure and lower pressure. For example, if the LC assembly 1000 is placed inside a vacuum chamber, the pressure can be set to around 1 to 2 bars (1 bar equals 100,000 Pascals) and the temperature set to around 110° C. (the vacuum chamber may also function as a convection oven or autoclave) to cause the PVB layers 1004, 1008 to melt. Depending on how much melting of the PVB layers is desired (e.g., entirely melted versus melted up to a certain depth), the temperature of around 110° C. can be maintained for a set duration. Upon cooling, the PVB layers 1004, 1008 will re-solidify and the entire LC assembly 1000 can then be removed from the vacuum chamber. Temperature and pressure inside the vacuum bag/chamber 1020 can be monitored using a temperature sensor 1030 and a pressure gauge 1032. The temperature and pressure can be set by a controller 1040 coupled to the temperature sensor 1030 and the pressure gauge 1032.

In comparison to vacuum chambers, vacuum bags are less costly to set up and operate, but generally require higher temperature and pressure compared to vacuum chambers. For example, to laminate the LC assembly 1000 using a vacuum bag, air can be extracted from the vacuum bag through a tube 1022 until a pressure of around 3 to 4 bars is reached. At a pressure of 3 to 4 bars, the LC assembly 1000 can be heated to around 120° C. (e.g., by placing the vacuum bag inside an oven) to cause the PVB layers 1004, 1008 to melt. The vacuum bag itself can be formed of a heat resistant material so that the vacuum bag can be reused. Accordingly, the pressure can be set to between 1 to 4 bars, with a higher pressure typically being set when using a vacuum bag than when using a vacuum chamber.

Figure 13:
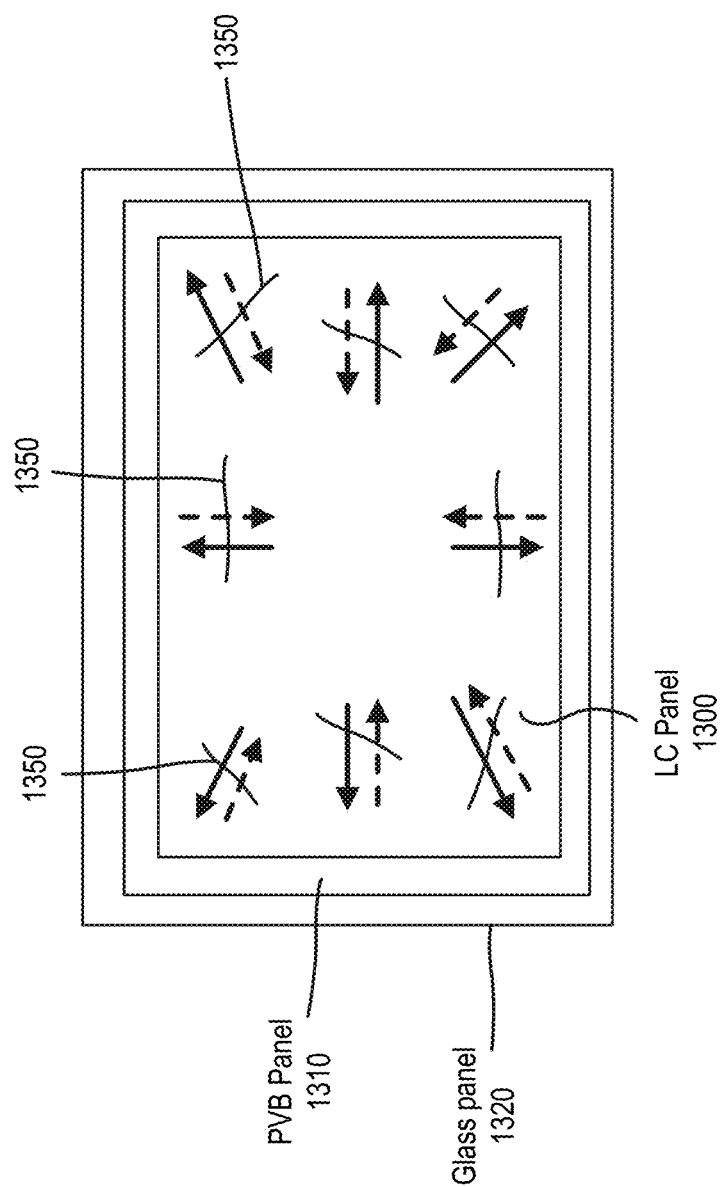
FIG. 13 shows expansion of an LC panel during lamination with a PVB panel and a glass panel.

Although the lamination technique described above in connection with FIG. 10 can be applied to reduce temperature and pressure, there may be benefits to avoiding PVB altogether. FIG. 13 shows expansion of an LC panel 1300 during lamination with a PVB panel 1310 and a glass panel 1320. As shown in FIG. 13, the LC panel 1300 expands when heated (represented by solid arrows) and then contracts upon cooling (represented by broken arrows), resulting in wrinkles 1350. Further, because the LC panel 1300 becomes bonded through the PVB panel during the cooling process, the contraction of the LC panel 1300 is constrained and produces stress that can cause damage such as breaking of a bond around an edge seal (not depicted). The glass panel 1320 may also be subjected to stress, resulting in uneven pressure distribution that can cause visual artifacts or patterns due to the liquid crystal not being homogeneously distributed throughout the LC panel 1300. Such artifacts are especially apparent in the minimally transmissive (dark) state.

Accordingly, processes such as the technique of FIG. 10 may be applied to form a laminated LC assembly that includes glass and PVB layers. However, due to the complexity of implementing such processes, it may be advantageous to use a material other than PVB to bond an LC panel to a substrate, for example, replacing PVB layers with OCA, as discussed above. Instead of a PVB layer, an adhesive comprising OCA, silicone, resin, or the like can be used to bond the LC panel. The adhesive can be film-based or liquid. For instance, there exist adhesives that are of extremely low viscosity (e.g., less than water), which would be suitable for filling in gaps the size of air bubbles, and which can be cured relatively quickly, e.g., within minutes at an ambient temperature between 20 to 30 degrees Celsius. Further, as described below, some embodiments may feature a combination of film-based and liquid adhesives. In some instances, curing of a PVB substitute can be performed without application of heat or pressure and, in embodiments without a UV-blocking layer, may be cured rapidly using UV light. Alternative bonding materials such as OCA, silicone, or resin may have advantages that extend beyond the manufacturing process. For instance, a PVB substitute may remain functional over a larger range of temperatures (e.g., at higher temperatures than what PVB can sustain) and may have a higher transmittance than PVB so as minimize impact on the overall transmittance of the LC assembly.

Optical performance of an LC assembly can be increased through selection of an adhesive that has at least 99% transmittance and a refractive index at least somewhat matched to that of the substrate(s) with which the LC cell is bonded in order to minimize transmission loss. The desired refractive index of an adhesive can be calculated based on a Fresnel model. For p-polarized light (the electric field of which is parallel to the plane of incidence), Fresnel's equation for the transmission coefficient $\tau_p$ across the boundary between two mediums k and k−1, where k−1 is the incident medium and k is the transmission medium, is given by:

$$\tau_{p/k} = \frac{2n_{k-1}\cos\phi_{k-1}}{n_{k-1}\cos\phi_k + n_k\cos\phi_{k-1}}$$

Similarly, the transmission coefficient $\tau_n$ for s-polarized light (the electric field of which is perpendicular to the plane of incidence), is given by:

$$\tau_{n/k} = \frac{2n_{k-1}\cos\phi_{k-1}}{n_k\cos\phi_k + n_{k-1}\cos\phi_{k-1}}$$

As an example, applying Fresnel's equation for s-polarized light to each of the six boundaries in the example LC assembly described in the table below yields an overall transmittance of 79% ($\tau_n$=0.79) when the refractive index of ITO layer is matched (substantially equal) to the refractive index of the PC substrates, after factoring in transmission loss through the PC substrates and GH liquid crystal. In this example, the refractive index of the PC substrates is 1.586, and the refractive index of the ITO layer is 1.54 in the matched case and 1.9 in the mismatched case. When the refractive index of the ITO is mismatched, the overall transmittance is 78%. Depending on the degree of matching, the overall transmittance can range between 80% to 76%.

| Material | Thickness | Refractive Index |
| --- | --- | --- |
| Air | | 1 |
| PC substrate | 100 micrometers | 1.586 |
| ITO | 20 nanometers | 1.54 or 1.9 |
| GH liquid crystal | 3 micrometers | 1.64 |
| ITO | 20 nanometers | 1.54 or 1.9 |
| PC substrate | 100 micrometers | 1.586 |
| Air | | 1 |

For automotive applications, a transmittance of 70% or higher for windshields and front side windows is required by law in most countries. Accordingly, to avoid reducing the overall transmittance below 70% after the addition of one or more adhesive layers, the adhesive material as well as the materials of at least some of the layers in the LC assembly (e.g., the ITO layer and substrates) can be selected so that the refractive indices match or are closely matched.

In some embodiments, such as the example in the table above, glass may be replaced with PC. Other materials that are more flexible and/or lighter than glass, such as PET, may also be used. Referring back to FIGS. 9A to 9C, a PC layer (914, 922) can form a substrate of an LC cell. Traditional LC cells are sandwich structures comprising liquid crystal between two glass substrates. Replacing glass with PC improves the impact resistance of the LC assembly and enables a certain degree of flex as compared to glass, which is rigid, but without sacrificing transparency or optical clarity. In general, any glass layer of an LC assembly can be replaced with a PC layer. For example, PC could replace the glass layer 902 and/or the glass layer 930. PC layers are not limited to LC assemblies that are formed integrally with a window and can also be included in LC assemblies designed to be attached to windows.

When used as an external layer (e.g., in place of glass layer 902 or glass layer 930), a surface of the PC layer can be coated with a scratch resistant material to protect against abrasion, since PC is softer than glass. Because of its impact resistance and ability to be formed in many different shapes, PC can be incorporated into one or more layers to form an LC assembly suitable for use in an automotive window, e.g., a side window. PC is also lighter than glass and can reduce the weight of the LC assembly and thus the weight of an automobile. For instance, switching from glass to PC windows may reduce the weight of an automobile by about 50 pounds, which can lead to increased fuel/battery economy.

Figure 11:
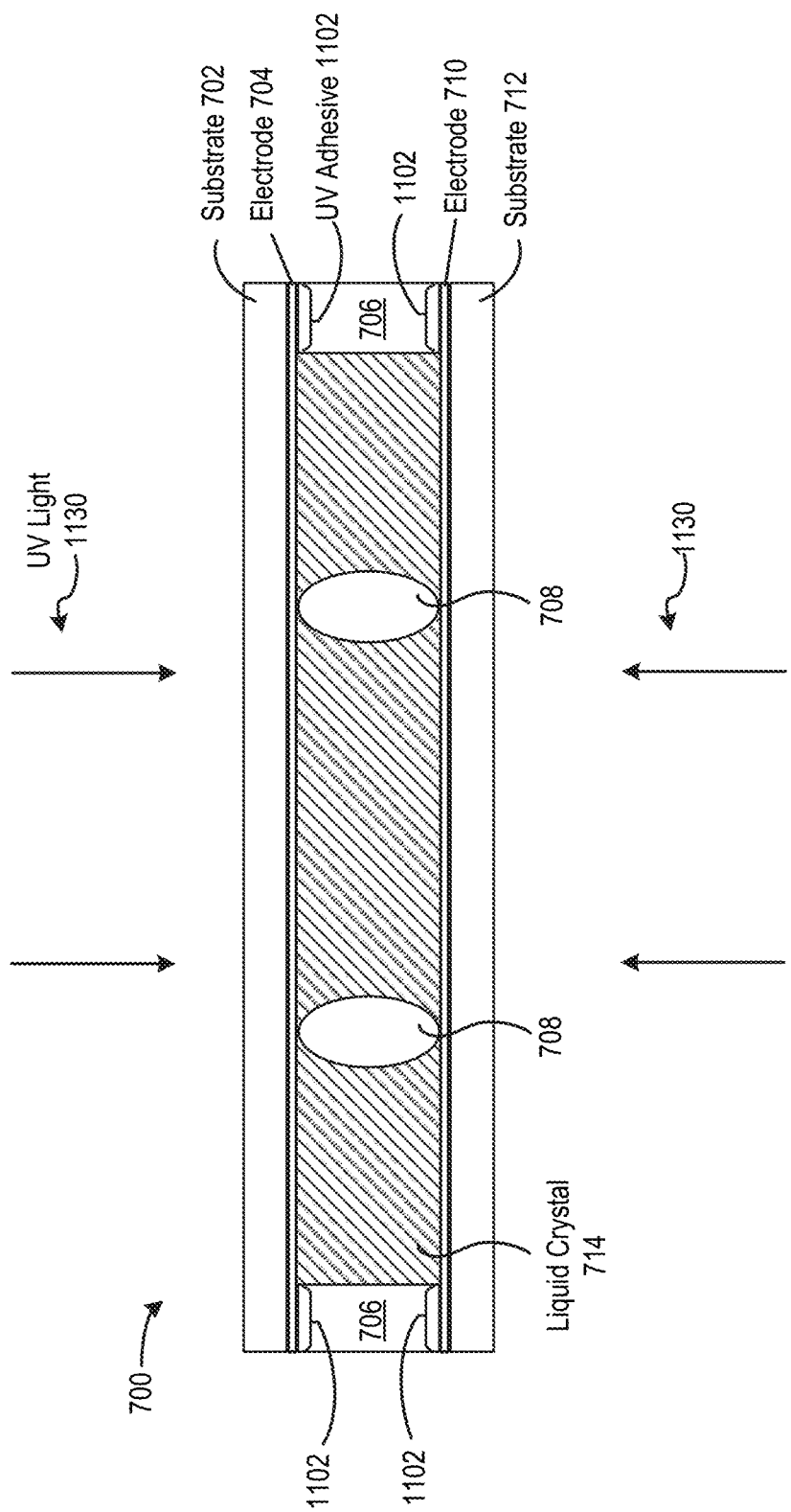
FIG. 11 shows a UV curing step applied to an LC cell.

FIG. 11 shows a UV curing step applied to the LC cell 700 from FIG. 7A. In FIG. 11, UV light 1130 is applied to both sides of the LC cell 700 so that the UV light is incident upon the external surfaces of substrates 702, 712. In some implementations, only one side of an LC cell is illuminated, and this may be sufficient for the UV light to pass through to the other side of the LC cell. When the UV light 1130 enters the LC cell, the UV light cures a UV adhesive 1102 that contacts substrate-facing surfaces of sealant 706. Once the adhesive 1102 is cured, the substrates 702, 712 become fixedly attached to the sealant 706.

If the substrates 702, 712 were replaced with a UV blocking material, the UV light 1130 would not be able to reach the adhesive 1102, or the UV light 1130 would be blocked to such extent that the portion of UV light 1130 that penetrates through the UV blocking material would be insufficient to fully cure the adhesive 1102. Similarly, if one or more UV blocking layers are introduced between the substrates and the UV adhesive, the UV adhesive would not be able to be cured using UV light.

UV based adhesives are often used in the automotive industry. One benefit of UV adhesive is that parts which are to be glued together by the UV adhesive can be repositioned any time prior to application of UV light. If the parts are misaligned or placed incorrectly, they can easily be moved before curing. However, as explained above, UV adhesives are incompatible with UV blocking materials. Further, some types of LC assemblies depend upon the use of one or more UV blocking materials. For instance, in a TN LC cell such as shown in FIG. 7B, polarizers are used to control the direction of the light that enters or exits the liquid crystal. As discussed above in connection with FIG. 9A, polarizers may be protected using TAC and can also include a UV protective coating. Therefore, UV curing may not be possible for a TN LC cell or other LC cell containing a polarizer.

Because of the UV blocking properties of the UV protective coating that is usually included in a TAC-protected polarizer, such polarizers have not been used in combination with LC components that have traditionally been glued using a UV adhesive. For example, the electrodes 704, 710 in FIG. 11 may be formed using ITO or some other material that is amenable to bonding with UV adhesive. Therefore, traditional LC assemblies lack a TAC-protected polarizer in combination with an ITO-based electrode. In contrast, FIGS. 12A and 12B show examples that feature a TAC-protected polarizer in combination with an ITO-based electrode.

Figure 12A:
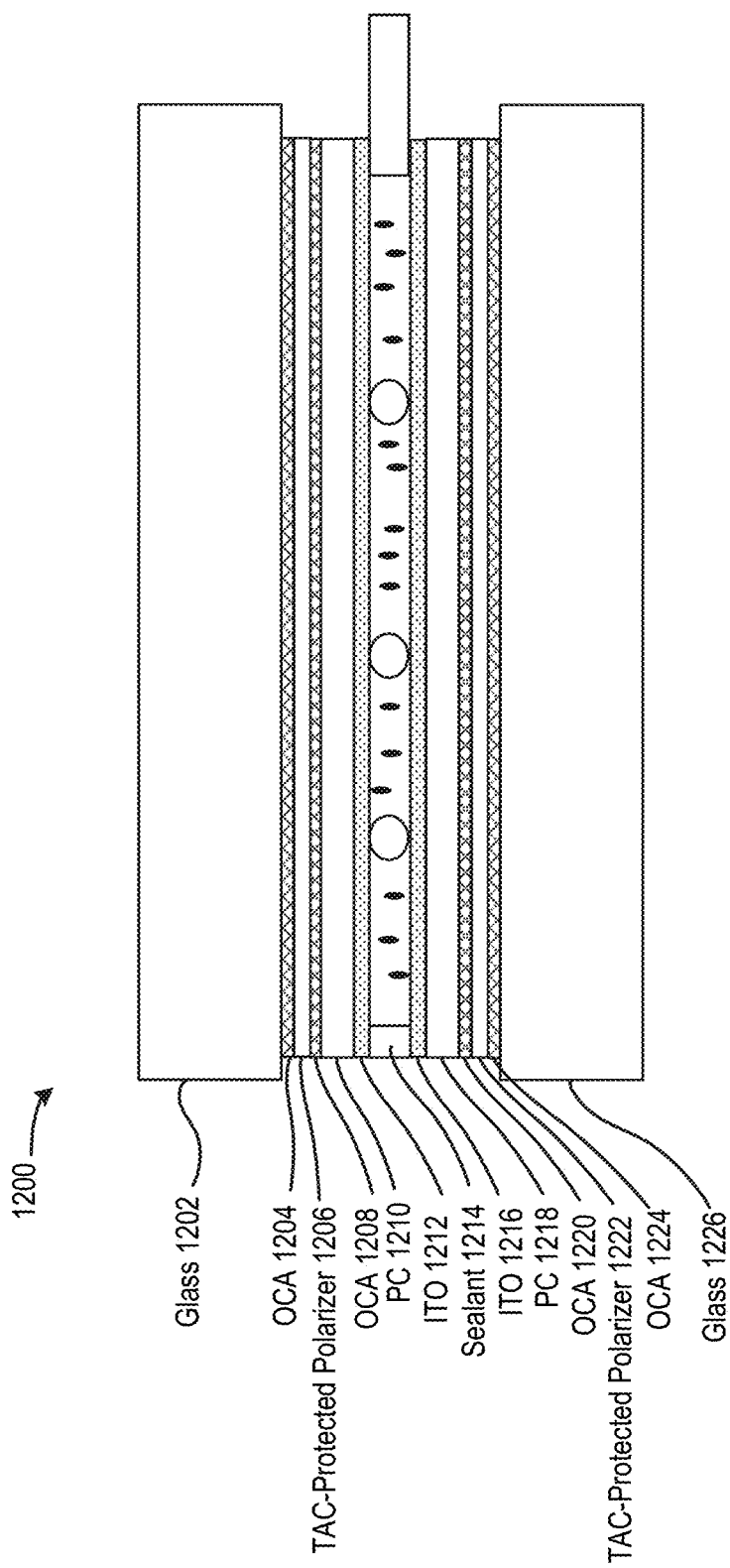
FIGS. 12A and 12B illustrate examples of LC assemblies that include indium tin oxide (ITO) electrodes and polarizers with cellulose triacetate (TAC), according to some embodiments.
Figure 12B:
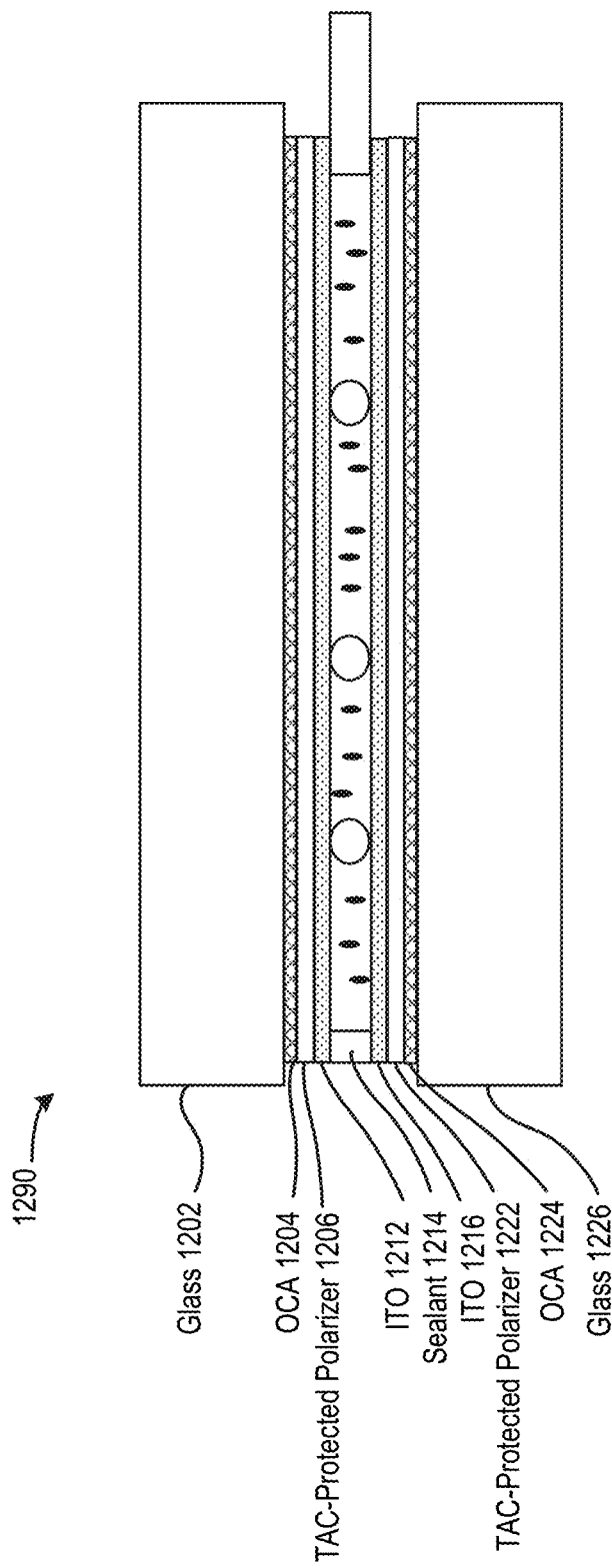

FIG. 12A shows an LC assembly 1200 according to an embodiment. The LC assembly 1200 includes, from top to bottom, a first glass layer 1202, a first OCA layer 1204, a first TAC-protected polarizer 1206, a second OCA layer 1208, a first PC layer 1210, a first ITO layer 1212, a sealant 1214, a second ITO layer 1216, a second PC layer 1218, a third OCA layer 1220, a second TAC-protected polarizer 1222, a fourth OCA layer 1224, and a glass layer 1226.

In FIG. 12A, the TAC-protected polarizer 1206 is bonded to glass layer 1202 via OCA layer 1204 and to PC layer via OCA layer 1208. Similarly, the TAC-protected polarizer 1222 is bonded to glass layer 1226 via OCA layer 1224 and to PC layer 1218 via OCA layer 1220. Each of the OCA layers shown in FIG. 12A can be a liquid OCA. Further, the TAC-protected polarizers 1206 and 1222 may each include a UV protective coating.

The ITO layers 1212, 1216 correspond to electrodes. However, an electrode of an LC assembly according to an embodiment described herein can be formed of another electrically conductive material, for example, graphene.

FIG. 12B shows an LC assembly 1290 according to an embodiment. The LC assembly 1290 includes similar elements as the LC assembly 1200 in FIG. 12A, but omits PC layers 1210 and 1218. In the absence of these PC layers, the TAC-protected polarizers 1206 and 1222 are directly attached to ITO layers 1212 and 1216, respectively. Thus, in some embodiments, an ITO layer can be formed directly on a TAC-protected polarizer or any other layer that includes TAC. For example, ITO layer 1212 can be sputtered directly onto a TAC portion of the TAC-protected polarizer 1206.

In order to enable an LC assembly to include a UV blocking component such as a TAC-protected polarizer, aspects of the present disclosure are directed to alternatives for UV adhesives. In particular, embodiments relate to the use of non-UV cured adhesives such as epoxies and heat-activated adhesives. For instance, adhesive 1102 in FIG. 11 can be replaced with a two-part epoxy that has relatively long working time. The working time of the epoxy can, for example, be several minutes long since this is generally sufficient to prepare an LC assembly for lamination yet allows a small time window in which to reposition parts as needed. Alternatively, a heat-activated adhesive that cures at or below the temperature of the lamination process can be used.

FIG. 14 shows an LC assembly 1400 according to some embodiments. As described above, for example with respect to the OCA layers in FIGS. 12A and 12B, a liquid adhesive can be incorporated into an LC assembly to bond an LC cell to a glass panel or other substrate, possibly as a substitute for bonding via PVB. In the example of FIG. 14, the LC assembly 1400 includes an LC cell 1410 that is bonded to an outer substrate 1420 and an inner substrate 1430 through a combination of a liquid adhesive 1440 and a film-based adhesive 1450.

As used herein in connection with FIG. 14 and other figures that follow, an outer substrate refers to a substrate nearest the exterior environment when the LC assembly has been installed as a window. Similarly, an inner substrate refers to a substrate nearest the interior environment. In an automotive setting, such substrates are typically glass. For simplicity, FIG. 14 and various figures that follow depict LC cells as a single layer. However, as described above, an LC cell can include other layers besides the liquid crystal layer. Accordingly, the LC cell 1410 may include a stack of layers that form a panel comprising, for example, polarizers, intermediate substrates, moisture blocking layers, and/or IR or UV blocking layers.

The liquid adhesive 1440 is applied to a surface of the LC cell 1410 facing the outer substrate 1420 and, once cured, solidifies to bond the LC cell 1410 to the outer substrate 1420. As shown in FIG. 14, the liquid adhesive 1440 may extend to contact the inner substrate 1430. A liquid adhesive such as the adhesive 1440 is useful for filling in gaps between an LC cell and a glass or other (e.g., PC) substrate. Although FIG. 14 shows the outer substrate 1420 and the inner substrate 1430 as being flat, in practice there can be small variations in height across a surface of the substrates 1420 and 1430 such that a distance 1405 between the substrates 1420, 1430 is not uniform. Height differences are especially prevalent when the substrates are curved, such as with an automotive window since it can be difficult to precisely form the curvature. Although a melting adhesive such as PVB can be used to bond an LC cell to a substrate, the melting adhesive tends to exert pressure against the LC cell when in a solid state (e.g., after melting). Height variation may cause the melting adhesive to exert such pressure non-uniformly, especially if the melting adhesive is not fully melted before cooling, resulting in deformation of the LC cell and, therefore, visual artifacts or other undesirable optical characteristics. For instance, in the dark state, the LC cell may have some regions that are darker than others. Additionally, a liquid adhesive may remain flexible after curing, permitting thermal expansion and contraction so that pressure spots are avoided.

Film-based adhesive 1450 is a solid adhesive that bonds the LC cell 1410 to the inner substrate 1430 and can be applied to fix the LC cell 1410 in position relative to the inner substrate 1430 before applying (e.g., via injection) the liquid adhesive 1440. Like the liquid adhesive 1440, the film-based adhesive 1450 may be sufficiently flexible to permit thermal expansion and contraction. The film-based adhesive 1450 may be carried on a transparent, flexible film. For example, film-based adhesive 1450 may be coated onto both sides of a plastic film to permit one side of the plastic film to be attached to the LC cell 1410 and the other side of the plastic film to be attached to the inner substrate 1430, with the plastic film forming part of the LC assembly. Alternatively, film-based adhesive 1450 may be provided on a temporary film that is peeled off to leave no film between the LC cell 1410 and the inner substrate 1430.

Figure 15:
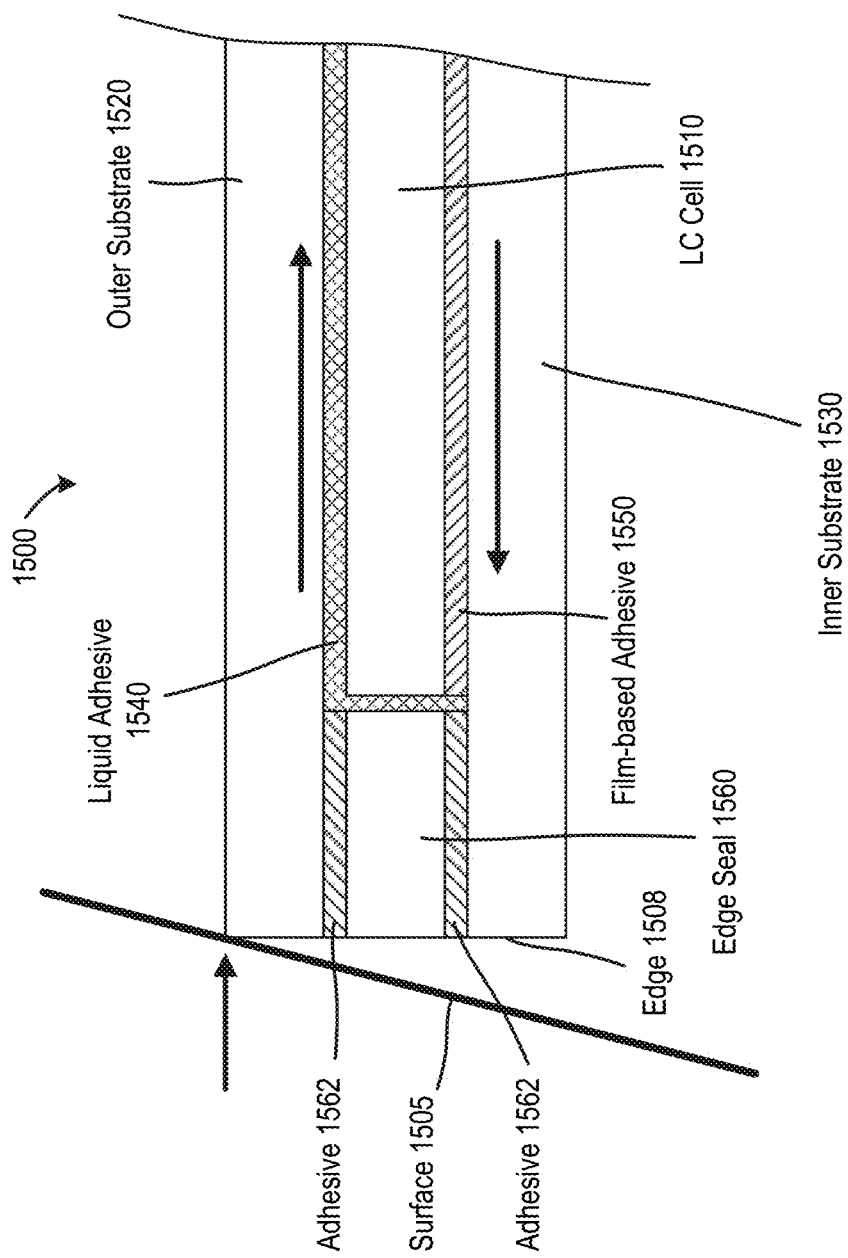
FIG. 15 shows shear stress arising in an LC assembly when the LC assembly is rested against a surface.

The LC assembly 1400 further includes one or more edge seals 1460. In some embodiments, a single edge seal extends around the perimeter of the LC assembly to protect against infiltration of moisture and contaminants. For example, the edge seal 1460 could be a gasket ring formed using a synthetic rubber such as butyl. However, an edge seal need not cover the entire perimeter. For example, an LC assembly could include four edge seal strips, one for each side of the LC assembly, so that the perimeter is covered by the edge seals collectively. Further, as shown in FIG. 15 (described below), an edge seal may be bonded to substrates of an LC assembly using, for example, an adhesive. Other materials may also be used for edge sealing. In some embodiments, the edge seal 1460 may be formed of a similar material as the sealant 706 in FIGS. 7A to 7C, for example, a plastic, elastomeric material, or other relatively soft material such as PET.

FIG. 15 shows shear stress arising in an LC assembly 1500 when the LC assembly is rested against a surface 1505 (e.g., the ground). LC assembly 1500 may be placed on the surface 1505 prior to installing the LC assembly 1500, for example, during storage or transport. LC assembly 1500 includes an LC cell 1510 bonded to an outer substrate 1520 and an inner substrate 1530 via a combination of a liquid adhesive 1540 and a film-based adhesive 1550, similar to the LC assembly 1400 in FIG. 14.

The LC assembly 1500 further includes an edge seal 1560, which can extend around the perimeter of the LC assembly 1500 to protect against infiltration of moisture and contaminants. The edge seal 1560 is analogous to the edge seal 1460 in FIG. 14 and, as such, may be formed of a plastic, elastomeric material, or other relatively soft material such as PET or butyl rubber. The edge seal 1560 is located at an edge 1508 of the LC assembly, in a space that is formed as a result of the outer substrate 1520 and the inner substrate 1530 extending beyond the boundaries of the LC cell 1510.

The liquid adhesive 1540 and the film-based adhesive 1550 may have a wide operational temperature range, e.g., maintaining a stable yet flexible bond between −40 to +115 degrees Celsius, and relatively short curing times (e.g., 1 to 5 minutes for both adhesives). In some implementations, at least one of the adhesives 1540 and 1550 is acrylic-based. Acrylic is a suitable adhesive in the context of an LC assembly because it is color-stable and resists yellowing over time. Because acrylic-based adhesives are sensitive to moisture, the portions of an LC assembly that are bonded using an acrylic-based adhesive may protected against moisture by an edge seal such as edge seal 1560.

The edge seal 1560 is bonded to the substrates 1520 and 1530 via an adhesive 1562, which can be a resin-based adhesive or other adhesive that has a relatively high bond strength in comparison to the liquid adhesive 1540 and the film-based adhesive 1550. The adhesive 1562 may have a wide operational temperature range similar to that of the liquid adhesive 1540 and the film-based adhesive 1550, e.g., between −40 to +115 degrees Celsius. Further, the adhesive 1562 may be resistant to moisture and remain stable over years of operation (e.g., at least 15 years). For automotive applications, the adhesive 1562 may be a non-silicone based adhesive. To prevent damage during handling or installation of the LC assembly 1500, the material of the edge seal 1560 may be selected to have a coefficient of friction that is less than or equal to that of the substrates 1520 and 1530 (e.g., the same coefficient of friction as glass). A higher coefficient of friction may result in concentration of force at the edge seal 1560 rather than uniform distribution of force across the edge seal 1560 and the substrates 1520 and 1530, resulting in damage to the LC cell 1510.

As shown in FIG. 15, the LC assembly is resting on one corner of the edge 1508. Since the edge 1508 of the LC assembly 1500 is not fully supported by the surface 1505 in this position, the weight of the substrate that is not in contact with the surface (in this example, the inner substrate 1530) is pulling in the direction of gravity. The effect of this gravitational influence in combination with the force of the surface 1505 pushing in the opposite direction may induce shear stress that can lead to damage or delamination of the LC cell 1510. For instance, the shear stress may overcome the strength of the adhesive 1562 around the edge seal 1560, causing the liquid adhesive 1540 to leak past the edge seal 1560 and producing voids that are located along the perimeter of the LC assembly and which have the appearance of cracks. Glass substrates are especially heavy. To reduce the weight of the substrates and thus the amount of shear stress, at least one of the substrates can be made thinner, as shown in FIG. 16.

Figure 16:
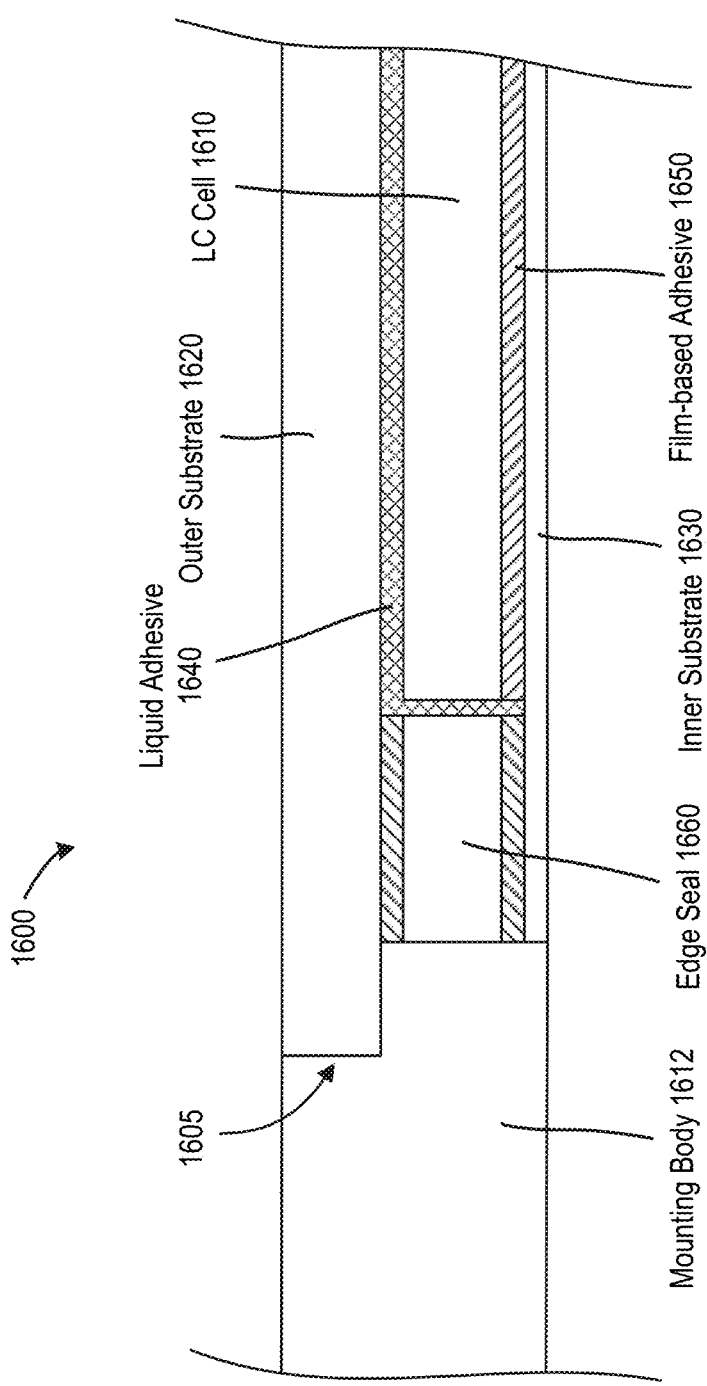
FIGS. 16 to 19 show examples of LC assemblies attached to mounting bodies, according to some embodiments.

FIG. 16 shows an LC assembly 1600 attached to a mounting body 1612, according to some embodiments. The mounting body 1612 is generally a rigid structure that supports the LC assembly 1600 and may, for example, be a roof of an automobile. The LC assembly 1600 includes components similar to those depicted in FIG. 15, such as an LC cell 1610, an outer substrate 1620, an inner substrate 1630, a liquid adhesive 1640, a film-based adhesive 1650, and an edge seal 1660. In the example of FIG. 16, the inner substrate 1630 is substantially thinner than the outer substrate 1620 in order to reduce the shear stress described above in connection with FIG. 15. The outer substrate 1620 can also be made thinner. However, for safety reasons, there is generally a limit on how thin an outer substrate can be. For automotive applications, the outer substrate 1620 may range approximately from 2 mm to 3.5 mm, and the inner substrate 1630 may range approximately from 0.7 mm to 2 mm, with a total thickness of approximately 5 mm or less for the entire LC assembly. As shown in FIG. 16, the outer substrate 1620 extends past the edge seal 1660 to be received in a recess 1605 of the mounting body 1612. Here, the thickness of the outer substrate 1620 facilitates robust and secure attachment of the LC assembly 1600 to the mounting body 1612. Since the weight of the LC assembly 1600 is borne by the outer substrate 1620, the more fragile inner substrate 1630 is protected against damage. Further, since both the substrates 1620 and 1630 are supported against the mounting body 1612, shear stress generally does not arise once the LC assembly has been installed.

Figure 17:
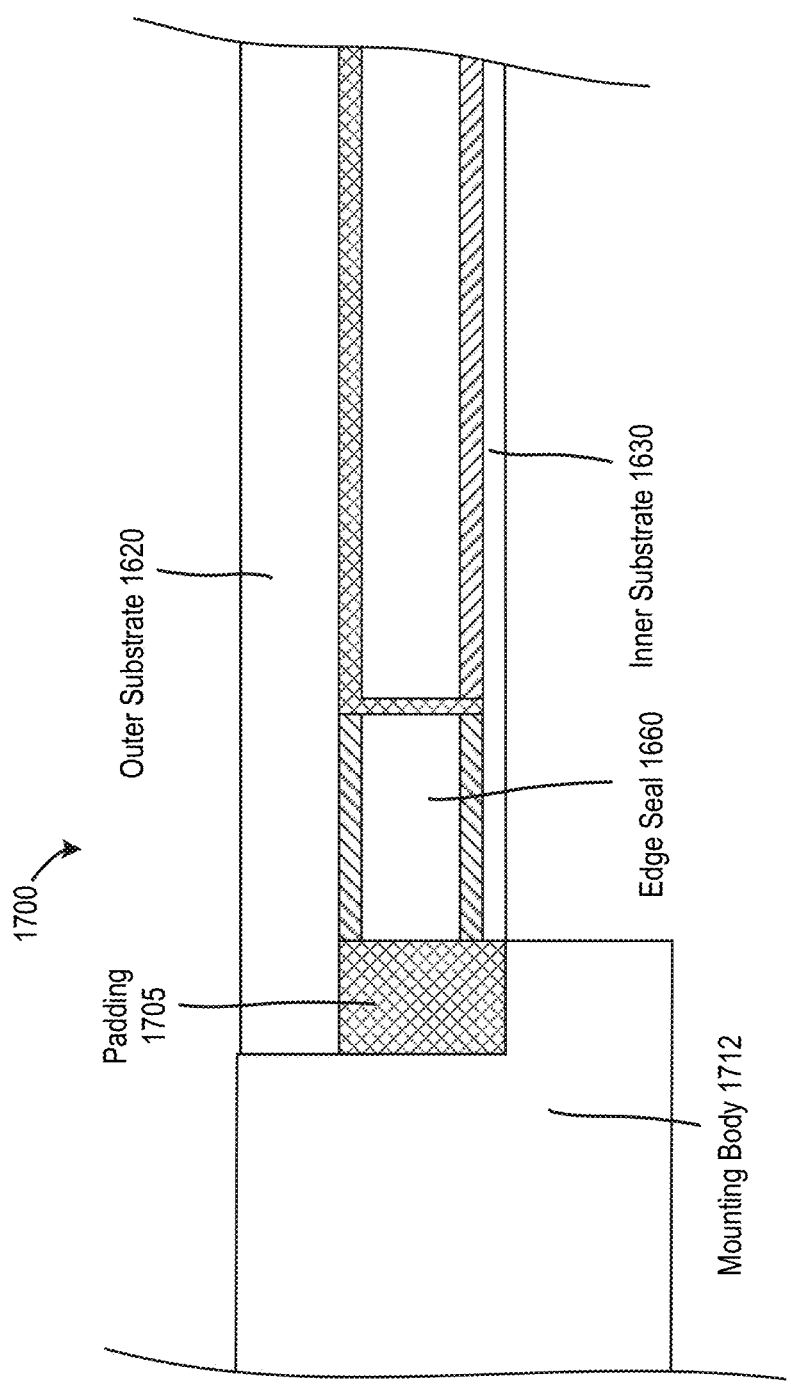

FIG. 17 shows an LC assembly 1700 attached to a mounting body 1712, according to some embodiments. The LC assembly 1700 is identical to the LC assembly 1600 in FIG. 16, except for the addition of padding 1705. In combination with the outer substrate 1620, the padding 1705 provides a flat surface for flush mounting of the LC assembly 1700 to the mounting body 1712. In the example of FIG. 17, the weight of the LC assembly 1700 is borne by both the outer substrate 1620 and the padding 1705. The padding 1705 can be formed of the same or a similar material as the edge seal 1660 and, as described above in connection with the example of FIG. 15, may have a coefficient of friction that is less than or equal to that of the substrates 1620 and 1630.

Figure 18:
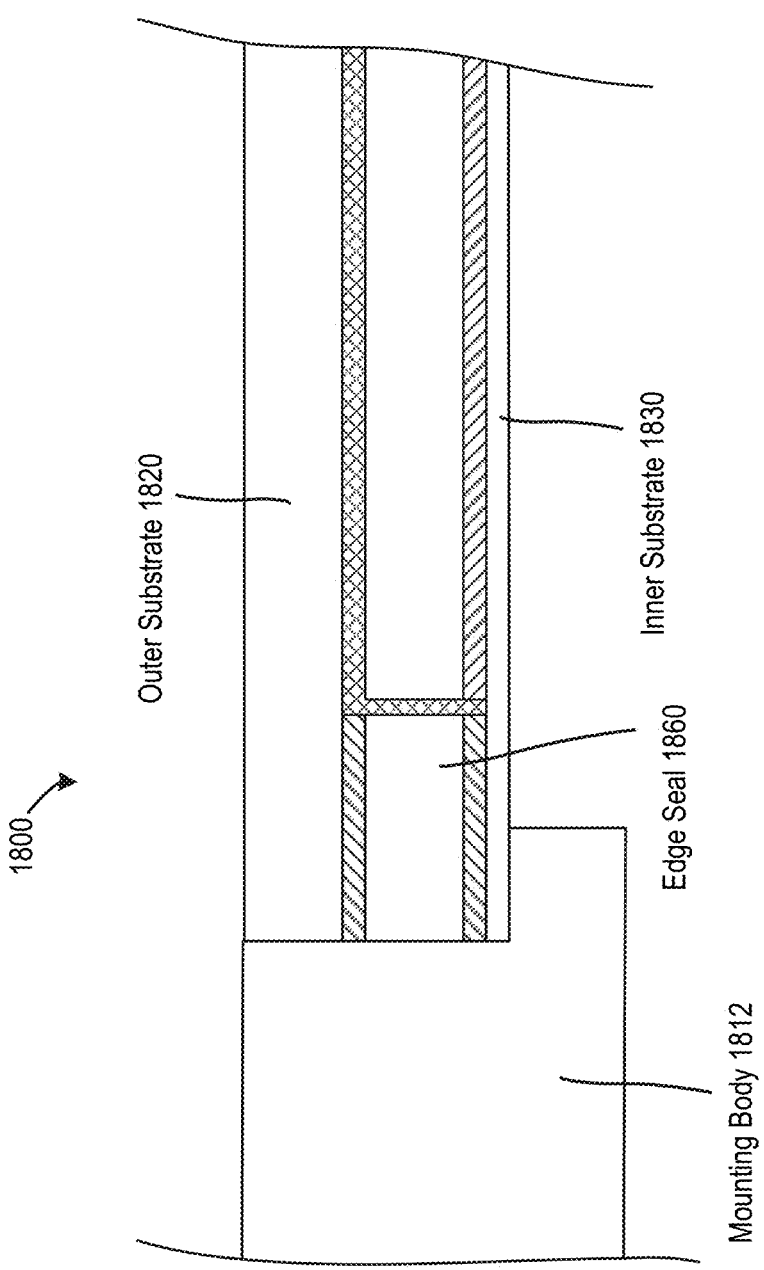

FIG. 18 shows an LC assembly 1800 attached to a mounting body 1812, according to some embodiments. The LC assembly 1800 is similar to the LC assembly 1500 in FIG. 15 in that outer substrate 1820, inner substrate 1830, and edge seal 1860 each extend to the edge of the LC assembly. Accordingly, the weight of the LC assembly 1800 is borne by the outer substrate 1820, the inner substrate 1830, and the edge seal 1860. Like the LC assembly 1600, the inner substrate 1830 is thinner than the outer substrate 1820. Depending on the weight of the LC assembly 1800, the inner substrate 1830 may be sufficiently robust to support the LC assembly 1800 in the configuration shown in FIG. 18 despite being thinner than the outer substrate 1820. Thinning of the inner substrate can also be applied to other mounting configurations, including configurations in which the LC assembly is oriented with an edge facing the ground, such as in a side window of an automobile.

Figure 19:
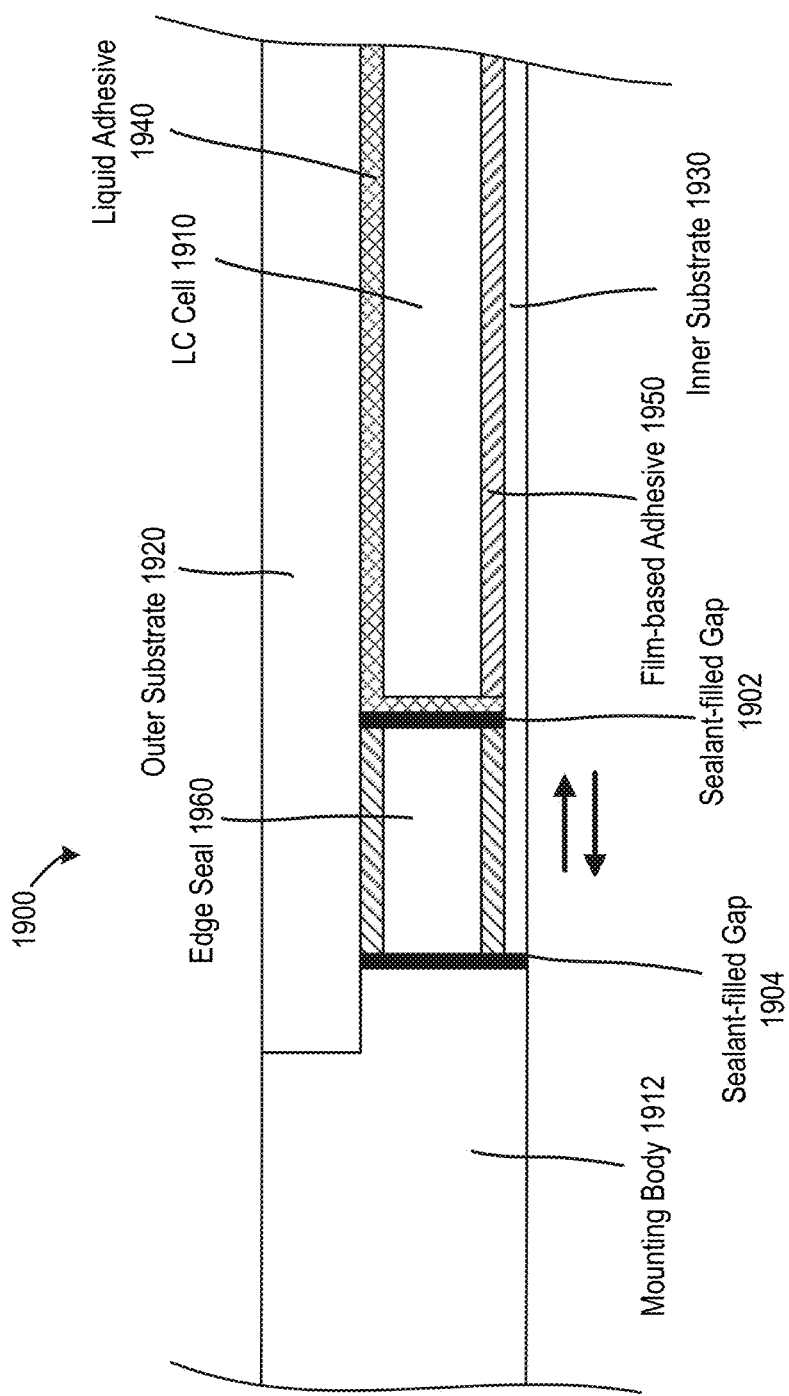

FIG. 19 shows an LC assembly 1900 configured to accommodate thermal expansion and contraction, according to some embodiments. The LC assembly 1900 is similar to the LC assembly 1600 and includes an LC cell 1910, an outer substrate 1920, and inner substrate 1930, and an edge seal 1960. However, the edge seal 1960 is spaced apart from the LC cell 1910 by a first gap 1902. Additionally, the edge seal 1960 and the inner substrate 1930 are spaced apart from mounting body 1912 in the mounted configuration to define a second gap 1904. The gaps 1902 and 1904 may be approximately 1 millimeter wide in some implementations. Both gaps 1902 and 1904 are filled with a flexible sealant to operate as expansion joints that accommodate thermal expansion and contraction of the LC cell 1910. The LC cell 1910 may have a different thermal expansion coefficient than the substrates. For example, an exterior layer of the LC cell may be plastic, whereas the substrates 1920 and 1930 may be glass so that the LC cell expands more than the substrates in response to heat. Accordingly, temperature change can cause the LC cell 1910 to expand or contract relative to the substrates.

Similar to the example in FIG. 14, the LC assembly 1900 includes a liquid adhesive 1940 and a film-based adhesive 1950. In some embodiments, the flexible sealant in at least one of the gaps 1902 and 1904 is a non-adhesive sealant. For example, the sealant in the gap 1902 can be a liquid adhesive similar to the liquid adhesive 1940 or a film-based adhesive similar to the film-based adhesive 1950, while the sealant in the gap 1904 can be a non-adhesive sealant that prevents the edge seal 1960 and/or the inner substrate 1930 from sticking to the mounting body 1912. The liquid adhesive 1940, the film-based adhesive 1950, and the sealant in the gaps 1902 and 1904 can compensate for differences in thermal expansion coefficients by remaining flexible over a wide temperature range (e.g., −40 to +115 degrees Celsius) to permit the LC panel to expand and contract. In the absence of such flexible components, stress buildup may cause the LC cell to tear or delaminate. The sealant-filled gap 1902 acts as a buffer between the edge seal 1960 and the LC cell 1910. Similarly, the sealant-filled gap 1904 acts as a buffer between the edge seal 1960 and the mounting body 1912. Differences between thermal expansion coefficients of the substrates 1920 and 1930 relative to the LC cell 1910 are compensated mainly through a combination of the liquid adhesive 1940, the film-based adhesive 1950, and the sealant in gap 1902. Each of these three components can contribute to allowing lateral movement of the LC cell 1910 while also ensuring that the LC cell 1910 remains securely attached to the substrates 1920 and 1930. Further, the sealant in the gap 1904 provides additional cushioning in the event that the edge seal 1960 moves relative to the mounting body 1912, for example, due to LC cell 1910 pushing or pulling against the sealant in the gap 1902. In some embodiments, the gap 1404 may be extended to cover mounting surfaces of the outer substrate 1920, thereby cushioning the outer substrate 1920 in addition to the edge seal 1960 and the inner substrate 1930.

As described above in connection with FIG. 7A, some embodiments may feature a UV blocking layer and/or an IR blocking layer for glare reduction and preventing overheating. For example, a UV/IR blocking layer may be placed between an LC cell and an outer substrate to reduce heating of the interior environment. Similarly, a UV/IR blocking layer may be placed between an LC cell and an inner substrate to reduce the amount of heat transmitted from the interior environment to the exterior environment. Such blocking layers are especially beneficial in architectural settings, where climate control over extended periods of time and seasonal temperature changes is desirable. Blocking UV and IR radiation may also prevent damage to the liquid crystal, for example, color fading of dopants or dye particles in a GH-based liquid crystal. The examples in FIGS. 9A to 9C feature UV blocking in the TAC portion of a polarizer. However, a UV or IR blocking layer can be incorporated into other layers or as a stand-alone layer. For example, an LC assembly may feature a first IR blocking layer applied (e.g., sputtered) to the interior surface of an outer substrate and a second IR blocking layer applied to the interior surface of an inner substrate. In configurations where applying a blocking layer to an inner or outer substrate may be difficult (e.g., when the substrate is a three-dimensionally curved glass) or when the LC assembly is formed separately from the outer substrate (as in the case of an add-on to a window), the blocking layer may be applied to a surface of an LC panel. For example, a blocking layer may be applied to a surface of a flexible film 2016 shown in FIG. 20. In some embodiments, UV or IR blocking may be provided through an adhesive with blocking properties or through the inclusion of blocking particles, e.g., UV blocking particles inside the flexible film 2016.

Figure 20:
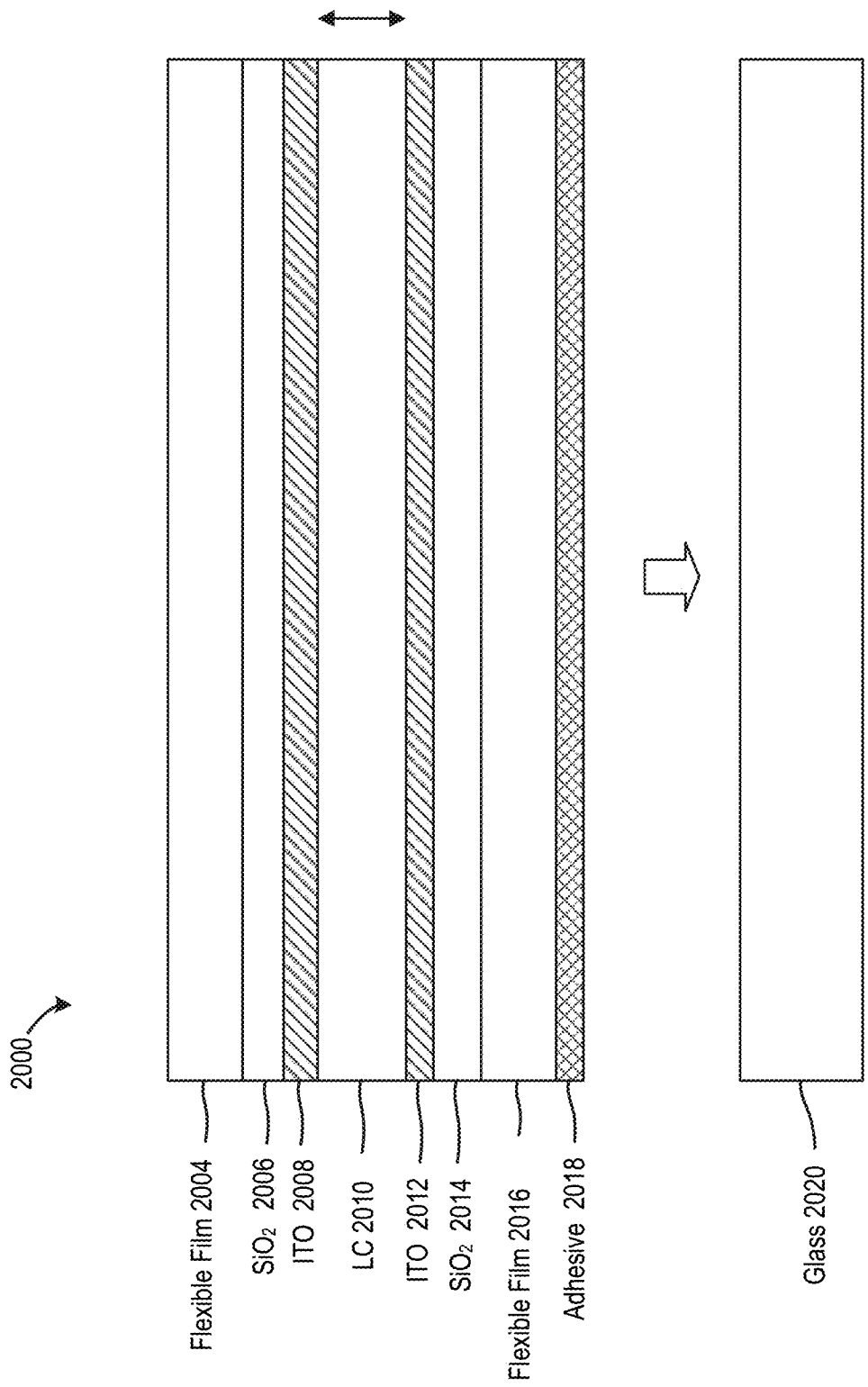
FIGS. 20 and 21 show LC assemblies adapted for attachment to a glass surface, according to some embodiments.

FIG. 20 shows an LC assembly 2000 adapted for attachment to a glass 2020. The LC assembly 2000 may correspond to the LC assembly 510 in FIG. 5A, in which case the glass 2020 would correspond to window 520. The LC assembly 2000 may include, in order from top to bottom: a first flexible film 9004, a first $SiO_2$ layer 2006, a first ITO layer 2008, an LC layer 2010, a second ITO layer 2012, a second SiO$_2$ layer 2014, and a second flexible film 2016. The LC assembly 2000 is attached to the glass 2020 via an adhesive 2018.

The adhesive 2018 can be applied to the flexible film 2016 at a time of manufacture or applied (to flexible film 2016 and/or glass 2020) at a time of installation. Adhesive 2018 can be a liquid adhesive or film-based. The adhesive 2018 may be a UV or IR blocking adhesive. Alternatively, UV and/or IR blocking layers may be applied between the LC layer 2010 and the glass 2020. For example, adhesive 2018 could be a film-based adhesive comprising a first adhesive layer attached to the flexible film 2016, a second adhesive layer for attaching to glass 2020, and a UV and IR blocking film sandwiched between the first adhesive layer and the second adhesive layer. As another example, the flexible film 2016 may include a UV blocking component.

The flexible films 2004 and 2016 can be formed of PET or a similar flexible, transparent material. The flexible films 2004 and 2016 enable the LC assembly 2000 to bend and conform to an attachment surface of the glass 2020. Adhesive 2018 may also be flexible and may, for example, correspond to liquid adhesive 1540 or film-based adhesive 1550 in FIG. 15. Flexible film 2004 protects the LC assembly 2000 against impacts and abrasion. In some embodiments, the flexible film 2004 may include a self-healing material (e.g., a self-healing polymer or elastomer), which can be incorporated into the material of the flexible film 2004 or as an additional coating.

The SiO$_2$ layers 2006 and 2014 act as moisture barriers to prevent moisture from penetrating inside the LC assembly 2000. Together with an edge seal (not depicted), the SiO$_2$ layers 2006 and 2014 may protect against moisture in all directions.

In a normally-black configuration, the LC layer 2010 may include a GH liquid crystal comprising a mixture of nematic liquid crystal particles and dye particles, as described above in connection with FIG. 7C. The GH liquid crystal may further include a chiral dopant that twists the liquid crystal particles into a helical structure in a similar manner to TN liquid crystal. However, LC layer 2010 can be formed of other types of liquid crystal material. While not strictly necessary, the chiral dopant produces a helical structure that enables the LC layer 2010 to absorb light from all polarization angles, since natural light is 360° polarized. In some embodiments, the proportion of chiral dopant in a GH liquid crystal is at least 0.5% by weight. In the absence of an applied electric field across the ITO layers 2008 and 2012, the long axis of the liquid crystal and dye particles can be aligned perpendicular to incoming light. Applying an electric field across the ITO layers causes the liquid crystal and dye particles to become aligned parallel to the incoming light, allowing the light to be transmitted through the LC assembly 2000. This GH-based, normally-black configuration can be achieved without a rubbing pattern.

Figure 21:
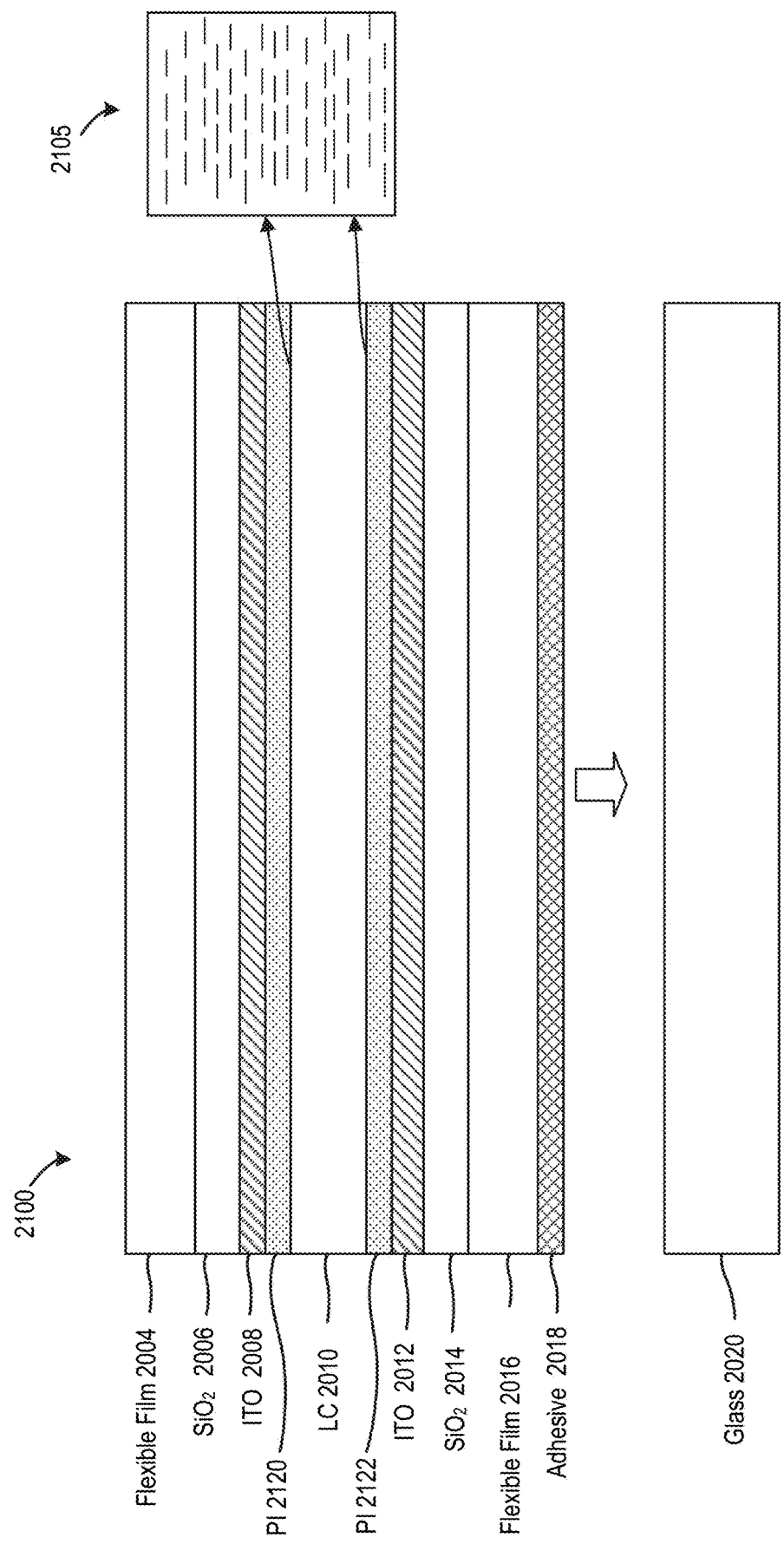

FIG. 21 shows an LC assembly 2100 adapted for attachment to the glass 2020 which, as discussed above, may correspond to window 520. The LC assembly 2100 is similar to the LC assembly 2000, except that the ITO layers 2008 and 2012 are separated from the LC layer 2010 by polyimide (PI) layers 2120 and 2122, respectively. Like the LC assembly 2000, the liquid crystal in the LC layer 2010 may be a GH liquid crystal that includes nematic liquid crystal particles, dye particles, and a chiral dopant. To produce a normally-white configuration, a rubbing pattern 2105 can be formed on each of the PI layers facing the LC layer 2010. The rubbing patterns 2105 are formed through rubbing the PI along a predetermined direction and induce vertical alignment of the liquid crystal and dye particles to set the initial orientation of the liquid crystal, and thus the dye particles, in LC layer 2010 at the top and bottom of the helical structure. Thus, the liquid crystal and dye particles are aligned according to the rubbing direction. In the absence of an applied electric field, the liquid crystal and dye particles located near the rubbing surfaces are aligned substantially vertically to allow the passage of light. The amount of twisting in the helical structure is determined by the chiral dopant. Applying an electric field across the ITO layers causes the helical structure to untwist in a manner similar to that described with respect to TN liquid crystal in FIG. 7B. In the untwisted state, the liquid crystal and dye particles in the LC layer 2010 are oriented substantially horizontally to block light.

Depending on the direction of the rubbing patterns, the LC assembly 2100 can be configured to be normally-black instead of normally-white. The LC assembly 2100 in FIG. 21 may have less haze in the dark state than the LC assembly 2000 in FIG. 20 due to the alignment provided by the rubbing patterns 2105. Optical performance for an LC assembly such as the LC assemblies in FIGS. 20 and 21 can be configured by setting the value of one or more parameters in Beer's law. For example, the transmittance can be varied by setting the cell gap distance (labeled d in FIG. 7A). Accordingly, a first cell gap for the LC assembly 2100 may provide for transmittance from 13% to 63% for the dark and light states, respectively, and a second cell gap for the LC assembly 2100 may provide for 19% to 68% transmittance. In general, the transmittance for any embodiment incorporating a GH liquid crystal is less than 25% in the dark state (e.g., 1% to 20%), and greater than 20% in the light state (e.g., 20% to 70%). Typical cell gaps for a GH-based embodiment such as the embodiments of FIGS. 20 and 21 range from 2.5 to 30 micrometers, in some cases, 4.5 micrometers to 20 micrometers.

EXAMPLES

Features described with respect to the above embodiments and in connection with the accompanying drawings (FIGS. 1 to 21) can be combined in various ways. The following are specific examples which incorporate aspects of the previously described embodiments. Additional combinations of features and further modifications will be apparent to one of ordinary skill in the art in light of the disclosure.

Example No. 1

In certain aspects, a liquid crystal (LC) film assembly comprises a liquid crystal layer, a first substrate and a second substrate located on opposite sides of the liquid crystal layer, and first outer layer. The liquid crystal layer includes TN liquid crystals. For example, in FIG. 9A, the liquid crystal 940 can include liquid crystals that have a twist angle in a default (voltage-off) state. The first substrate has a first conductive layer, e.g., ITO layer 916. Similarly, second substrate has a second conductive layer, e.g., ITO layer 920. Each of the first substrate and the second substrate comprises a flexible film. For example, as shown in FIG. 9A, layers 914 and 922 correspond to PC layers. The first outer layer includes a rigid, transparent material. For example, the first outer layer may correspond to glass layer 902.

Optionally, the TN liquid crystals have a twist angle less than or greater than 90 degrees. As discussed above, TN liquid crystal is not limited to a 90 degree twist angle and can encompass, for example, STN, MTN, and liquid crystals with a chiral dopant.

Optionally, the first outer layer has a three-dimensional curvature. For example, glass layer 902 may be curved to match the shape of a vehicle window. Thus, the first outer layer can be a vehicular window, for example a window of an automobile, airplane, or boat.

Optionally, the first outer layer can be an architectural window, for example, a glass door or building window.

Optionally, the LC film assembly can include a second outer layer including a rigid, transparent material, where the second outer layer has a three-dimensional curvature (e.g., a curvature matching that of the first outer layer), and where the first substrate, the second substrate, and the liquid crystal layer are between the first outer layer and the second outer layer. For example, the second outer layer may correspond to glass layer 930.

The flexible film of the LC film assembly can be formed of various flexible materials. For example, the flexible film of the first substrate or the second substrate can include PC, PET, or TAC.

Optionally, the LC film assembly can include an infrared-blocking layer between the first substrate and the first outer layer, where the infrared-blocking layer includes polyethylene terephthalate (PET) or another material that operates as an infrared filter. For example, the infrared-block layer may correspond to PET layer 906.

Optionally, the first substrate and the first outer layer may be glued together with an adhesive. For example, as shown in FIGS. 9A-9C and the lamination process depicted in FIG. 10, a glass layer can be bonded to a surface of an LC cell, without or without intervening layers, and using PVB as the adhesive.

Optionally, the first substrate and the first outer layer are laminated with one or more intervening layers between the first substrate and the first outer layer. For example, in FIG. 9A the glass layer 902 and the PC layer 914 are separated by PET layer 906 and polarizer 910.

Optionally, the LC film assembly can include a control unit (e.g., control unit 530 or 600) configured to generate one or more control signals that establish a voltage across the first conductive layer and the second conductive layer, where a magnitude of the voltage determines an alignment of the TN liquid crystals in the liquid crystal layer. Additionally, the first outer layer can be a window (e.g., window 520), and the control unit may be attached to the window, as shown in FIGS. 5A and 5B. Further, as shown in FIGS. 5A and 5B, the LC film assembly can include a cutout (e.g., cutout 512) shaped to accommodate the control unit such that the control unit is attached to the window without the LC film assembly intervening. Additionally, the LC film assembly can include an optional battery (e.g., battery 620) configured to supply power to the control unit, and an optional photovoltaic cell (e.g., photovoltaic cell 610) configured to recharge the battery using light from a light source that illuminates the LC film assembly, where the battery and the photovoltaic cell are housed within the control unit.

Optionally, the first conductive layer and the second conductive layer can be etched to form patterns on surfaces of the first conductive layer and the second conductive layer. As described above in connection with FIG. 7B, the patterns can correspond to a plurality of regions that are individually dimmable to display graphics or text. For example, each region of the plurality of regions can include a first electrode corresponding to the first conductive layer and a second electrode corresponding to the second conductive layer, where the region is individually dimmable by establishing a voltage across the first electrode and the second electrode.

Example No. 2

In certain aspects, a method of enhancing a window (e.g., window 520 in FIG. 5A) involves attaching an LC film assembly to the window, where the window is an automobile or building (architectural) window, and where the LC film assembly comprises a liquid crystal layer, a first substrate and a second substrate located on opposite sides of the liquid crystal layer, and first outer layer. The liquid crystal layer includes TN liquid crystals. The first substrate has a first conductive layer. Similarly, second substrate has a second conductive layer. Each of the first substrate and the second substrate comprises a flexible film. Attaching the LC film assembly to the window can include placing the LC film assembly against the window such that a surface of the first substrate substantially conforms to a surface of the window. For example, in FIG. 5B, if the window 520 had a three-dimensional curvature (as in the case of an automotive sunroof), placing LC assembly 510 against the window 520 may cause the LC assembly 510 to conform to the curvature of the window 520 if the LC assembly 510 includes a flexible film such as PC layer 914 in FIG. 9A. Further, the flexible film may permit the LC film assembly to conform to surfaces that are substantially, but not completely, flat. For example, an architectural window may appear flat to the unaided eye but can still have minor height variations of 1 mm or more across its surface.

As an alternative to TN liquid crystal, the LC film assembly attached to the window may include a GH liquid crystal and can be structured, for example, in accordance with the example of FIG. 20 or FIG. 21. Accordingly, the LC film assembly may include a GH liquid crystal layer comprising a mixture of nematic liquid crystals operating as a host, dye molecules operating as a guest and, optionally, a chiral dopant. The LC film assembly may further include a first substrate having a first conductive layer and a second substrate having a second conductive layer (analogous to the first substrate and second substrate in the TN embodiment described earlier in this example). For example, both conductive layers may be formed as ITO coatings. The first substrate and the second substrate are located on opposite sides of the GH liquid crystal layer. The first substrate and the second substrate each comprises a flexible film (e.g., flexible films 2004 and 2016). Although FIGS. 20 and 21 do not show spacers, it will be understood that spacers such as the spacers 708 in FIG. 7A can be incorporated into the LC film assembly to define a cell gap of, for example, between 2.5 μm and 30 μm. The amount of chiral dopant in the GH liquid crystal layer can be at least 0.5% of the GH liquid crystal layer by weight. Like the TN-based examples described above, the GH liquid crystal may be configured to transition the LC film assembly between a darkened state (a state of minimal light transmittance) and a lightened state (a state of maximal light transmittance) in response to application of a voltage across the first conductive layer and the second conductive layer. In the darkened state, the LC film assembly may have an overall light transmittance (total transmittance across all layers of the LC film assembly) of between 1% to 20%. In the lightened state, the LC film assembly has an overall light transmittance of between 20% to 70%. The LC film assembly can be attached in a similar manner as described above, through placing the LC film assembly against the window such that the first substrate conforms to a surface of the window.

Optionally, the flexible film of the first substrate or the flexible film of the second substrate can include PC, PET, or TAC.

Optionally, attaching the LC film assembly to the window can further include applying an adhesive to at least one of the surface of the first substrate or the surface of the window prior to placing the LC film assembly against the window. The adhesive can be a liquid adhesive, for example, a transparent, water-based or solvent-based adhesive that forms a bond between the LC film assembly and the window upon evaporation. Alternatively, the adhesive may be film-based. In some implementations, a film-based adhesive may be covered, at least on the side facing the window, with a protective film that is peeled off to expose the film-based adhesive. The film-based adhesive can be pre-applied to the LC film assembly (e.g., onto the first substrate at a time of manufacture) or applied at the LC film assembly at the time of attaching the LC film assembly to the window.

Optionally, attaching the LC film assembly to the window can further include, after placing the LC film assembly against the window, applying pressure to the LC film assembly such that the pressure removes air bubbles trapped between the first substrate and the window. The pressure can be applied manually, possibly with the aid of a tool such as a squeegee, to direct air bubbles toward the edges of the LC film assembly.

Optionally, the method can involve attaching a control unit to the window, where the control unit is configured to apply a voltage across the first conductive layer and the second conductive layer by generating one or more control signals. The method can further involve connecting the control unit to an electrical interface of the LC film assembly, for example, using a cable configured to carry the one or more control signals, as discussed above in connection with FIG. 6A. The control unit can be attached to any location on the window. For example, method may involve placing the control unit on a corner of the window or the center of the window.

In general, the LC film assembly is approximately the same size as the window, in which case the control unit may be placed along an edge of the LC film assembly. For example, the control unit may be attached through placing the control unit within a cutout provided in the LC film assembly (e.g., cutout 512), with the cutout being configured to permit ambient light (e.g., sunlight) to reach a photovoltaic cell of the control unit without passing through the various layers of the LC cell (e.g., the first substrate and the second substrate). As described above in connection with FIG. 6A, a photovoltaic cell can be used to charge a battery of the control unit.

Example No. 3

In certain aspects, an LC film assembly adapted for attachment to an architectural window includes a GH liquid crystal layer comprising nematic liquid crystals operating as a host, dye molecules operating as a guest and, optionally, a chiral dopant. Such an LC film assembly may be structured, for example, according to the example of FIG. 20 or FIG. 21 and may incorporate aspects of additional embodiments described herein. The LC film assembly includes a first substrate having a first conductive layer and a second substrate having a second conductive layer. The first substrate and the second substrate are located on opposite sides of the GH liquid crystal layer. The first substrate and the second substrate each comprises a flexible film. The LC film assembly further includes a plurality of spacers between the first substrate and the second substrate. The spacers define, and can be configured to maintain, a cell gap of between 2.5 µm and 30 µm. The chiral dopant is at least 0.5% of the GH liquid crystal layer by weight. The GH liquid crystal layer is configured to transition the LC film assembly between a darkened state and a lightened state in response to application of a voltage across the first conductive layer and the second conductive layer. In the darkened state, the LC film assembly has an overall light transmittance of between 1% to 20%. In the lightened state, the LC film assembly has an overall light transmittance of between 20% to 70%. The LC film assembly is attached to a glass surface of the architectural window, e.g., with the first substrate being an outermost layer of the LC film assembly that is nearest the architectural window. The LC film assembly can be switched directly between the darkened and lightened states or gradually (e.g., in stepped increments) under the direction of a control unit such as the control unit in FIG. 6A.

Optionally, the LC film assembly is normally-black, with the GH liquid crystal layer being configured to establish the darkened state in an absence of voltage across the first conductive layer and the second conductive layer.

Optionally, the LC film assembly is normally-white, with the GH liquid crystal layer being configured to establish the lightened state in an absence of voltage across the first conductive layer and the second conductive layer.

Optionally, the LC film assembly is formed separately from the architectural window and attached via an adhesive located between the first substrate and the architectural window. Accordingly, the LC film assembly may be attached as an after-market product. The adhesive can be a liquid adhesive or film-based.

When the outermost layer facing the architectural window is the first substrate, the flexible film of the first substrate may be configured to conform to height variations along the glass surface of the architectural window. The LC film assembly may, as a whole, also conform to the glass surface of the architectural window.

Optionally, the flexible film of the first substrate or the flexible film of the second substrate can include PC, PET, or TAC.

Optionally, the LC film assembly may further include a first PI coating between the first conductive layer and the GH liquid crystal layer and, similarly, a second PI coating between the second conductive layer and the GH liquid crystal layer. The first PI coating and the second PI coating may correspond to the PI layers 2120 and 2122 in FIG. 21 and, as such, may each include a rubbing pattern that determines an initial orientation of the nematic liquid crystals (and therefore an initial orientation of the dye molecules also).

Optionally, the LC film assembly may further include a control unit configured to vary the voltage across the first conductive layer and the second conductive layer depending on a level of ambient light. An example of such a control unit was described in connection with FIG. 6A, where the control unit includes a battery and a photovoltaic cell configured to charge the battery using the ambient light.

Optionally, the LC film assembly may further include a cutout shaped to accommodate the control unit (e.g., cutout 512). The cutout can be located along an edge or corner of the LC film assembly (as shown in FIG. 5A) and may permit the control unit to be attached directly to the architectural window.

Optionally, the LC film assembly may further include one or more of the following additional layers: (1) a blocking layer configured to reduce an amount of ultraviolet light transmitted to the GH liquid crystal layer; (2) a blocking layer configured to reduce an amount of infrared light transmitted to the GH liquid crystal layer, or (3) a moisture barrier configured to prevent moisture from reaching the GH liquid crystal layer. For example, the LC film assembly may include a combined UV and IR blocking film, separate UV and IR blocking films, UV and/or IR blocking particles in the first substrate or the second substrate, one or more $SiO_2$ coatings (e.g., $SiO_2$ layers 2006 and 2014), or any combination thereof.

Optionally, the first conductive layer and the second conductive layer may be divided into a plurality of regions that are individually controllable to adjust a light transmittance of each region. The regions can be formed, for example, by etching patterns into the first conductive layer and corresponding patterns into the second conductive layer to define multiple pairs of electrodes. Such regions may permit selective dimming of individual regions, as described above in connection with FIGS. 3A to 3C and FIG. 4.

Example No. 4

In certain aspects, an LC film assembly adapted for attachment to an automotive window (e.g., a sunroof) includes a GH liquid crystal layer comprising nematic liquid crystals operating as a host, dye molecules operating as a guest and, optionally, a chiral dopant. Such an LC film assembly may be structured, for example, according to the example of FIG. 20 or FIG. 21 and may incorporate aspects of additional embodiments described herein. The LC film assembly includes a first substrate having a first conductive layer and a second substrate having a second conductive layer. The first substrate and the second substrate are located on opposite sides of the GH liquid crystal layer. The first substrate and the second substrate each comprises a flexible film. The LC film assembly further includes a plurality of spacers between the first substrate and the second substrate. The spacers define, and can be configured to maintain, a cell gap of between 2.5 μm and 30 μm. The chiral dopant is at least 0.5% of the GH liquid crystal layer by weight. The GH liquid crystal layer is configured to transition the LC film assembly between a darkened state and a lightened state in response to application of a voltage across the first conductive layer and the second conductive layer. In the darkened state, the LC film assembly has an overall light transmittance of between 1% to 20%. In the lightened state, the LC film assembly has an overall light transmittance of between 20% to 70%. The LC film assembly is attached to a three-dimensionally curved surface of the automotive window, e.g., with the first substrate being an outermost layer of the LC film assembly that is nearest the automotive window. The LC film assembly can be switched directly between the darkened and lightened states or gradually (e.g., in stepped increments) under the direction of a control unit such as the control unit in FIG. 6A.

Optionally, the LC film assembly is normally-black, with the GH liquid crystal layer being configured to establish the darkened state in an absence of voltage across the first conductive layer and the second conductive layer.

Optionally, the LC film assembly is normally-white, with the GH liquid crystal layer being configured to establish the lightened state in an absence of voltage across the first conductive layer and the second conductive layer.

Optionally, the LC film assembly is formed separately from the automotive window and attached via an adhesive located between the first substrate and the automotive window. Accordingly, the LC film assembly may be attached as an after-market product. The adhesive can be a liquid adhesive or film-based.

When the outermost layer facing the automotive window is the first substrate, the flexible film of the first substrate may be configured to conform to a curvature of the three-dimensionally curved surface. The LC film assembly may, as a whole, also conform to the curvature of the three-dimensionally curved surface.

Optionally, the flexible film of the first substrate or the flexible film of the second substrate can include PC, PET, or TAC.

Optionally, the LC film assembly may further include a first PI coating between the first conductive layer and the GH liquid crystal layer and, similarly, a second PI coating between the second conductive layer and the GH liquid crystal layer. The first PI coating and the second PI coating may correspond to the PI layers 2120 and 2122 in FIG. 21 and, as such, may each include a rubbing pattern that determines an initial orientation of the nematic liquid crystals (and therefore an initial orientation of the dye molecules also).

Optionally, the LC film assembly may further include a control unit configured to vary the voltage across the first conductive layer and the second conductive layer depending on a level of ambient light. An example of such a control unit was described in connection with FIG. 6A, where the control unit includes a battery and a photovoltaic cell configured to charge the battery using the ambient light.

Optionally, the LC film assembly may further include a cutout shaped to accommodate the control unit (e.g., cutout 512). The cutout can be located along an edge or corner of the LC film assembly (as shown in FIG. 5A) and may permit the control unit to be attached directly to the automotive window.

Optionally, the LC film assembly may further include one or more of the following additional layers: (1) a blocking layer configured to reduce an amount of ultraviolet light transmitted to the GH liquid crystal layer; (2) a blocking layer configured to reduce an amount of infrared light transmitted to the GH liquid crystal layer, or (3) a moisture barrier configured to prevent moisture from reaching the GH liquid crystal layer. For example, the LC film assembly may include a combined UV and IR blocking film, separate UV and IR blocking films, UV and/or IR blocking particles in the first substrate or the second substrate, one or more $SiO_2$ coatings (e.g., $SiO_2$ layers 2006 and 2014), or any combination thereof.

Optionally, the first conductive layer and the second conductive layer may be divided into a plurality of regions that are individually controllable to adjust a light transmittance of each region. The regions can be formed, for example, by etching patterns into the first conductive layer and corresponding patterns into the second conductive layer to define multiple pairs of electrodes. Such regions may permit selective dimming of individual regions, as described above in connection with FIGS. 3A to 3C and FIG. 4.

Example No. 5

In certain aspects, a method for laminating an LC assembly involves forming a stack including the following in order: a first rigid outer layer, a PVB layer, a first substrate having a first conductive layer, a liquid crystal layer, a second substrate having a second conductive layer, and a second rigid outer layer. For example, the stack may correspond to the LC assembly 1000 in FIG. 10. The method further involves, after forming the stack, heating the PVB layer until the PVB layer is at least partially melted, then cooling the PVB layer until the PVB layer is re-solidified.

Optionally, the liquid crystal layer includes twisted nematic liquid crystals, Guest-Host liquid crystals, or vertical alignment liquid crystals.

Optionally, at least one of the first substrate, the second substrate, or the outer layer includes polycarbonate.

Optionally, the stack further includes a polarizer comprising a polarization plate, a TAC coating, and a UV-blocking coating. As discussed above, LC assembly 1000 in FIG. 10 is a simplified representation of an LC assembly. The stack being laminated may therefore correspond to one of the previously described LC assemblies, such as the LC assembly 900 of FIG. 9A. Additionally, the method can involve forming a liquid crystal cell to contain liquid crystals in the liquid crystal layer, where the forming of the liquid crystal cell includes applying a sealant between the first substrate and the second substrate using a non-UV cured adhesive, and where the first substrate, the second substrate, and the sealant each define a boundary of the liquid crystal cell. For example, as discussed above, the adhesive 1102 in FIG. 11 is a UV adhesive, but can be replaced with a two-part epoxy or other non-UV cured adhesive.

In addition to applying a sealant between the first substrate and the second substrate, the method can further involve placing a spacer between the first substrate and the second substrate, where the spacer is rectangular or cylindrical and defines a cell gap between the first substrate and the second substrate.

When applying the sealant between the first substrate and the second substrate, the first conductive layer or the second conductive layer can include ITO. For example, the first conductive layer and the second conductive layer may correspond to ITO layers 916 and 920, respectively. Accordingly, in some instances, the sealant can be applied to a surface of an ITO layer.

Optionally, the heating of the PVB layer can be performed at a temperature between 100 to 160° C. and with a pressure applied to the stack mechanically or through a vacuum environment. For example, the temperature can be set between 110 to 120° C. to heat the PVB layer. The pressure applied to the stack can be generated using a vacuum chamber or vacuum bag, in which case the method may involve setting the pressure between 1 to 4 bars. Alternatively, the pressure can be 10 to 15 bars of mechanically applied pressure.

Example No. 6

In certain aspects, an LC assembly comprises a stack including the following in order: a first rigid outer layer, a PVB layer, a first substrate comprising a first flexible film and having a first conductive layer, a liquid crystal layer comprising nematic liquid crystals and a chiral dopant, a second substrate comprising a second flexible film and having a second conductive layer, and a second rigid outer layer. The stack is a laminated stack formed as a result of heating the PVB layer until the PVB layer at least partially melted, followed by cooling the PVB layer until the PVB layer re-solidified, for example, according to the process described above with respect to FIG. 10.

Optionally, the liquid crystal layer includes Guest-Host liquid crystal.

Optionally, at least one of the first rigid outer layer or the second rigid outer layer includes polycarbonate.

Optionally, the stack further includes a polarizer comprising a polarization plate, a TAC coating, and a UV blocking coating. Additionally, the LC assembly can further include a liquid crystal cell containing the nematic liquid crystals in the liquid crystal layer, where the liquid crystal cell includes a sealant applied between the first substrate and the second substrate using a non-UV cured adhesive, and where the first substrate, the second substrate, and the sealant each define a boundary of the liquid crystal cell. Additionally, the LC assembly can include a spacer between the first substrate and the second substrate, where the spacer is rectangular or cylindrical and defines a cell gap between the first substrate and the second substrate. Optionally, the first conductive layer or the second conductive layer can include ITO and be located between the polarizer and the liquid crystal layer.

Example No. 7

In certain aspects, an LC assembly includes and a first substrate and a second substrate. The first substrate and the second substrate may be rigid substrates or flexible substrates. In some embodiments, the first substrate and the second substrate comprise glass. The LC assembly further includes an LC panel between the first substrate and the second substrate. The LC assembly further includes an edge seal that extends at least partially around a perimeter of the LC assembly. Like the LC panel, the edge seal is located between the first substrate and the second substrate. The overall thickness of the LC assembly including the first substrate, the second substrate, and the LC panel can be configured to permit the LC assembly to operate as an automotive window (e.g., sunroof or side window).

The LC panel is a multi-layer stack comprising an LC layer between a first conductive layer and a second conductive layer. The LC panel further includes one or more additional layers between the first conductive layer and the first substrate and/or between the second conductive layer and the second substrate. The one or more additional layers comprise a different material (e.g., PVB) than that of the first substrate and the second substrate. Therefore, the LC panel has a different coefficient of thermal expansion than the first substrate and the second substrate.

The LC panel is bonded to the first substrate and the second substrate through a combination of a liquid adhesive and a film-based adhesive, for example, as described above in connection with FIG. 14. The liquid adhesive and the film-based adhesive are configured to maintain a flexible bond over at least a temperature range of between −40 to +115° C. Optionally, the edge seal may be bonded to the first substrate and the second substrate using an adhesive that has a higher bond strength compared to the liquid adhesive and the film based adhesive. In some embodiments, the liquid adhesive and the film-based adhesive comprise acrylic, and the adhesive of the edge seal comprises resin.

Optionally, the edge seal has a coefficient of friction that is less than or equal to that of the first substrate and the second substrate. For example, if the first substrate and the second substrate comprise glass, the edge seal may comprise PET.

Optionally, a thickness of the second substrate is less than that of the first substrate. For instance, as discussed above in connection with FIG. 16, an outer substrate (e.g., the first substrate) may range approximately from 2 mm to 3.5 mm, and an inner substrate (e.g., the second substrate) may range approximately from 0.7 mm to 2 mm, with a total thickness of approximately 5 mm or less for the entire LC assembly.

Optionally, the first substrate extends past the edge seal and the second substrate and provides a mounting surface for attaching the LC assembly to a mounting body, for example, as shown in FIG. 16. The LC assembly can further include a padding block (e.g., padding 1705 in FIG. 17) that is flush with the first substrate. Alternatively, the first substrate, the second substrate, and the edge seal are coterminous to define a flush mounting surface, as shown in FIG. 18.

Optionally, the edge seal is separated from the LC panel by a first gap that is filled with a flexible sealant. The first gap can be filled entirely by the liquid adhesive or, as shown in FIG. 19, by a different material (e.g., another adhesive) in an area not occupied by the liquid adhesive. In addition to the first gap, the edge seal may optionally be separated from the mounting body by a second gap when the LC assembly is in an attached configuration with respect to the mounting body. Like the first gap, the second gap is filled with a flexible sealant. The sealant in the second gap can be applied to the edge seal at a time of manufacturing the LC assembly or applied during attachment of the LC assembly to the mounting body. The sealant in the first gap and/or the second gap can be a non-adhesive sealant.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description may describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A liquid crystal (LC) film assembly comprising:
    a Guest-Host (GH) liquid crystal layer including nematic liquid crystals, dye molecules, and a chiral dopant;
    a first substrate having a first conductive layer and a second substrate having a second conductive layer, the first substrate and the second substrate located on opposite sides of the GH liquid crystal layer, wherein the first substrate and the second substrate each comprises a flexible film;
    a control unit configured to apply a voltage across the first conductive layer and the second conductive layer;
    a cutout shaped configured to accommodate the control unit, wherein the cutout is located along an edge or corner of the LC film assembly and permits the control unit to be attached directly to an architectural window; and
    a plurality of spacers between the first substrate and the second substrate, the plurality of spacers defining a cell gap of between 2.5 μm and 30 μm, wherein:
        the chiral dopant is at least 0.5% of the GH liquid crystal layer by weight,
        the GH liquid crystal layer is configured to transition the LC film assembly between a darkened state and a lightened state in response to application of the voltage across the first conductive layer and the second conductive layer,
        in the darkened state, the LC film assembly has an overall light transmittance of between 1% to 20%,
        in the lightened state, the LC film assembly has an overall light transmittance of between 20% to 70%, and
        the LC film assembly is attached to a glass surface of the architectural window.

2. The LC film assembly of claim 1, wherein the GH liquid crystal layer is configured to establish the darkened state in an absence of the voltage across the first conductive layer and the second conductive layer.

3. The LC film assembly of claim 1, wherein the GH liquid crystal layer is configured to establish the lightened state in an absence of the voltage across the first conductive layer and the second conductive layer.

4. The LC film assembly of claim 1, wherein the LC film assembly is formed separately from the architectural window and attached via an adhesive located between the first substrate and the architectural window.

5. The LC film assembly of claim 4, wherein the adhesive is a liquid adhesive.

6. The LC film assembly of claim 4, wherein the adhesive is a film-based adhesive.

7. The LC film assembly of claim 1, wherein the flexible film of the first substrate is configured to conform to height variations along the glass surface of the architectural window.

8. The LC film assembly of claim 1, wherein the flexible film of the first substrate or the flexible film of the second substrate includes polycarbonate (PC), polyethylene terephthalate (PET), or cellulose triacetate (TAC).

9. The LC film assembly of claim 1, further comprising:
a first polyimide (PI) coating between the first conductive layer and the GH liquid crystal layer; and
a second PI coating between the second conductive layer and the GH liquid crystal layer, wherein the first PI coating and the second PI coating each includes a rubbing pattern that determines an initial orientation of the nematic liquid crystals.

10. The LC film assembly of claim 1,
wherein the control unit is configured to vary the voltage across the first conductive layer and the second conductive layer depending on a level of ambient light.

11. The LC film assembly of claim 10, wherein the control unit includes a battery and a photovoltaic cell, the photovoltaic cell being configured to charge the battery using the ambient light.

12. The LC film assembly of claim 1, further comprising one or more of the following additional layers:
a blocking layer configured to reduce an amount of ultraviolet light transmitted to the GH liquid crystal layer;
a blocking layer configured to reduce an amount of infrared light transmitted to the GH liquid crystal layer; or
a moisture barrier configured to prevent moisture from reaching the GH liquid crystal layer.

13. The LC film assembly of claim 1, wherein the first conductive layer and the second conductive layer are divided into a plurality of regions that are individually controllable to adjust a light transmittance of each region.

14. A liquid crystal (LC) film assembly comprising:
a Guest-Host (GH) liquid crystal layer including nematic liquid crystals, dye molecules, and a chiral dopant;
a first substrate having a first conductive layer and a second substrate having a second conductive layer, the first substrate and the second substrate located on opposite sides of the GH liquid crystal layer, wherein the first substrate and the second substrate each comprises a flexible film;
a control unit configured to apply a voltage across the first conductive layer and the second conductive layer;
a cutout shaped configured to accommodate the control unit, wherein the cutout is located along an edge or corner of the LC film assembly and permits the control unit to be attached directly to an automotive window; and
a plurality of spacers between the first substrate and the second substrate, the plurality of spacers defining a cell gap of between 2.5 μm and 30 μm, wherein:
the chiral dopant is at least 0.5% of the GH liquid crystal layer by weight,
the GH liquid crystal layer is configured to transition the LC film assembly between a darkened state and a lightened state in response to application of the voltage across the first conductive layer and the second conductive layer,
in the darkened state, the LC film assembly has an overall light transmittance of between 1% to 20%,
in the lightened state, the LC film assembly has an overall light transmittance of between 20% to 70%, and
the LC film assembly is attached to a three-dimensionally curved surface of the automotive window.

15. The LC film assembly of claim 14, wherein the automotive window is a sunroof.

16. The LC film assembly of claim 14, wherein the LC film assembly is formed separately from the automotive window and attached via an adhesive located between the first substrate and the automotive window.

17. The LC film assembly of claim 16, wherein the adhesive is a liquid adhesive or a film-based adhesive.

18. The LC film assembly of claim 14, wherein the flexible film of the first substrate is configured to conform to a curvature of the three-dimensionally curved surface.

19. The LC film assembly of claim 14, wherein the flexible film of the first substrate or the flexible film of the second substrate includes polycarbonate (PC), polyethylene terephthalate (PET), or cellulose triacetate (TAC).

20. The LC film assembly of claim 14, wherein the first conductive layer and the second conductive layer are divided into a plurality of regions that are individually controllable to adjust a light transmittance of each region.

21. A method of manufacturing a dimming system, the method comprising:
attaching a liquid crystal (LC) film assembly to a surface of a window using an adhesive, wherein the LC film assembly includes:
a Guest-Host (GH) liquid crystal layer including nematic liquid crystals, dye molecules, and a chiral dopant;
a first substrate having a first conductive layer and a second substrate having a second conductive layer, the first substrate and the second substrate located on opposite sides of the GH liquid crystal layer, wherein the first substrate and the second substrate each comprises a flexible film; and
a plurality of spacers between the first substrate and the second substrate, the plurality of spacers defining a cell gap of between 2.5 μm and 30 μm, wherein:
the chiral dopant is at least 0.5% of the GH liquid crystal layer by weight,
the GH liquid crystal layer is configured to transition the LC film assembly between a darkened state and a lightened state in response to application of a voltage across the first conductive layer and the second conductive layer,
in the darkened state, the LC film assembly has an overall light transmittance of between 1% to 20%,
in the lightened state, the LC film assembly has an overall light transmittance of between 20% to 70%, and
attaching the LC film assembly to the window includes placing the LC film assembly against the window such that the first substrate conforms to a surface of the window;
placing a control unit within a cutout provided in the LC film assembly, wherein the control unit is configured to apply the voltage across the first conductive layer and the second conductive layer, wherein the cutout is shaped to accommodate the control unit, wherein the cutout is located along an edge or corner of the LC film assembly and permits the control unit to be attached directly to the window.

22. The method of claim 21, wherein the surface of the window has a three-dimensional curvature.

23. The method of claim 21, wherein the flexible film of the first substrate or the flexible film of the second substrate includes polycarbonate (PC), polyethylene terephthalate (PET), or cellulose triacetate (TAC).

24. The method of claim 21, wherein the adhesive is a liquid adhesive, and wherein attaching the LC film assembly to the window further includes applying the liquid adhesive to at least one of the first substrate or the surface of the window prior to placing the LC film assembly against the window.

25. The method of claim 24, wherein the liquid adhesive is a transparent, water-based or solvent-based adhesive that forms a bond between the LC film assembly and the window upon evaporation.

26. The method of claim 21, wherein the adhesive is a film-based adhesive covered by a protective film, and wherein attaching the LC film assembly to the window further includes peeling off the protective film to expose the film-based adhesive before placing the LC film assembly against the window.

27. The method of claim 21, further comprising:
after placing the LC film assembly against the window, applying pressure to the LC film assembly, wherein the pressure removes air bubbles trapped between the first substrate and the window.

28. The method of claim 21, further comprising:
connecting the control unit to an electrical interface of the LC film assembly, wherein the electrical interface is configured to communicate an electrical signal from the control unit for establishing the voltage.

29. The method of claim 28, wherein the control unit includes a battery and a photovoltaic cell, the photovoltaic cell being configured to charge the battery using ambient light, and wherein the cutout is configured to permit the ambient light to reach the photovoltaic cell without passing through the first substrate and the second substrate.

* * * * *